(12) United States Patent
Verhoff et al.

(10) Patent No.: US 12,091,859 B2
(45) Date of Patent: Sep. 17, 2024

(54) ROOFING MATERIALS INCLUDING A PARTING AGENT LAYER

(71) Applicant: Owens Corning Intellectual Capital, LLC, Toledo, OH (US)

(72) Inventors: Jonathan M. Verhoff, Granville, OH (US); Scott W. Schweiger, Newark, OH (US); Kevin A. Click, Columbus, OH (US); Laurand H. Lewandowski, Newark, OH (US); Benjamin R. Hoffman, Columbus, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 831 days.

(21) Appl. No.: 15/733,973

(22) PCT Filed: Jun. 28, 2019

(86) PCT No.: PCT/US2019/039858
§ 371 (c)(1),
(2) Date: Dec. 1, 2020

(87) PCT Pub. No.: WO2020/006430
PCT Pub. Date: Jan. 2, 2020

(65) Prior Publication Data
US 2021/0214944 A1      Jul. 15, 2021

Related U.S. Application Data

(60) Provisional application No. 62/692,114, filed on Jun. 29, 2018.

(51) Int. Cl.
*E04D 1/26*      (2006.01)
*B32B 5/02*      (2006.01)
(Continued)

(52) U.S. Cl.
CPC .................. *E04D 1/26* (2013.01); *B32B 5/02* (2013.01); *B32B 7/06* (2013.01); *B32B 7/12* (2013.01);
(Continued)

(58) Field of Classification Search
CPC ....... E04D 1/26; E04D 1/20; E04D 2001/005; B32B 5/02; B32B 7/06; B32B 7/12;
(Continued)

(56) References Cited

U.S. PATENT DOCUMENTS 1,494,380 A      5/1924   Schutte
2,263,200 A     11/1941   Wheeler et al.
(Continued)

FOREIGN PATENT DOCUMENTS

AU        2009245565 A1   11/2009
CA           2460741 A1    4/2003
(Continued)

OTHER PUBLICATIONS

Author Unknown, Pubchem Online, Calcium Stearate (Year: 2022).
(Continued)

*Primary Examiner* — Scott R. Walshon
(74) *Attorney, Agent, or Firm* — Calfee, Halter & Griswold LLP

(57) ABSTRACT

Asphalt-based roofing materials, such as shingles, are disclosed that include a layer of parting material. The layer of parting material is applied to at least a part of the top, bottom, or both the top and the bottom of the shingle. When the shingle includes the parting material on the bottom, the layer of parting material replaces all or a portion of a backdust layer. When the shingle includes the layer of parting material on the top, the layer of parting material replaces a portion of granules on the shingle. The layer of parting material can be applied to the shingle in patterns and
(Continued)

configurations that permit an adhesive to be applied to the shingle and function as intended. The parting material may include a metal salt of a fatty acid, a polyolefin, and/or a crosslinkable silane.

16 Claims, 30 Drawing Sheets

(51) Int. Cl.
| | | |
|---|---|---|
| B32B 7/06 | (2019.01) | |
| B32B 7/12 | (2006.01) | |
| B32B 11/04 | (2006.01) | |
| D06N 5/00 | (2006.01) | |
| E04D 1/00 | (2006.01) | |
| E04D 1/20 | (2006.01) | |

(52) U.S. Cl.
CPC ............... *B32B 11/04* (2013.01); *D06N 5/00* (2013.01); *E04D 1/20* (2013.01); *B32B 2255/20* (2013.01); *B32B 2260/042* (2013.01); *B32B 2264/10* (2013.01); *E04D 2001/005* (2013.01)

(58) Field of Classification Search
CPC ............... B32B 11/04; B32B 2255/20; B32B 2260/042; B32B 2264/10; D06N 5/00
See application file for complete search history.

(56) References Cited

U.S. PATENT DOCUMENTS

| | | |
|---|---|---|
| 2,332,221 A | 10/1943 | Harshberger |
| 2,438,890 A | 4/1948 | Baskin |
| 2,833,673 A | 5/1958 | Hart et al. |
| 3,042,193 A | 7/1962 | Wendt |
| 3,045,395 A | 7/1962 | Fasold et al. |
| 3,138,897 A | 6/1964 | McCorkle |
| 3,239,992 A | 3/1966 | Hodgson |
| 3,247,631 A | 4/1966 | Lovness |
| 3,252,257 A | 5/1966 | Price et al. |
| 3,813,280 A | 5/1974 | Olszyk et al. |
| 3,903,340 A | 9/1975 | Shepherd |
| 4,078,104 A | 3/1978 | Martin |
| 4,173,489 A | 11/1979 | Crawford et al. |
| 4,243,426 A | 1/1981 | Marzocchi et al. |
| 4,447,500 A | 5/1984 | Ferris |
| 4,992,315 A | 2/1991 | Zickell et al. |
| 5,082,704 A | 1/1992 | Higgins |
| 5,240,760 A | 8/1993 | George et al. |
| 5,382,449 A | 1/1995 | Hedges |
| 5,756,214 A | 5/1998 | Waldron et al. |
| 5,996,300 A | 12/1999 | Hamlin |
| 6,426,309 B1 | 7/2002 | Miller et al. |
| 6,506,444 B1 | 1/2003 | Mahr et al. |
| 6,524,682 B1 | 2/2003 | Leavell |
| 6,531,200 B2 | 3/2003 | Zickell et al. |
| 6,610,147 B2 | 8/2003 | Aschenbeck |
| 6,635,140 B2 | 10/2003 | Phillips et al. |
| 6,701,685 B2 | 3/2004 | Rippey |
| 6,709,994 B2 | 3/2004 | Miller et al. |
| 6,887,515 B2 * | 5/2005 | Zickell ...................... E04D 5/12 427/188 |
| 6,919,398 B1 | 7/2005 | Born et al. |
| 6,921,787 B2 | 7/2005 | Bate |
| 7,183,358 B2 | 2/2007 | Bastelberger et al. |
| 7,238,408 B2 | 7/2007 | Aschenbeck et al. |
| 7,375,152 B2 | 5/2008 | Bate |
| 7,442,270 B2 | 10/2008 | Bartek |
| 7,449,233 B2 | 11/2008 | Arora |
| 7,452,598 B2 | 11/2008 | Shiao et al. |
| 7,514,017 B2 | 4/2009 | Bhamidipati |
| 7,524,545 B2 | 4/2009 | Bany et al. |
| 7,541,059 B2 | 6/2009 | Aschenbeck et al. |
| 7,651,559 B2 | 1/2010 | Whitaker et al. |
| 7,737,057 B2 | 6/2010 | Bany et al. |
| 7,803,725 B2 | 9/2010 | Payne et al. |
| 7,805,909 B2 | 10/2010 | Teng et al. |
| 7,833,339 B2 | 11/2010 | Whitaker et al. |
| 7,977,259 B2 | 7/2011 | Ratcliff et al. |
| 8,058,342 B1 | 11/2011 | Stevens et al. |
| 8,530,034 B2 | 9/2013 | Khan et al. |
| 8,568,524 B2 | 10/2013 | Li et al. |
| 8,771,826 B2 | 7/2014 | Whitaker et al. |
| 9,259,860 B2 | 2/2016 | Kalkanoglu et al. |
| 9,446,568 B2 | 9/2016 | Larson et al. |
| 9,511,566 B2 | 12/2016 | Grube et al. |
| 9,574,350 B2 | 2/2017 | Loftus et al. |
| 9,670,677 B2 | 6/2017 | Shiao et al. |
| 9,700,915 B2 | 7/2017 | Ruda |
| 9,834,626 B2 | 12/2017 | Chisholm et al. |
| 9,850,623 B2 | 12/2017 | Krigstin et al. |
| 9,970,153 B2 * | 5/2018 | Deng ...................... D06N 5/00 |
| 10,060,132 B2 | 8/2018 | Beerer et al. |
| 10,113,314 B2 | 10/2018 | Humphreys |
| 10,458,119 B2 | 10/2019 | Grubka et al. |
| 10,584,494 B2 | 3/2020 | Wise et al. |
| 10,697,179 B2 | 6/2020 | Humphreys |
| 10,865,565 B2 | 12/2020 | Smith et al. |
| 10,865,566 B2 | 12/2020 | Smith et al. |
| 10,865,567 B2 | 12/2020 | Smith et al. |
| 11,124,968 B2 | 9/2021 | Vermilion et al. |
| 11,136,761 B2 | 10/2021 | Vermilion et al. |
| 11,359,377 B2 | 6/2022 | Smith et al. |
| 2003/0068469 A1 | 4/2003 | Aschenbeck et al. |
| 2004/0014385 A1 | 1/2004 | Greaves, Jr. et al. |
| 2004/0206035 A1 | 10/2004 | Kandalgaonkar |
| 2004/0258883 A1 | 12/2004 | Weaver |
| 2005/0072110 A1 | 4/2005 | Shiao et al. |
| 2005/0252141 A1 | 11/2005 | Kerkar et al. |
| 2005/0260910 A1 | 11/2005 | Brzozowski et al. |
| 2006/0179767 A1 | 8/2006 | Miller et al. |
| 2006/0235143 A1 | 10/2006 | Muller et al. |
| 2006/0240224 A1 | 10/2006 | Khan et al. |
| 2006/0243388 A1 | 11/2006 | Kubiak et al. |
| 2007/0049144 A1 | 3/2007 | Brzozowski et al. |
| 2007/0224135 A1 | 9/2007 | Liu et al. |
| 2007/0261337 A1 | 11/2007 | Whitaker et al. |
| 2008/0011194 A1 | 1/2008 | Mecca et al. |
| 2008/0044626 A1 | 2/2008 | Aschenbeck et al. |
| 2008/0060301 A1 | 3/2008 | Wang et al. |
| 2008/0086970 A1 | 4/2008 | Teng et al. |
| 2008/0115444 A1 | 5/2008 | Kalkanoglu et al. |
| 2008/0193778 A1 | 8/2008 | Bakir et al. |
| 2009/0220743 A1 | 9/2009 | Aschenbeck et al. |
| 2009/0249728 A1 | 10/2009 | Teng et al. |
| 2010/0005745 A1 | 1/2010 | Harrington, Jr. |
| 2010/0098912 A1 | 4/2010 | Snyder et al. |
| 2010/0151198 A1 | 6/2010 | Khan |
| 2010/0203290 A1 | 8/2010 | Whitaker et al. |
| 2010/0236178 A1 | 9/2010 | Loftus et al. |
| 2010/0291818 A1 | 11/2010 | Youn |
| 2010/0307087 A1 | 12/2010 | Zoellner |
| 2011/0072752 A1 | 3/2011 | Aschenbeck et al. |
| 2011/0139366 A1 | 6/2011 | Belt et al. |
| 2011/0257295 A1 | 10/2011 | Li et al. |
| 2011/0265407 A1 | 11/2011 | Bryson |
| 2011/0283646 A1 | 11/2011 | Vermilion et al. |
| 2012/0258282 A1 | 10/2012 | Hammond |
| 2012/0260597 A1 | 10/2012 | Jenkins et al. |
| 2012/0288678 A1 | 11/2012 | Grube et al. |
| 2012/0305171 A1 | 12/2012 | Hammond |
| 2013/0089707 A1 | 4/2013 | Faure |
| 2013/0122232 A1 | 5/2013 | Hopkins, II |
| 2013/0122769 A1 | 5/2013 | Brabbs et al. |
| 2013/0160674 A1 | 6/2013 | Hong et al. |
| 2013/0167965 A1 | 7/2013 | Cheney et al. |
| 2013/0171414 A1 | 7/2013 | Shiao et al. |
| 2014/0272402 A1 | 9/2014 | Dubey et al. |
| 2015/0175317 A1 | 6/2015 | Imai et al. |
| 2015/0239005 A1 * | 8/2015 | Humphreys ............... E04D 1/20 428/489 |
| 2015/0240495 A1 | 8/2015 | Vermilion et al. |

(56) References Cited

U.S. PATENT DOCUMENTS

| | | |
|---|---|---|
| 2015/0259919 A1 | 9/2015 | Lewis |
| 2015/0275521 A1 | 10/2015 | Bader et al. |
| 2015/0368904 A1 | 12/2015 | Humphreys |
| 2016/0186437 A1 | 6/2016 | Harrington et al. |
| 2016/0244969 A1 | 8/2016 | Beerer et al. |
| 2016/0369509 A1 | 12/2016 | Leitch et al. |
| 2017/0029649 A1 | 2/2017 | Ali et al. |
| 2017/0321423 A1 | 11/2017 | Situ-Loewenstein et al. |
| 2017/0362830 A1 | 12/2017 | Buckingham et al. |
| 2018/0051465 A1 | 2/2018 | Grubka et al. |
| 2018/0087275 A1 | 3/2018 | Canova et al. |
| 2018/0281017 A1 | 10/2018 | Humphreys et al. |
| 2018/0291629 A1 | 10/2018 | Humphreys |
| 2018/0363302 A1 | 12/2018 | Beerer et al. |
| 2019/0017273 A1 | 1/2019 | Vermilion et al. |
| 2019/0032337 A1 | 1/2019 | Sipag et al. |
| 2019/0077700 A1 | 3/2019 | Xu et al. |
| 2019/0271160 A1 | 9/2019 | Freeborg et al. |
| 2019/0277028 A1 | 9/2019 | Chevillard et al. |
| 2021/0164228 A1 | 6/2021 | Fu et al. |
| 2021/0381240 A1 | 12/2021 | Vermilion et al. |
| 2021/0381241 A1 | 12/2021 | Vermilion et al. |
| 2022/0268025 A1 | 8/2022 | Smith et al. |
| 2022/0389715 A1 | 12/2022 | Lane et al. |

FOREIGN PATENT DOCUMENTS

| | | |
|---|---|---|
| CA | 2508484 C | 7/2010 |
| CA | 2759718 A1 | 5/2013 |
| CA | 2559855 C | 5/2015 |
| CA | 2882641 A1 | 8/2015 |
| CA | 2921279 A1 | 8/2016 |
| CA | 2933050 A1 | 12/2016 |
| CA | 2923675 C | 8/2017 |
| CA | 3035791 A1 | 9/2019 |
| CA | 3044450 A1 | 1/2020 |
| CA | 3100855 A1 | 1/2020 |
| CN | 1439683 A | 9/2003 |
| CN | 200958267 Y | 10/2007 |
| CN | 203499128 U | 3/2014 |
| CN | 203654622 U | 6/2014 |
| CN | 105131765 A | 12/2015 |
| CN | 105802410 A | 7/2016 |
| CN | 107177246 A | 9/2017 |
| DE | 102007050727 A1 | 4/2008 |
| EP | 2455560 A2 | 5/2012 |
| GB | 813520 A | 5/1959 |
| GB | 1398895 A | 6/1975 |
| WO | 03031748 A2 | 4/2003 |
| WO | 03044124 A1 | 5/2003 |
| WO | 03097757 A1 | 11/2003 |
| WO | 2004050774 A2 | 6/2004 |
| WO | 2006060714 A1 | 6/2006 |
| WO | 2007078903 A1 | 7/2007 |
| WO | 2007133393 A1 | 11/2007 |
| WO | 2014038701 A1 | 3/2014 |
| WO | 2016082025 A1 | 6/2016 |
| WO | 2016210379 A1 | 12/2016 |
| WO | 2019077604 A1 | 4/2019 |
| WO | 2020006430 A1 | 1/2020 |
| WO | 2020168019 A1 | 8/2020 |

OTHER PUBLICATIONS

Splash Proof, LLC, "What is Splash Proof Nanotechnology Coating?" (2018), 2 pages, retrieved from the internet at: https://splashproofamerica.com/our-product/.

NanoSeal Tile Roof Sealant (2017-2018), 7 pages, retrieved from the internet at: http://nanoseal.com/tile-roof-coating/.

T.T Chau et al., "A review of factors that affect contact angle and implications for flotation practice," Advances in Colloid and Interface Science 150, pp. 106-115 (2009).

International Search Report and Written Opinion from PCT/US2019/039858 dated Sep. 17, 2019.

Office Action from KR Application No. 10-2021-7000924 dated Dec. 1, 2023.

Office Action from KR Application No. 10-2021-7000924 dated May 24, 2024.

* cited by examiner

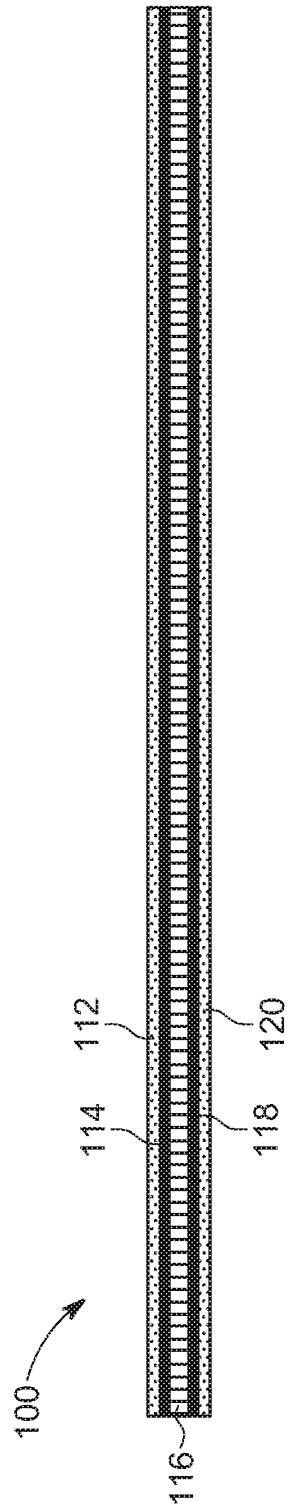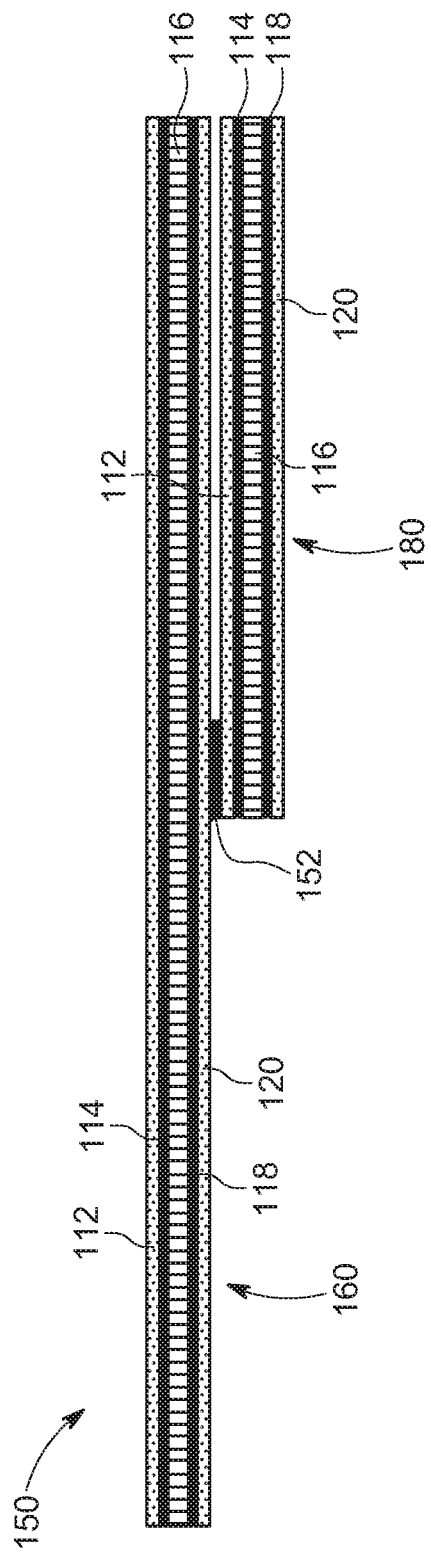

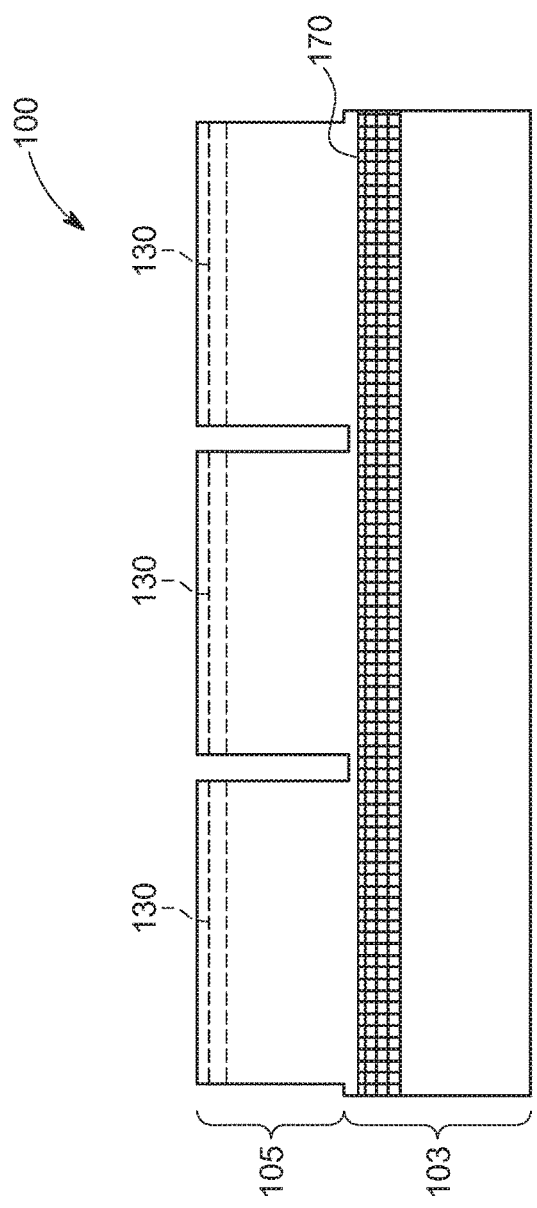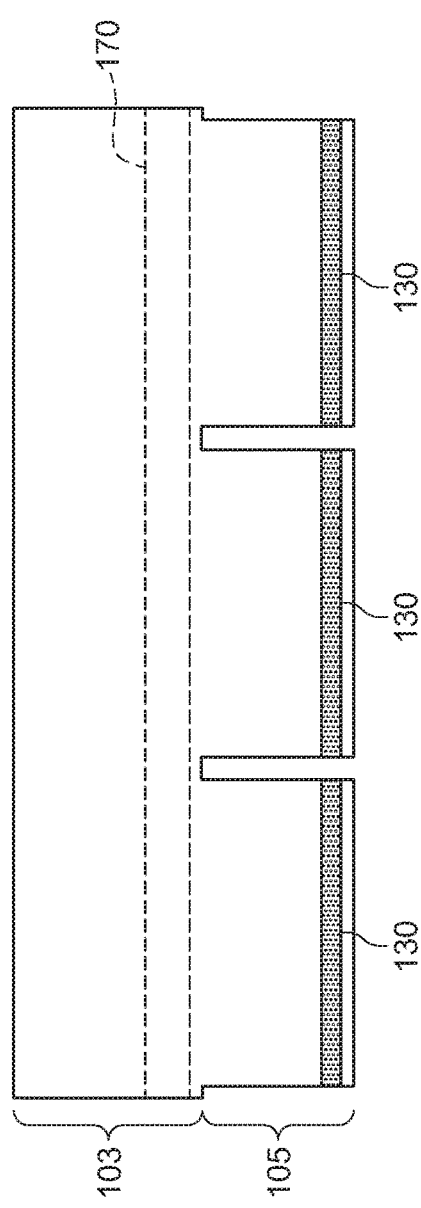

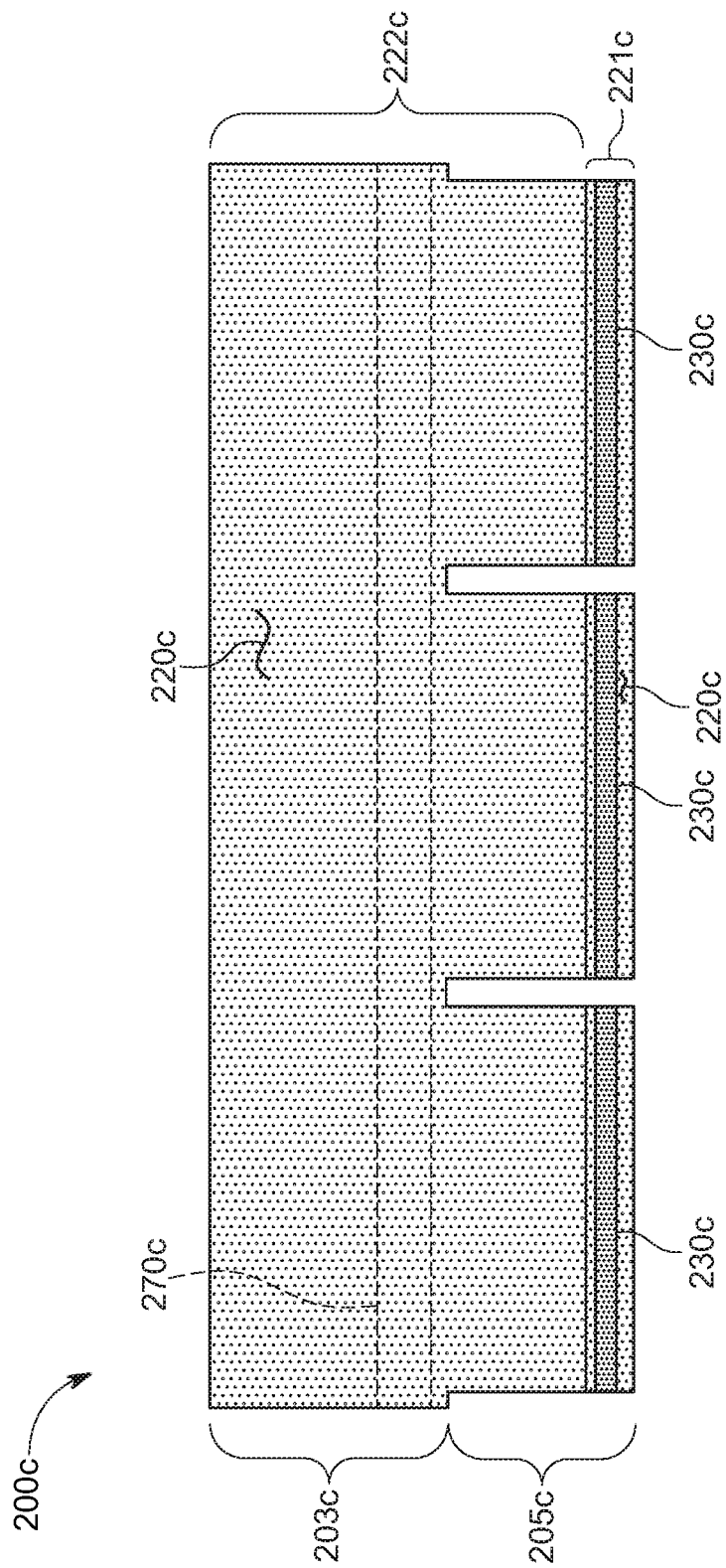

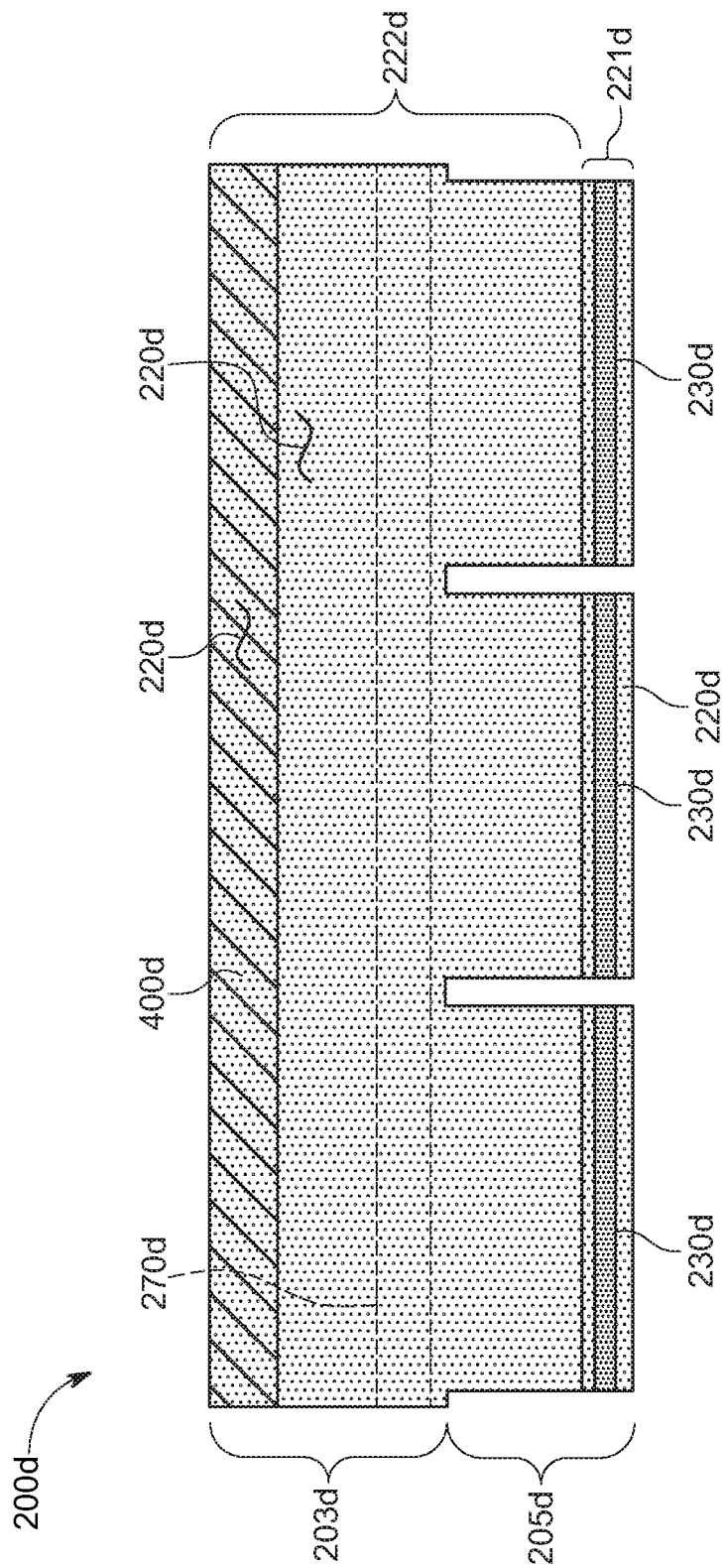

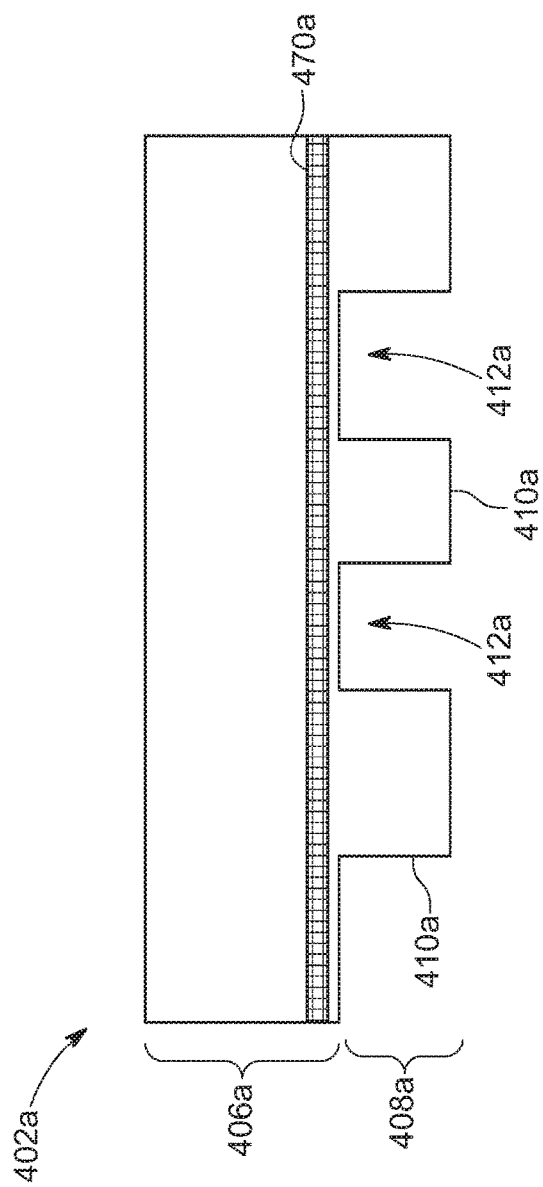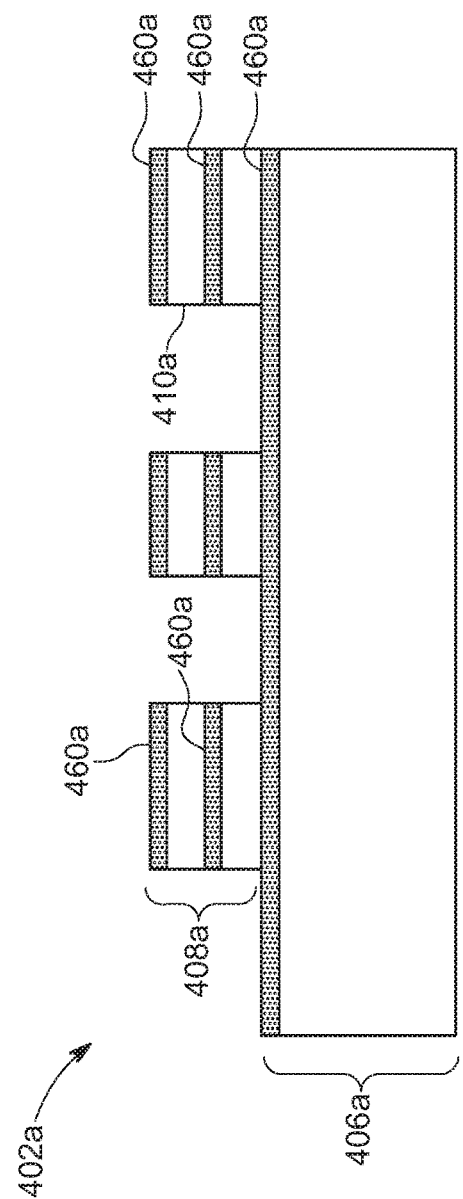

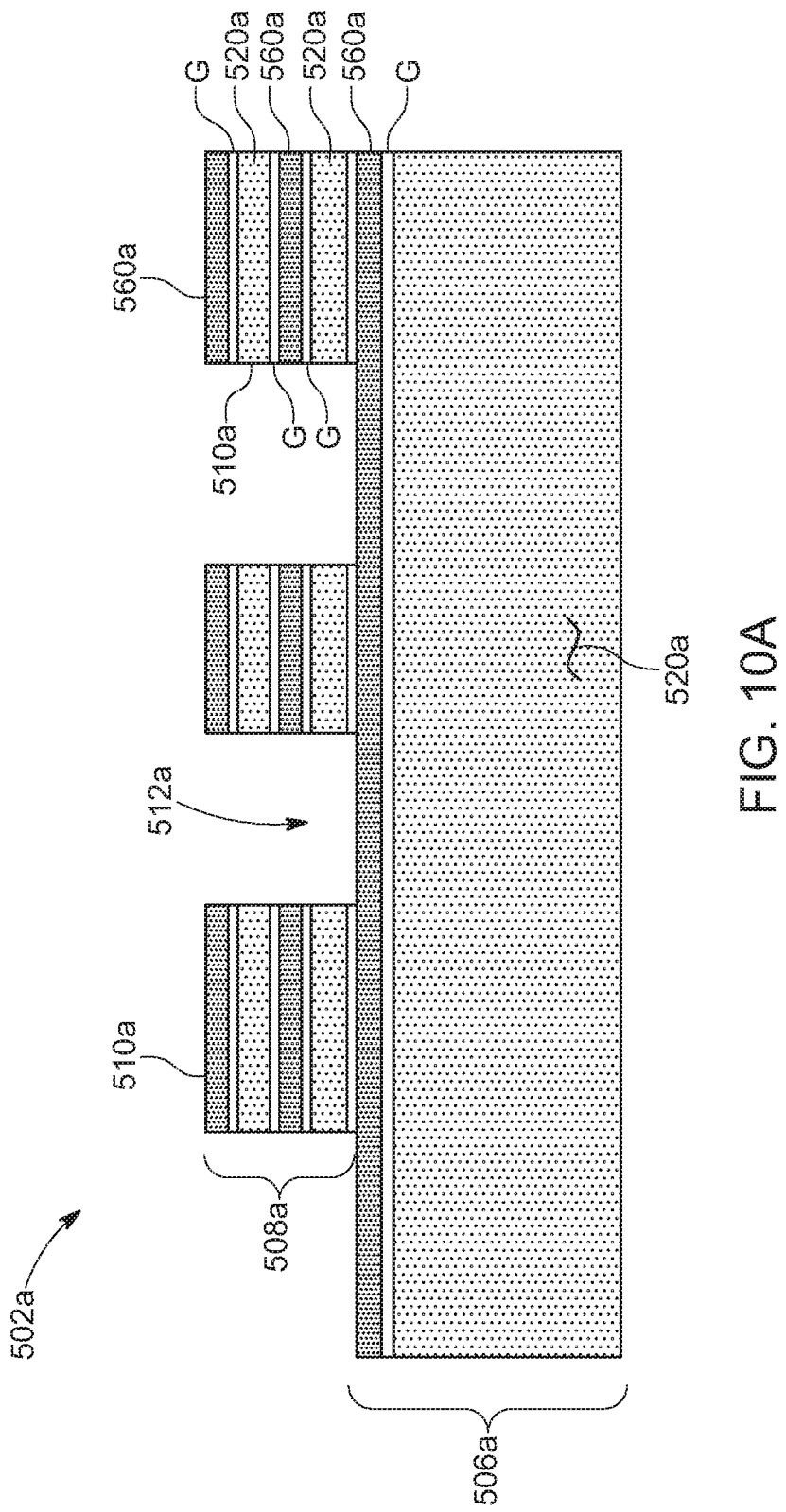

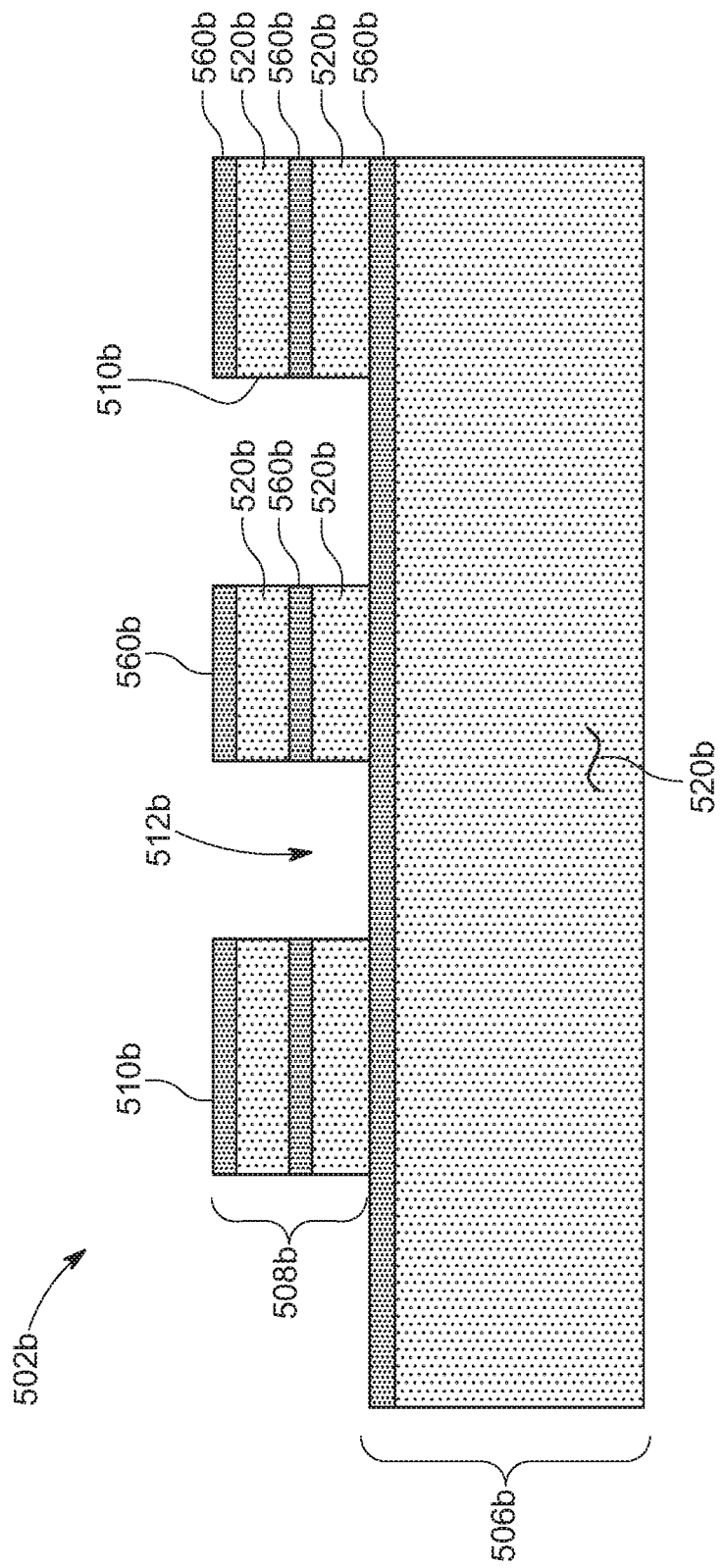

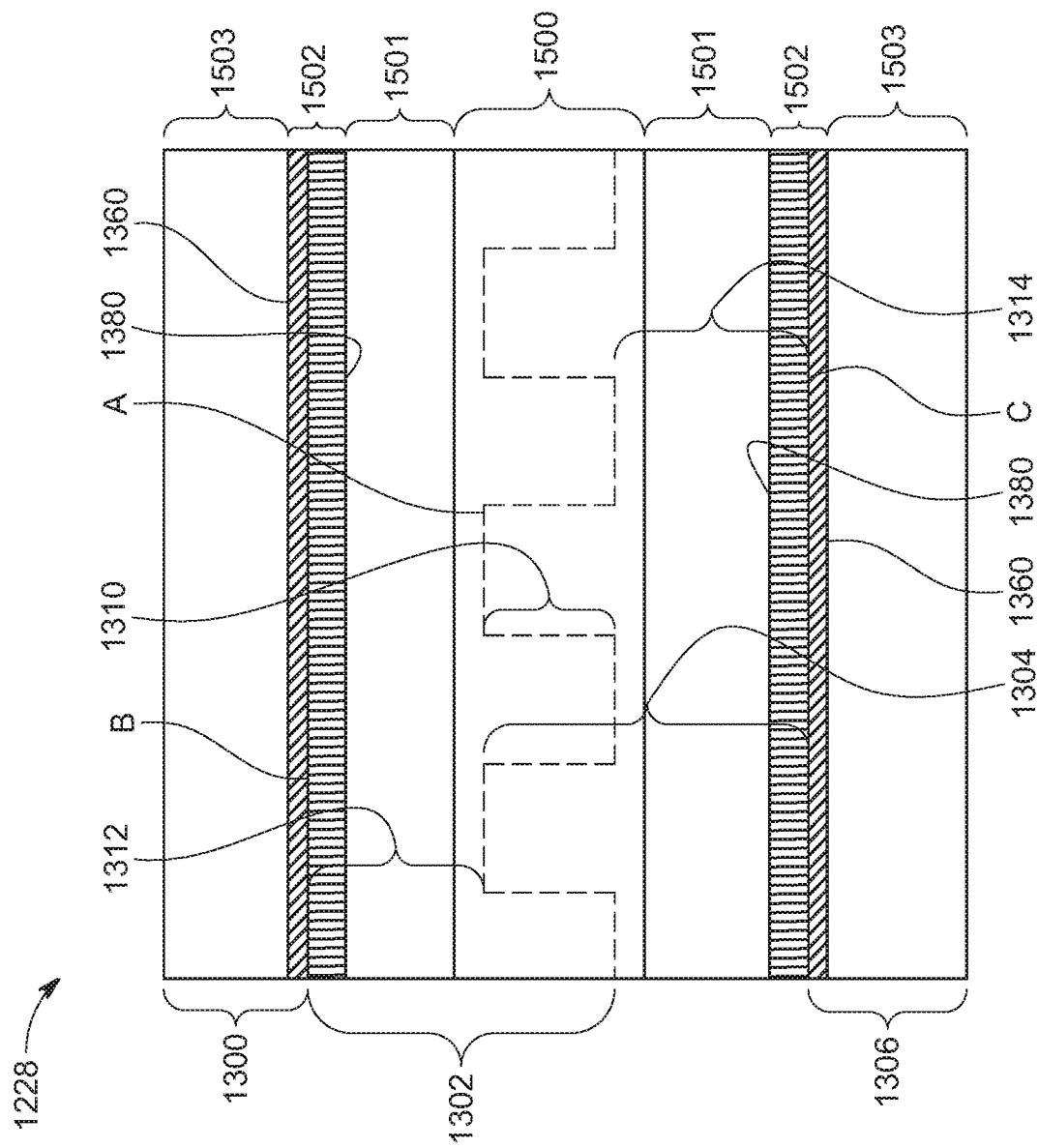

ROOFING MATERIALS INCLUDING A PARTING AGENT LAYER

CROSS-REFERENCE TO RELATED APPLICATIONS

This application is the U.S. national stage entry of PCT/US2019/039858, filed Jun. 28, 2019, which claims priority to and the benefit of U.S. Provisional Patent Application No. 62/692,114, filed Jun. 29, 2018, the entire contents of which are incorporated by reference herein.

FIELD

The present disclosure relates to roofing materials. In particular, the present disclosure relates to roofing materials, such as shingles, that include a layer of a parting agent.

BACKGROUND

Asphalt-based roofing materials, such as roofing shingles and roll roofing, are installed on the roofs of buildings to provide protection from the elements and in some instances to give the roof an aesthetically pleasing look. Typically, the roofing material is constructed of a substrate, such as a glass fiber mat or an organic felt, an asphalt coating on the substrate, a decorative/protective layer of granules applied to the asphalt coating on a top face of the substrate, and a layer of sand or other particulate matter (often referred to as "backdust") applied to the asphalt coating on a bottom face of the substrate.

Certain roofing materials, such as shingles, are typically installed in an overlapping fashion. A portion of the face of a first shingle is covered when a second shingle is installed over it. However, granules are installed across the entire top face of the shingle. Due to how shingles are installed on a roof, a portion of the granules will be hidden or unexposed. When installed, a portion of the face of the first shingle is covered by the second shingle, overlapping the first shingle, causing a portion of the granules on the first shingle to be hidden or covered. While not visible the unexposed granules still contribute to manufacturing costs and increase the weight of the shingle.

Backdust comprises solid particles applied during the manufacturing process to prevent instances of the roofing material from sticking to equipment during production, as well as to prevent the roofing material from sticking together when packaged. The backdust material is typically a particulate material such as sand, talc, or mica. The backdust material is abrasive to manufacturing equipment and generally accelerates wear and tear thereof. The amount of backdust applied to the roofing material is difficult to control such that more backdust than necessary is often applied, which can lead to increased amounts of loose particulate in the roofing material packaging and waste.

Accordingly, there is an unmet need in the art for roofing materials that overcome one or more of the aforementioned deficiencies.

SUMMARY

Disclosed herein are asphalt-based roofing materials that are free of backdust and include a parting material layer resulting from a liquid-applied parting agent. To illustrate various aspects of the present disclosure, several exemplary embodiments of asphalt-based roofing materials are provided.

In one exemplary embodiment, a shingle is provided that includes at least one asphalt-coated substrate defining a headlap portion and a tab portion each having opposed top and bottom surfaces. A layer of parting material is applied to at least a portion of the bottom surface of the headlap portion and to at least a portion of the bottom surface of the tab portion. The layer of parting material comprises at least one of a metal salt of a fatty acid, a polyolefin, and a crosslinkable silane. An adhesive is applied to at least a portion of the bottom surface of the tab portion.

In certain embodiments, the metal salt of a fatty acid comprises at least one of a metal stearate, a metal laurate, a metal myristate, a metal palmitate, and combinations thereof. In certain embodiments, the metal salt of a fatty acid includes a metal stearate. In certain embodiments, the metal stearate is selected from the group consisting of zinc stearate, calcium stearate, aluminum stearate, magnesium stearate, and combinations thereof.

In certain embodiments, the layer of parting material is separated from the adhesive by a gap of 0.0625 inches to 1 inch. In certain embodiments, the layer of parting material abuts the adhesive. In certain embodiments, the layer of parting material at least partially overlaps with the adhesive. In certain embodiments, the adhesive is applied onto the layer of parting material and a thickness of the layer of parting material that overlaps with the adhesive is less than a thickness of the layer of parting material that does not overlap with the adhesive. In certain embodiments, the adhesive is applied onto the layer of parting material and an area weight of the layer of parting material that overlaps with the adhesive is less than an area weight of the layer of parting material that does not overlap with the adhesive.

In certain embodiments, the shingle comprises a second layer of parting material applied to at least a portion of the top surface of the headlap portion.

In certain embodiments, the shingle comprises a second asphalt-coated substrate having opposed top and bottom surfaces, wherein the top surface of the second asphalt-coated substrate is attached to the bottom surface of at least one other asphalt-coated substrate.

In another exemplary embodiment, a shingle is provided that includes at least one asphalt-coated substrate defining a headlap portion and a tab portion each having opposed top and bottom surfaces; a layer of parting material applied to at least a portion of the top surface of the headlap portion; and a layer of granules embedded in at least a portion of the top surface of the tab portion; wherein the layer of parting material comprises at least one of a metal salt of a fatty acid, a polyolefin, and a crosslinkable silane.

In certain embodiments, the metal salt of a fatty acid is selected from the group consisting of metal laurates, metal myristates, metal palmitates, metal stearates, and combinations thereof. In certain embodiments, the metal salt of a fatty acid includes a metal stearate. In certain embodiments, the metal stearate is selected from the group consisting of zinc stearate, calcium stearate, aluminum stearate, magnesium stearate, and combinations thereof.

In certain embodiments, the shingle includes an adhesive applied to at least a portion of the bottom surface of the tab portion.

In certain embodiments, the shingle includes a second asphalt-coated substrate having opposed top and bottom surfaces, wherein the top surface of the second asphalt-coated substrate is attached to the bottom surface of at least one other asphalt-coated substrate.

In certain embodiments, the shingle includes a layer of backdust applied to at least a portion of the bottom surface of the tab portion, bottom surface of headlap portion, or the bottom surface of tab portion and the bottom surface of headlap portion.

In certain embodiments, the layer of parting material covers at least 30% of the top surface of the headlap portion.

In certain embodiments, the layer of parting material covers at least 90% of the top surface of the headlap portion.

In certain embodiments the layer of parting material covers all of the headlap portion.

BRIEF DESCRIPTION OF THE DRAWINGS

FIG. 1 is a side elevational view of a single layer tabbed shingle;

FIG. 1A is a top plan view of the single layer tabbed shingle of FIG. 1;

FIG. 1B is a bottom plan view of the single layer tabbed shingle of FIG. 1;

FIG. 2 is a side elevational view of a laminated shingle;

FIG. 4 is a bottom plan view of an exemplary embodiment of a shingle of the present disclosure;

FIG. 4A is a bottom plan view of an exemplary embodiment of a shingle of the present disclosure;

FIG. 9A is a top plan view of an overlay sheet of a laminated shingle according to an exemplary embodiment;

FIG. 9B is a bottom plan view of the overlay sheet of the laminated shingle;

FIG. 10A is a bottom plan view of an exemplary embodiment of an overlay sheet of a laminated shingle of the present disclosure;

FIG. 10B is a bottom plan view of an exemplary embodiment of an overlay sheet of a laminated shingle of the present disclosure;

FIG. 15a is a bottom plan view of a portion of an asphalt coated sheet produced by the apparatus of FIG. 13;

DETAILED DESCRIPTION

Figure 2A:
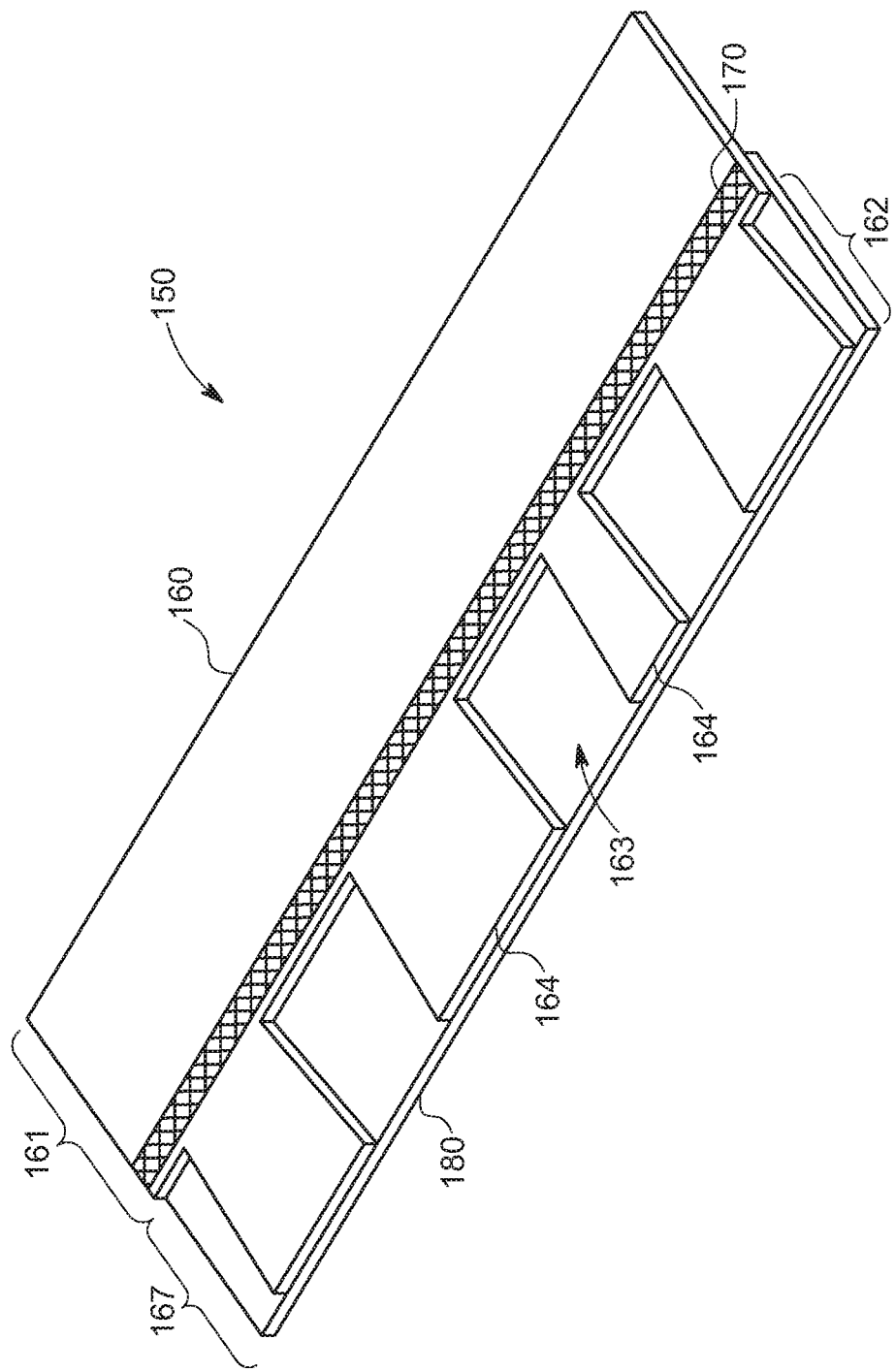
FIG. 2A is a top perspective view of the laminated shingle of FIG. 2.

The general inventive concepts will now be described with occasional reference to the illustrated embodiments thereof. The general inventive concepts may, however, be embodied in different forms and should not be construed as limited to the embodiments set forth herein, nor in any order of preference. Rather, the embodiments are provided so that this disclosure will be more thorough, and will convey the scope of the general inventive concepts to those skilled in the art.

Unless otherwise defined, all technical and scientific terms used herein have the same meaning as commonly understood by one of ordinary skill in the art to which this invention belongs. The terminology used in the description is for describing particular embodiments only and is not intended to be limiting of the general inventive concepts. As used in the description and the appended claims, the singular forms "a," "an," and "the" are intended to include the plural forms as well, unless the context clearly indicates otherwise.

Unless otherwise indicated, all numerical values as used in the description and claims are to be understood as being modified in all instances by the term "about." Accordingly, unless otherwise indicated, the numerical values set forth in the description and claims are approximations that may vary depending on the desired properties sought to be obtained in embodiments of the present disclosure. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In the exemplary embodiments described herein, the general inventive concepts are discussed with respect to roofing shingles. However, it should be understood that the general inventive concepts may also apply to any type of roofing material, such as, for example, asphalt-based roll roofing.

As illustrated in FIGS. 1, 1A, and 1B, a single layer tabbed shingle 100 generally comprises a substrate 116 that is infiltrated with asphalt forming a first asphalt coating 114 on the top surface of the substrate and a second asphalt coating 118 on the bottom surface of the substrate 116. The shingle 100 has a headlap portion 103 and a slotted or discontinuous tab portion 105. The shingle 100 also generally comprises a surface layer of granules 112 embedded in the first asphalt coating 114 and a backdust layer of particles 120 embedded in the second asphalt coating 118. The first asphalt coating 114 is positioned above the substrate 116 when the shingles are installed on a roof and the second asphalt coating 118 is positioned below the substrate when the shingles are installed on the roof.

Figure 2B:
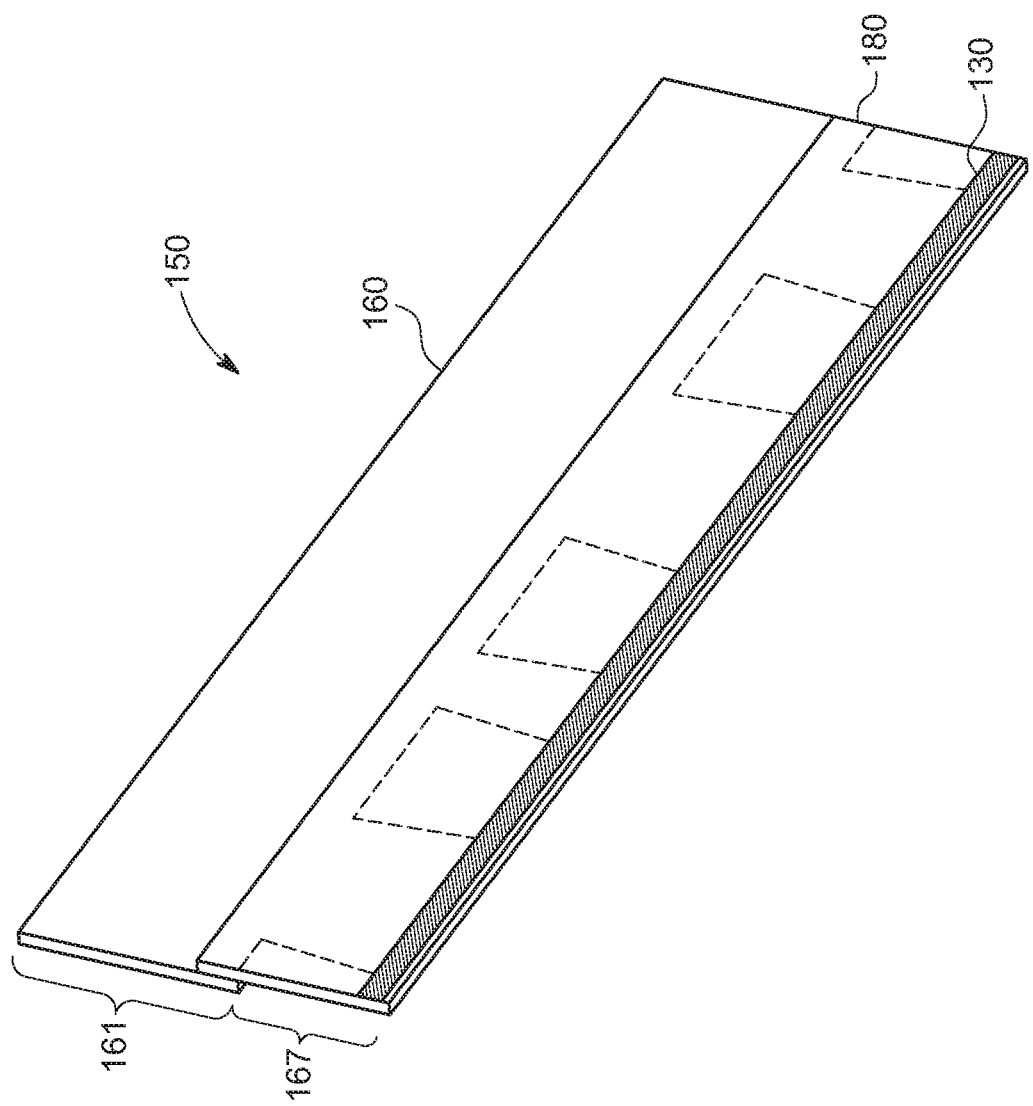
FIG. 2B is a bottom perspective view of the laminated shingle of FIG. 2.

A shingle may also comprise one or more sheets laminated together to form a laminated shingle. For example, as illustrated in FIGS. 2, 2A, and 2B, a laminated shingle 150 comprises an upper or overlay sheet 160 having a headlap portion 161 and a tabbed portion 162 attached to an upper surface of a lower or underlay sheet 180 to define a tab portion 167 of the laminated shingle 150. The overlay sheet 160 extends the full width of the shingle 150 and includes cutouts 163 defining tabs 164 on a front tab portion 167 of the shingle 150. Similar to the shingle 100, the overlay sheet 160 and the underlay sheet 180 each comprise a substrate 116, a first asphalt coating 114 on the top surface of the substrate, a surface layer of granules 112 embedded in the first asphalt coating 114, a second asphalt coating 118 on the bottom surface of the substrate, and a backdust layer of particles 120 embedded in the second asphalt coating 118.

The substrate of the shingle can be any type known for use in reinforcing asphalt-based roofing materials, such as a web, scrim or felt of fibrous materials such as mineral fibers, cellulose fibers, rag fibers, mixtures of mineral and synthetic fibers, or the like. Combinations of materials can also be used in the substrate. In certain embodiments, the substrate is a nonwoven web of glass fibers. The substrate may be any conventional substrate used in asphalt shingles, roll roofing, low-slope membranes, and the like.

The asphalt coatings are generally formed from a layer of hot, melted asphalt applied to the substrate. The asphalt coating can be applied to the substrate in any suitable manner. For example, the substrate can be submerged in the asphalt or the asphalt can be rolled on, sprayed on, or applied to the substrate by other means. The asphalt coating may also be any type of bituminous material suitable for use on a roofing material, such as asphalts, tars, pitches, or mixtures thereof. The asphalt can be either a manufactured asphalt produced by refining petroleum or a naturally occurring asphalt. The asphalt coating can include various additives and/or modifiers, such as inorganic fillers or mineral stabilizers, organic materials such as polymers, recycled streams, ground tire rubber, carbon black, wax, and so forth. In certain embodiments, the asphalt coatings comprise asphalt and inorganic fillers or mineral stabilizers. The asphalt coatings may be any conventional asphalt used in shingles, and can be applied in any conventional manner and in any conventional amount or thickness.

The granules are generally deposited onto the asphalt coating after the asphalt coating is applied to the substrate. The shingles may be passed through rollers to further embed the granules into the asphalt coating. The granules may comprise a variety of different materials. The granules may be ceramic roofing grade granules that are made in any known or conventional manner. Any type of roofing granule may be used. The granules may comprise a variety of different particle sizes and colors. Further, a variety of different granules may be blended together, for example to provide different color blends or to provide the appearance of varying thickness to the shingle.

The layer of backdust particles is generally deposited onto the asphalt coating after the asphalt coating is applied to the substrate. The shingles may be passed through rollers to further embed the backdust particles into the asphalt coating. As mentioned above, the backdust material is typically a particulate material. Exemplary materials for use as backdust include, but are not limited to, sand, talc, mica, calcium carbonate, ground recycled glass, quartz, feldspar, dolomite, coal slag, and other common inorganic materials. The backdust may comprise a variety of different particle sizes. For example, the backdust particles may have an average particle size in the range of 20 μm to 1,000 μm, 60 μm to 600 μm, 100 μm to 400 μm, or 100 μm to 300 μm.

One or more portions of the shingle may optionally comprise a reinforcement layer 170, as illustrated in FIGS. 1A and 2A. In certain embodiments, the reinforcement layer 170 may be attached to the asphalt coating, such as by the adhesive mixture of the asphalt coating or other adhesives. In certain embodiments, the reinforcement layer 170 may be a polymeric layer formed from, for example, a polyester, polyolefin (e.g., polypropylene, polyethylene), or the like. However, the reinforcement layer 170 may be formed from other materials, such as, for example, paper, film, scrim material, and woven or non-woven glass.

For example, in certain embodiments, the shingle may include a reinforcement layer 170 comprising strip of woven polyester material applied to the surface of the shingle after application of the asphalt coating, such that the asphalt material penetrates the strip between the woven fibers of the polyester fabric, to embed the strip of material in the base asphaltic layer and secure the strip to the shingle. The polyester strip may be applied prior to the granule coating of the shingle, and the granules may not adhere to the strip-covered portion of the shingle. The strip of polyester material may, for example, define a shingle nail zone and provide reinforcement for the nailed portion of the shingle.

As seen in FIG. 1B, the shingle 100 includes an adhesive 130 applied to a lower surface of the tab portion 105 of the shingle 100. Similar to shingle 100, the laminated shingle 150 shown in FIG. 2B includes an adhesive 130 applied to a lower surface of the tab portion 167 of the shingle 150. The adhesive 130 may be any type of adhesive suitable for use in roofing materials. For example, the adhesive 130 may be a heat sensitive adhesive including, but not limited to, a filled asphalt adhesive and a polymer modified asphalt adhesive. The adhesive 130 adheres the tab portions 105, 167 of an upper course of shingles on a roof to the headlap portions 103, 161 of a lower course of shingles on the roof. The resulting adhesive bond helps prevent wind uplift of the shingles on the roof.

Certain embodiments are based, at least in part, on shingles that include a layer of liquid-applied parting agent on one or more sides of the shingle. Shingles that include the layer of liquid-applied parting agent, which may also be referred to as the parting agent layer, may include a parting agent layer on the top of the shingle, the bottom of the shingle, or both the top and the bottom of the shingle. Shingles that include a parting agent layer may be formed as a single layer tabbed shingle, as described above with respect to FIGS. 1, 1A, and 1B, or as a laminated shingle, as described above with respect to FIGS. 2, 2A, and 2B.

In accordance with the present disclosure, a shingle may include a layer of liquid-applied parting agent instead of the conventional backdust layer. In these or other embodiments, the shingles may be free of backdust. Eliminating the backdust layer and replacing it with a layer of liquid-applied parting agent provides a number of advantages. For example, eliminating the abrasive backdust can reduce the rate of wear and tear experienced by the manufacturing equipment. Eliminating the backdust also reduces the weight of the shingles, which can reduce the costs associated with shipping the shingles. In addition, eliminating the backdust can also decrease the amount of loose particulate in the roofing material packaging/bundles.

In one or more embodiments, a shingle may include a layer of liquid-applied parting agent instead of a portion of the embedded granules in the asphalt coating. In these or other embodiments, the headlap portion on the top surface of the shingle may include a layer of the liquid-applied parting agent instead of granules. Replacing a portion of granules with a layer of liquid-applied parting agent provides a number of advantages. For example, eliminating the portion of the granules can reduce the cost of producing each shingle. Eliminating a portion of the granules also reduces the weight of the shingles, which can reduce the costs associated with shipping the shingles.

The liquid-applied parting agent of the present disclosure generally comprises a carrier and a parting material dispersed in the carrier. Suitable carriers for the liquid-applied parting agent of the present disclosure include, but are not limited to, water, a wax, an oil, and asphalt. The parting material for the liquid-applied parting agent of the present disclosure may be a polymer (e.g., a polyolefin), a crosslinkable silane (e.g., methyltriethoxysilane, methyltrimethoxysilane, octyltriethoxysilane), a metal salt of a fatty acid, and combinations thereof. In one or more embodiments, the liquid-applied parting agent may include additional components, such as, for example defoamers, fillers, and surfactants. Exemplary fillers include limestone. Exemplary defoamers include ethoxylates of alcohols, such as fatty alcohol ethoxylate defoamers.

The amount of parting material and carrier in the liquid-applied parting agent vary. In certain embodiments, the liquid-applied parting agent comprises from 1% to 40% by weight parting material and from 60% to 99% by weight carrier. In certain embodiments, the liquid-applied parting agent comprises from 5% to 40% by weight parting material and from 60% to 95% by weight carrier. In certain embodiments, the liquid-applied parting agent comprises from 10% to 40% by weight parting material and from 60% to 90% by weight carrier. In certain embodiments, the liquid-applied parting agent comprises from 20% to 40% by weight parting material and from 60% to 80% by weight carrier. In certain embodiments, the liquid-applied parting agent comprises from 1% to 20% by weight parting material and from 80% to 99% by weight carrier. In certain embodiments, the liquid-applied parting agent comprises from 3% to 15% by weight parting material and from 85% to 97% by weight carrier. In certain embodiments, the liquid-applied parting agent comprises from 3% to 10% by weight parting material and from 90% to 97% by weight carrier.

Metal salts of fatty acids, which may sometimes be referred to as metal soaps, include those compounds that have a saturated or unsaturated residue of a fatty acid and a metal atom. Suitable metal salts of fatty acids may have linear carbon chain that includes from 12 to 22 carbon atoms, and in other embodiments from 14 to 18 carbons atoms.

In certain embodiments, the metal salt of a fatty acid may include a saturated fatty acid. Suitable metal salts of saturated fatty acids include, but are not limited to, metal laurates, metal myristates, metal palmitates, and metal stearates. Exemplary metal laurates include, but are not limited to, zinc laurate, calcium laurate, aluminum laurate, and magnesium laurate. Exemplary metal myristates include, but are not limited to, zinc myristate, calcium myristate, aluminum myristate, and magnesium myristate. Exemplary metal palmitates include, but are not limited to, zinc palmitate, calcium palmitate, aluminum palmitate, and magnesium palmitate. Exemplary metal stearates include, but are not limited to, zinc stearate, calcium stearate, aluminum stearate, and magnesium stearate.

In certain embodiments, the liquid-applied parting agent comprises a metal salt of a fatty acid dispersed in water or another carrier. In certain embodiments, the liquid-applied parting agent comprises a metal salt of a fatty acid selected from of the group consisting of metal stearates, metal laurates, metal myristates, metal palmitates, and combinations thereof dispersed in the water or other carrier. In certain embodiments, the liquid-applied parting agent comprises water and a metal stearate dispersed in water or another carrier. In certain embodiments, the liquid-applied parting agent comprises zinc stearate dispersed in water or another carrier. In certain embodiments, the liquid-applied parting agent comprises calcium stearate dispersed in water or another carrier. In certain embodiments, the liquid-applied parting agent comprises aluminum stearate dispersed in water or another carrier. In certain embodiments, the liquid-applied parting agent comprises magnesium stearate dispersed in water or another carrier. The amount of metal stearate in the liquid-applied parting agent can vary. In certain embodiments, the liquid-applied parting agent comprises from 1% to 40% by weight metal stearate and from 60% to 99% by weight carrier. In certain embodiments, the liquid-applied parting agent comprises from 5% to 35% by weight metal stearate and from 65% to 95% by weight carrier. In certain embodiments, the liquid-applied parting agent comprises from 10% to 30% by weight metal stearate and from 70% to 90% by weight carrier. In certain embodiments, the liquid-applied parting agent comprises from 15% to 25% by weight metal stearate and from 75% to 85% by weight carrier.

In one or more embodiments, where the liquid applied parting agent includes a polyolefin or other polymers, the liquid applied parting agent may be applied as a suspension or an emulsion. Exemplary polyolefins include, but are not limited to, polyethylene and polypropylene.

In one or more embodiments, the polyolefin may be characterized by a glass transition temperature ("Tg"). In one or more embodiments, where the liquid-applied parting agent is applied to a hot asphalt surface, the Tg of the polyolefin may be less than the surface temperature of the asphalt. In one or more embodiments, the Tg may be less than 230° C., in other embodiments less than 200° C., an in other embodiments less than 180° C. In one or more embodiments, the Tg may be in the range of 50° C. to 230° C., in other embodiments in the range of 60° C. to 200° C., in other embodiments in the range of 70° C. to 180° C., in other embodiments in the range of 80° C. to 160° C., and in other embodiments in the range of 90° C. to 150° C.

In certain embodiments, the liquid-applied parting agent comprises a polyolefin dispersed in water or another carrier. In certain embodiments, the liquid-applied parting agent comprises polyethylene dispersed in water or another carrier. In certain embodiments, the liquid-applied parting agent comprises polypropylene dispersed in water or another carrier. The amount of polyolefin in the liquid-applied parting agent can vary. In certain embodiments, the liquid-applied parting agent comprises from 3% to 10% by weight polyolefin, and from 90% to 97% by weight carrier.

In certain embodiments, the liquid-applied parting agent comprises a crosslinkable silane dispersed in water or another carrier. In certain embodiments, the crosslinkable silane utilized as the parting material of the liquid-applied parting agent comprises at least one of methyltriethoxysilane, methyltrimethoxysilane, and octyltriethoxysilane. In certain embodiments, the liquid-applied parting agent comprises methyltriethoxysilane dispersed in water or another carrier. In certain embodiments, the liquid-applied parting agent comprises from 1% to 40% by weight crosslinkable silane and from 60% to 99% by weight carrier. In certain embodiments, the liquid-applied parting agent comprises from 5% to 35% by weight crosslinkable silane and from 65% to 95% by weight carrier. In certain embodiments, the liquid-applied parting agent comprises from 10% to 30% by weight crosslinkable silane and from 70% to 90% by weight carrier. In certain embodiments, the liquid-applied parting agent comprises from 15% to 25% by weight crosslinkable silane and from 75% to 85% by weight carrier.

The liquid-applied parting agent may be applied to the shingle using a variety of application methods. For example, the liquid-applied parting agent may be applied to the shingle by spraying, roll coating, flood coating, reverse roll coating, or another suitable application method.

When the liquid-applied parting agent is applied to the shingle during the manufacturing process, a layer of the parting material is formed on the shingle. For example, when a liquid-applied parting agent that comprises water as a carrier is applied to the hot asphalt coating of the shingle, the water in the liquid-applied parting agent flashes off or otherwise vaporizes, leaving a residual layer of parting material on the asphalt coating of the shingle. For liquid-applied parting agents that comprise a wax, an oil, or asphalt as the carrier, the carrier tends to be absorbed by or penetrate into the hot asphalt coating of the shingle, leaving a residual layer of parting material on the asphalt coating of the shingle.

The layer of parting material may be described by the mass of the parting agent applied per square meter on a dry basis. In certain embodiments, the amount of parting agent is at least $0.0015$ kg/m$^2$. In certain embodiments, the amount of parting agent is $0.0015$ kg/m$^2$ to 3 kg/m$^2$. In certain embodiments, the amount of parting agent is $0.0015$ kg/m$^2$ to 2 kg/m$^2$, including $0.0015$ kg/m$^2$ to 1 kg/m$^2$, $0.0015$ kg/m$^2$ to $0.5$ kg/m$^2$, $0.0015$ kg/m$^2$ to $0.1$ kg/m$^2$, $0.0015$ kg/m$^2$ to $0.075$ kg/m$^2$, and also including $0.0015$ kg/m$^2$ to $0.05$ kg/m$^2$. In certain embodiments, the amount of parting agent is $0.0015$ kg/m$^2$ to $0.04$ kg/m$^2$, including $0.0015$ kg/m$^2$ to $0.03$ kg/m$^2$, $0.0015$ kg/m$^2$ to $0.01$ kg/m$^2$, $0.0015$ kg/m$^2$ to $0.0075$ kg/m$^2$, $0.0015$ kg/m$^2$ to $0.005$ kg/m$^2$, and also including $0.0015$ kg/m$^2$ to $0.0025$ kg/m$^2$. In other embodiments, the amount of parting agent is greater than $0.2$ kg/m$^2$, in other embodiments greater than $0.25$ kg/m$^2$, in other embodiments greater than $0.3$ kg/m$^2$, and in other embodiments greater than $0.5$ kg/m$^2$. In certain embodiments, the amount of parting agent may be less than $3.0$ kg/m$^2$, in other embodiments less than $2.5$ kg/m$^2$, in other embodiments less than $2.0$ kg/m$^2$, in other embodiments less than $1.5$ kg/m$^2$, and in other embodiments less than $1.0$ kg/m$^2$.

In certain embodiments, a single side of the shingle (the top and/or the bottom) may have a first layer of parting material and a second layer of parting material. In these or other embodiments the mass of the parting agent per square meter in the first layer of parting material may greater than the mass of the parting agent in the second layer of parting material. The mass of the first layer of parting material may be higher than the second layer of parting material, for example, through the use of a higher amount of the liquid-applied parting agent or through multiple layers of the liquid-applied parting agent. In certain embodiments, the first layer of parting material has a mass per square meter that is 5% higher, in other embodiments 10% higher, in other embodiments 25% higher, in other embodiments 50% higher, in other embodiments 75% higher, in other embodiments 150% higher, and in other embodiments 200% higher than the mass per square meter of the second layer of parting material.

As indicated above, the liquid-applied parting agent may be applied to the bottom of the shingle.

Figure 3A:
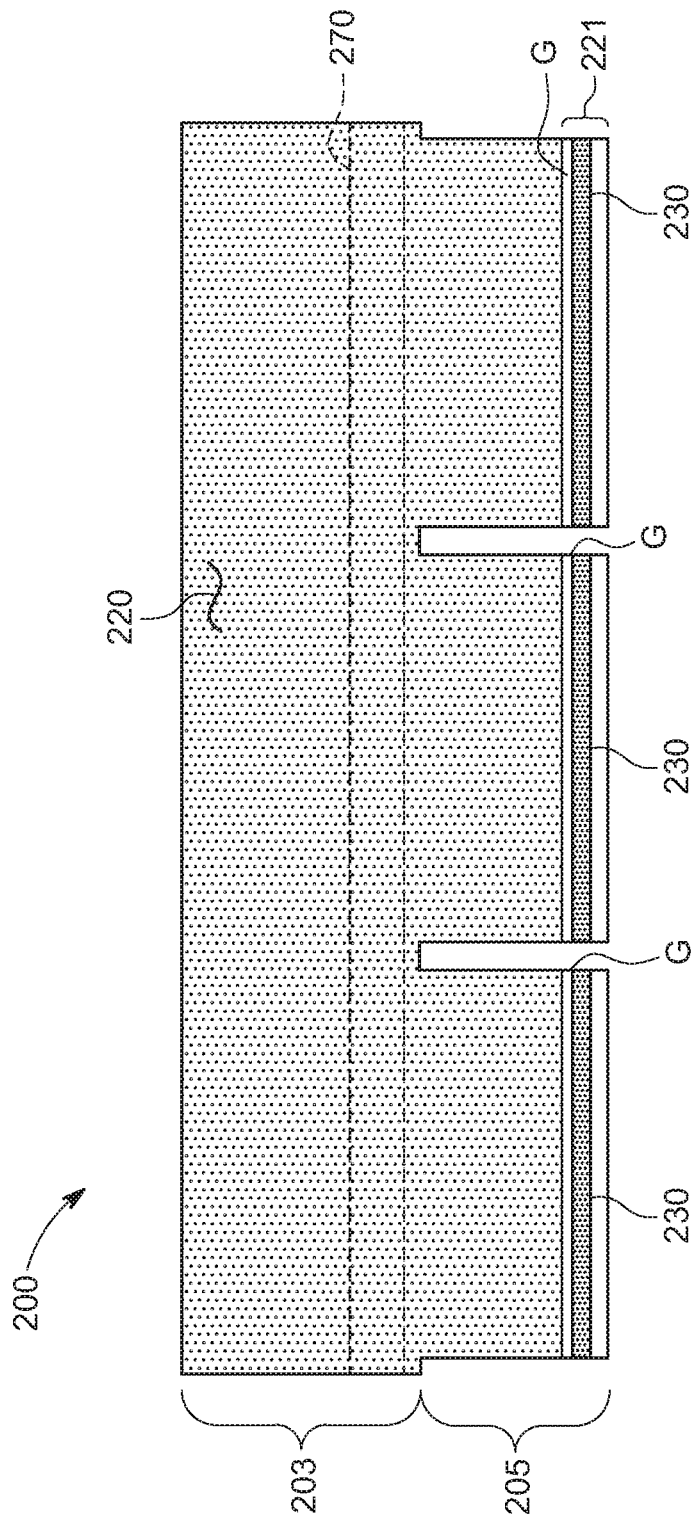
FIG. 3A is a bottom plan view of an exemplary embodiment of a shingle of the present disclosure.

Referring now to FIG. 3A, a bottom view of an exemplary single layer tabbed shingle 200 of the present disclosure is shown. The shingle 200 is similar to the single layer tabbed shingle 100 shown in FIGS. 1, 1A, and 1B, but includes a layer of parting material 220 instead of a backdust layer of particles. The shingle 200 includes a substrate that is infiltrated with asphalt forming a first asphalt coating on the top surface of the substrate and a second asphalt coating on the bottom surface of the substrate, and a surface layer of granules embedded in (and, optionally, a layer of parting material on) the first asphalt coating. The shingle 200 has a headlap portion 203, a slotted or discontinuous tab portion 205, and an adhesive 230 applied to a bottom surface of the tab portion 205 of the shingle 200. Although the adhesive 230 is shown as a continuous strip on each tab of the shingle 200, the adhesive 230 may be applied in various forms and configurations including, but not limited to, dots, discontinuous segments, or combinations thereof. The shingle 200 may also include a reinforcement layer 270 (shown in phantom) as previously described.

In the embodiment illustrated in FIG. 3A, the layer of parting material 220 is applied to the asphalt coating on the bottom surface of the shingle 200 both at the headlap portion 203 and at the tab portion 205. As shown in FIG. 3A, the layer of parting material 220 is separated from the adhesive 230 by a gap G. Such a gap G ensures that the layer of parting material 220 does not interfere with the application or the functioning of the adhesive 230. The gap G between the layer of parting material 220 and the adhesive 230 may be from 0.0625 inches to 1 inch, including from 0.0625 inches to 0.75 inches, from 0.125 inches to 0.75 inches, and also including from 0.25 inches to 0.5 inches.

Still referring to FIG. 3A, different amounts, thicknesses and/or concentrations of parting material can be applied to different areas of the back of the shingle. For example, a lower thickness, amount, and/or concentration of parting material can be applied in the area 221 before the adhesive 230 is applied to the shingle. The amount, thickness, and/or concentration is sufficient to prevent the area 221 from sticking to rolls and other contact surfaces in the shingle production equipment (See FIG. 13) and is low enough that the layer of parting material in the area 221 does not interfere with the application or the functioning of the adhesive 230. The parting material 220 above the gap G can be provided in a higher amount, thickness, and/or concentration than in the area 221 to both prevent the area 221 from sticking to rolls and other contact surfaces in the shingle production equipment and prevent shingles that are packaged in a bundle from sticking to one another. Different amounts, thicknesses, and/or concentrations of parting material can be applied above the gap G and in the area 221 in a wide variety of different ways. Examples of ways that the parting material can be applied in different amounts, thicknesses, and/or concentrations in these two areas include, but are not limited to:

1) Simultaneously coating the area above the gap G with a higher amount, thickness, and/or concentration of parting material and coating the area 221 with a lower amount, thickness, and/or concentration of parting material; and 2) Applying a first coating of the parting material to the entire back side of the shingle and then applying a second coating of the parting material 220 on top of the first coating layer, but only in the area above the gap G.

Still referring to FIG. 3A, in another embodiment, the entire back surface of the shingle is coated with the same amount of parting material 220 and the area 221 is treated to promote adhesion of the sealant 230 to the rear surface of the shingle. Examples of ways that the area 221 can be treated to promote adhesion of the sealant 230 to the rear surface of the shingle include, increasing the coefficient of friction of the area 221 by knurling, cutting, perforation, etching, burning (e.g. laser treatment), and/or removing parting material, such as by scraping, burning, etc. Any manner capable of making the area capable of being adhered to by shingle sealant can be used.

The layer of parting material 220 may comprise any one or more of the parting materials described above. Preferably, the parting material comprises a metal stearate. More preferably, the parting material comprises zinc stearate. The layer of parting material 220 may have a thickness of 0.25 µm to 5 µm. In certain embodiments, the layer of parting material 220 may have a thickness of 0.25 µm to 2.5 µm.

Figure 3B:
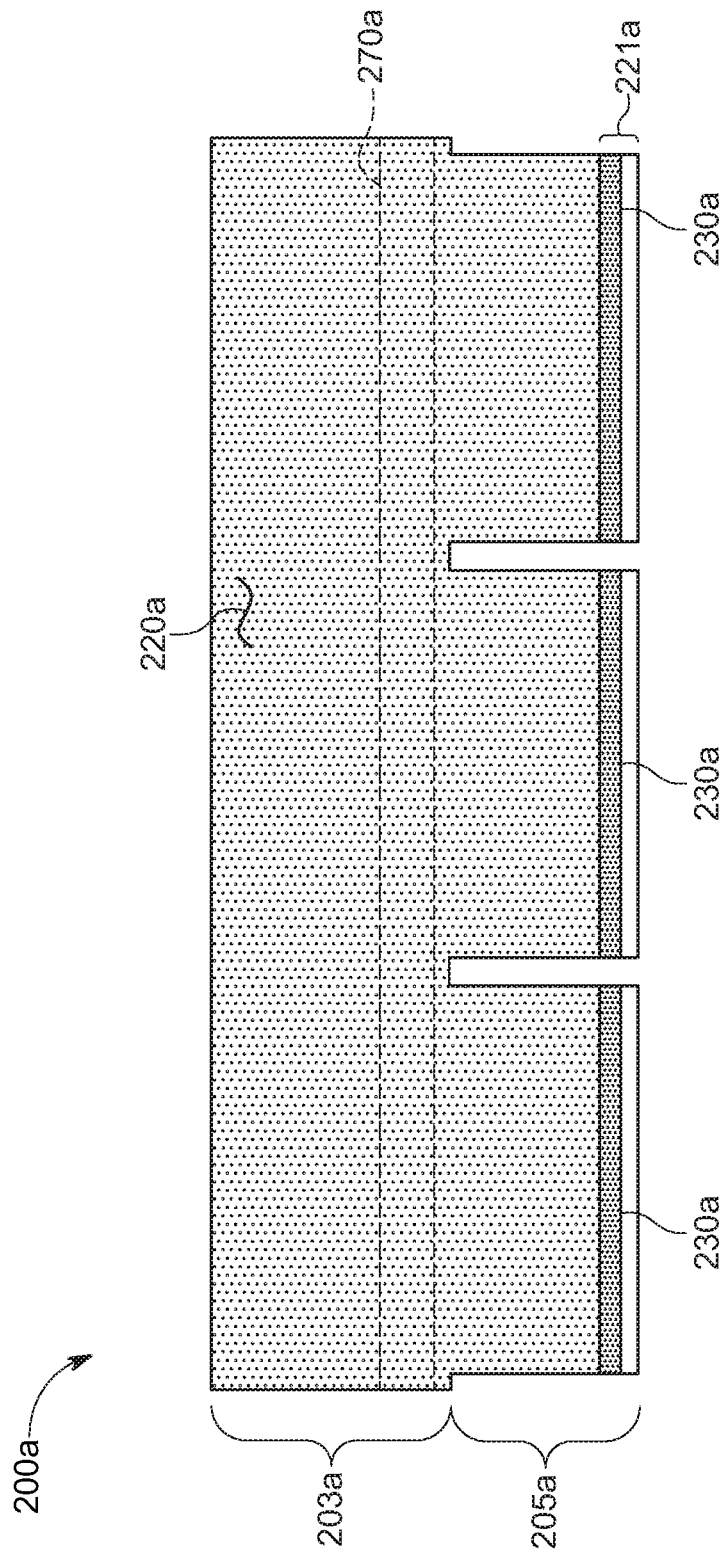
FIG. 3B is a bottom plan view of an exemplary embodiment of a shingle of the present disclosure.

Referring now to FIG. 3B, an exemplary single layer tabbed shingle 200a of the present disclosure is shown. The shingle 200a is similar to the single layer tabbed shingle 100 shown in FIGS. 1, 1A, and 1B, but includes a layer of parting material 220a instead of a backdust layer of particles. The shingle 200a includes a substrate that is infiltrated with asphalt forming a first asphalt coating on the top surface of the substrate and a second asphalt coating on the bottom surface of the substrate, and a surface layer of granules embedded in (and, optionally, a layer of parting material on) the first asphalt coating. The shingle 200a has a headlap portion 203a, a slotted or discontinuous tab portion 205a, and an adhesive 230a applied to a bottom surface of the tab portion 205a of the shingle 200a. Although the adhesive 230a is shown as a continuous strip on each tab of the shingle 200a, the adhesive 230a may be applied in various forms and configurations including, but not limited to, dots, discontinuous segments, or combinations thereof. The shingle 200a may also include a reinforcement layer 270a (shown in phantom) as previously described.

In the embodiment illustrated in FIG. 3B, the layer of parting material 220a is applied to the asphalt coating on the bottom surface of the shingle 200a at both the headlap portion 203a and at the tab portion 205a. As shown in FIG. 3B, the layer of parting material 220a is applied such that it abuts the adhesive 230a. With this arrangement, the layer of parting material 220a does not interfere with the application or the functioning of the adhesive 230. The layer of parting material 220a may comprise any one or more of the parting materials described above. Preferably, the parting material comprises a metal stearate. More preferably, the parting material comprises zinc stearate. The layer of parting material 220a may have a thickness of 0.25 µm to 5 µm. In certain embodiments, the layer of parting material 220a may have a thickness of 0.25 µm to 2.5 µm.

Still referring to FIG. 3B, different amounts, thicknesses and/or concentrations of parting material can be applied to different areas of the back of the shingle. For example, a lower thickness, amount, and/or concentration of parting material can be applied in the area 221a before the adhesive 230a is applied to the shingle. The amount, thickness, and/or concentration is sufficient to prevent the area 221a from sticking to rolls and other contact surfaces in the shingle production equipment (See FIG. 13) and is low enough that the layer of parting material in the area 221a does not interfere with the application or the functioning of the adhesive 230a. The parting material 220a above the adhesive 230a can be provided in a higher amount, thickness, and/or concentration than in the area 221a to both prevent the area 221a from sticking to rolls and other contact surfaces in the shingle production equipment and prevent shingles that are packaged in a bundle from sticking to one another. Different amounts, thicknesses, and/or concentrations of parting material can be applied above the area 221a and in the area 221a in a wide variety of different ways. Examples of ways that the parting material can be applied in different amounts, thicknesses, and/or concentrations in these two areas include, but are not limited to:

1) Simultaneously coating the area above the area 221a with a higher amount, thickness, and/or concentration of parting material and coating the area 221a with a lower amount, thickness, and/or concentration of parting material; and
2) Applying a first coating of the parting material to the entire back side of the shingle and then applying a second coating of the parting material 220a on top of the first coating layer, but only in the area above the area 221a.

Still referring to FIG. 3B, in another embodiment, the entire back surface of the shingle is coated with the same amount of parting material 220a and the area 221a is treated to promote adhesion of the sealant 230a to the rear surface of the shingle. Examples of ways that the area 221a can be treated to promote adhesion of the sealant 230a to the rear surface of the shingle include, increasing the coefficient of friction of the area 221a by knurling, cutting, perforation, etching, burning (e.g. laser treatment), and/or removing parting material, such as by scraping, burning, etc. Any manner capable of making the area capable of being adhered to by shingle sealant can be used.

Figure 3C:
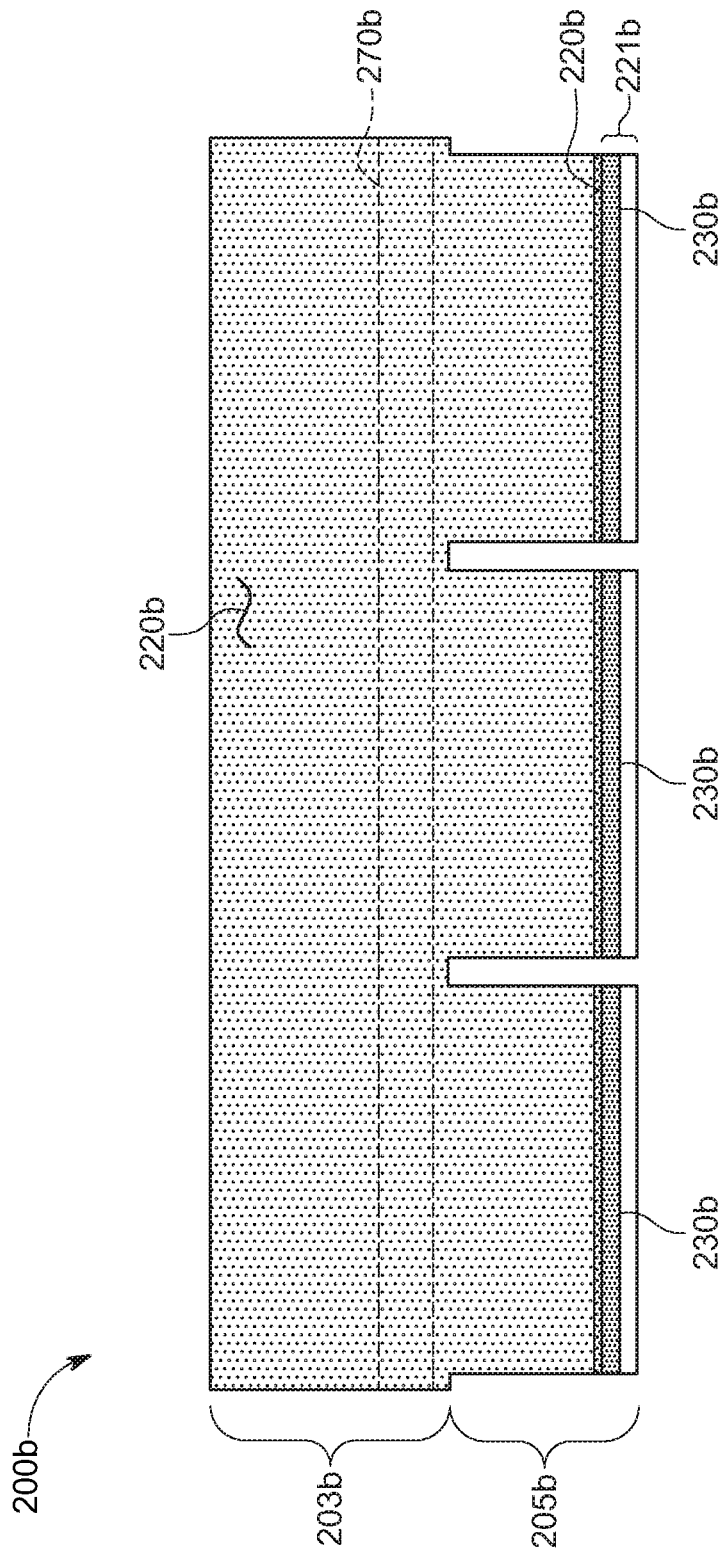
FIG. 3C is a bottom plan view of an exemplary embodiment of a shingle of the present disclosure.

Referring now to FIG. 3C, an exemplary single layer tabbed shingle 200b of the present disclosure is shown. The shingle 200b is similar to the single layer tabbed shingle 100 shown in FIGS. 1, 1A, and 1B, but includes a layer of parting material 220b instead of a backdust layer of particles. The shingle 200b includes a substrate that is infiltrated with asphalt forming a first asphalt coating on the top surface of the substrate and a second asphalt coating on the bottom surface of the substrate, and a surface layer of granules embedded in (and, optionally, a layer of parting material on) the first asphalt coating. The shingle 200b has a headlap portion 203b, a slotted or discontinuous tab portion 205b, and an adhesive 230b applied to a bottom surface of the tab portion 205b of the shingle 200b. Although the adhesive 230b is shown as a continuous strip on each tab of the shingle 200b, the adhesive 230b may be applied in various forms and configurations including, but not limited to, dots, discontinuous segments, or combinations thereof. The shingle 200b may also include a reinforcement layer 270b (shown in phantom) as previously described.

In the embodiment illustrated in FIG. 3C, the layer of parting material 220b is applied to the asphalt coating on the bottom surface of the shingle 200b at both the headlap portion 203b and at the tab portion 205b. As shown in FIG. 3C, the layer of parting material 220b is applied such that it partially overlaps with the adhesive 230b. With this arrangement, the layer of parting material 220b does not substantially interfere with the application or the functioning of the adhesive 230b. The layer of parting material 220b may comprise any one or more of the parting materials described above. Preferably, the parting material comprises a metal stearate. More preferably, the parting material comprises zinc stearate. The layer of parting material 220b may have a thickness of 0.25 µm to 5 µm. In certain embodiments, the layer of parting material 220b may have a thickness of 0.25 µm to 2.5 µm.

In certain embodiments, the thickness of the layer of parting material 220b that partially overlaps with the adhesive 230b is less than the thickness of the layer of parting material 220b that does not partially overlap with the adhesive 230b. In certain embodiments, the thickness of the layer of parting material 220b that partially overlaps with the adhesive 230b is from 5% to 95% less, including from 10% to 95% less, from 25% to 95% less, and also including from 50% to 95% less than the thickness of the layer of parting material 220b that does not partially overlap with the adhesive 230b.

Still referring to FIG. 3C, different amounts, thicknesses and/or concentrations of parting material can be applied to different areas of the back of the shingle. For example, a lower thickness, amount, and/or concentration of parting material can be applied in the area 221a before the adhesive 230b is applied to the shingle. The amount, thickness, and/or concentration is sufficient to prevent the area 221b from sticking to rolls and other contact surfaces in the shingle production equipment (See FIG. 13) and is low enough that the layer of parting material in the area 221b does not interfere with the application or the functioning of the adhesive 230b. The parting material 220b above the area 221b can be provided in a higher amount, thickness, and/or concentration than in the area 221b to both prevent the area 221b from sticking to rolls and other contact surfaces in the shingle production equipment and prevent shingles that are packaged in a bundle from sticking to one another. Different amounts, thicknesses, and/or concentrations of parting material can be applied above the area 221b and in the area 221b in a wide variety of different ways. Examples of ways that the parting material can be applied in different amounts, thicknesses, and/or concentrations in these two areas include, but are not limited to:

1) Simultaneously coating the area above the area 221b with a higher amount, thickness, and/or concentration of parting material and coating the area 221b with a lower amount, thickness, and/or concentration of parting material; and
2) Applying a first coating of the parting material to the entire back side of the shingle and then applying a second coating of the parting material 220b on top of the first coating layer, but only in the area above the area 221b.

Still referring to FIG. 3C, in another embodiment, the entire back surface of the shingle is coated with the same amount of parting material 220b and the area 221b is treated to promote adhesion of the sealant 230b to the rear surface of the shingle. Examples of ways that the area 221b can be treated to promote adhesion of the sealant 230b to the rear surface of the shingle include, increasing the coefficient of friction of the area 221b by knurling, cutting, perforation, etching, burning (e.g. laser treatment), and/or removing parting material, such as by scraping, burning, etc. Any manner capable of making the area capable of being adhered to by shingle sealant can be used.

Referring now to FIG. 4, an exemplary single layer tabbed shingle 200c of the present disclosure is shown. The shingle 200c is similar to the single layer tabbed shingle 100 shown in FIGS. 1, 1A, and 1B, but shows the embodiment where a lower amount of parting material is included in the area 221c. As is described above, a layer of parting material 220c is included instead of a backdust layer of particles. The shingle 200c includes a substrate that is infiltrated with asphalt forming a first asphalt coating on the top surface of the substrate and a second asphalt coating on the bottom surface of the substrate, and a surface layer of granules embedded in (and, optionally, a layer of parting material on) the first asphalt coating. The shingle 200c has a headlap portion 203c, a slotted or discontinuous tab portion 205c, and an adhesive 230c applied to a bottom surface of the tab portion 205c of the shingle 200c. Although the adhesive 230c is shown as a continuous strip on each tab of the shingle 200c, the adhesive 230c may be applied in various forms and configurations including, but not limited to, dots, discontinuous segments, or combinations thereof. The shingle 200c may also include a reinforcement layer 270c (shown in phantom) as previously described.

In the embodiment illustrated in FIG. 4, the layer of parting material 220c is applied to the asphalt coating on the bottom surface of the shingle 200c at both the headlap portion 203c and at the tab portion 205c. As shown in FIG. 4, the layer of parting material 220c comprises a first parting material area 222c and a second parting material area 221c. The first parting material area 222c generally corresponds to areas of parting material on the bottom surface of the shingle 200c that do not overlap with adhesive 230c, and the second parting material area 221c generally corresponds to areas of parting material on the bottom surface of the shingle 200c that overlap with adhesive 230c. It should be understood that the second parting material area 221c can extend beyond the area corresponding to where the adhesive 230c is located. As shown in FIG. 4, the first parting material area 222c includes at least a portion of the headlap portion 203c and at least a portion of the tab portion 205c on the bottom surface of the shingle 200 where no adhesive 230 is located. The second parting material area 221c includes at least the portion of the tab portion 205 where the adhesive 230c is located on the bottom surface of the shingle 200c.

In certain embodiments, the thickness of the layer of parting material 220c in the first parting material area 222c is greater than the thickness of the layer of parting material 220c in the second parting material area 221c. In certain embodiments, the thickness of the layer of parting material 220c in the first parting material area 222c is from 5% to 95% greater, including from 10% to 95% greater, including from 25% to 95% greater, and also including from 50% to 95% greater than the thickness of the layer of parting material 220c in the second parting material area 221c. Providing a thinner layer of parting material 221c in the second parting material area 221c than in the first parting material area 222c reduces the likelihood that the layer of parting material 220c will interfere with the application or functioning of the adhesive 230c. The thicker layer of parting material 220c in the first parting material area 222c also ensures that the shingle 200c does not stick to equipment during manufacturing or to other shingles when packaged in a bundle.

In certain embodiments, the area weight (lb/ft$^2$) of the layer of parting material 220c in the first parting material area 222c is greater than the area weight of the layer of parting material 220c in the second parting material area 221c. In certain embodiments, the area weight of the layer of parting material 220c in the first parting material area 222c is from 5% to 95% greater, including from 10% to 95% greater, from 25% to 95% greater, and also including from 50% to 95% greater than the area weight of the layer of parting material 220c in the second parting material area 221c. Providing a smaller area weight of parting material 220c in the second parting material area 221c than in the first parting material area 222c reduces the likelihood that the layer of parting material 220c in the second parting material area 221 will interfere with the application or functioning of the adhesive 230c. The larger area weight of parting material 220c in the first parting material area 222c also ensures that the shingle 200c does not stick to equipment during manufacturing or to other shingles when packaged in a bundle.

The different area weights may be accomplished by using liquid-applied parting agents having different concentrations of parting material. For example, a liquid-applied parting agent having a first concentration of parting material may be used create the layer of parting material 220c in the first parting material area 222c, and a liquid-applied parting agent having a second concentration of parting material that is less than the first concentration of parting material may be used to create the layer of parting material 220c in the second parting material area 221c. However, the different area weights of the parting material may be achieved in any suitable manner.

The layer of parting material 220c in the first parting material area 222c may comprise the same parting material or a different parting material as the layer of parting material 220c in the second parting material area 221c. The parting material may comprise any one or more of the parting materials described above. Preferably, the parting material comprises a metal stearate. More preferably, the parting material comprises zinc stearate. In certain embodiments, the layer of parting material 220c in the first parting material area 222c comprises a polyolefin and the layer of parting material 220 in the second parting material area 221c comprises a metal stearate. In certain embodiments, the layer of parting material 220c in the first parting material area 222c comprises a metal stearate and the layer of parting material 220c in the second parting material area 221c comprises a polyolefin. In certain embodiments, the layer of parting material 220c in the first parting material area 222c comprises a first metal stearate and the layer of parting material 220c in the second parting material area 221c comprises a second metal stearate different from the first metal stearate. In certain embodiments, the layer of parting material 220c in the first parting material area 222c and in the second parting material area 221c comprises zinc stearate.

FIG. 4A illustrates another exemplary embodiment that is similar to the embodiment illustrated by FIG. 4, except that an area 400d is provided with an increased amount, thickness and/or concentration of parting material 220d. Single layer, three tab shingles 200d are typically provided with a release tape in the area 400d. Pairs of shingles are packaged by rotating (180 degrees) and flipping over one shingle of the pair, such that the sealant or adhesive 230 of each shingle is positioned against the release tape of the other shingle. The release tape is made from a material that the sealant or adhesive 230d does not adhere or stick to. The top or granule side of each shingle of the pair faces out. These pairs of shingles are stacked and enclosed in a package to form bundles of shingles. Since the sealant or adhesive does not adhere or stick to the release tape, the individual shingles can sequentially be removed from the bundle.

In the example illustrated by FIG. 4A, the parting material 220d is provided in an increased thickness, amount, and/or concentration in the cross-hatched area 400d as compared to both the area 222d and the area 221d. In an exemplary embodiment, the amount, thickness, and/or concentration of the parting material in the area 400d is sufficient to prevent the adhesive 230d of the stacked pairs of shingles from adhering to the area 400d. As a result, the release tape mentioned above can be omitted. Increased amounts, thicknesses, and/or concentrations of parting material can be applied in the area 400d in a wide variety of different ways. Examples of ways that the parting material can be applied in increased amounts, thicknesses, and/or concentrations in the area 400d include, but are not limited to:

1) Simultaneously coating the area 400d, the area 221d, and/or the area between areas 400d and 221d with different amounts, thicknesses, and/or concentrations of parting material; and
2) Applying a first coating of the parting material to the entire back side of the shingle, applying a second coating of the parting material on top of the first coating layer, but only in the area above the area 221d, and applying a third coating of the parting material on top of the first and second layers, but only in the area 400d.

As indicated above, the liquid-applied parting agent may be applied to the top of shingle.

Figure 5A:
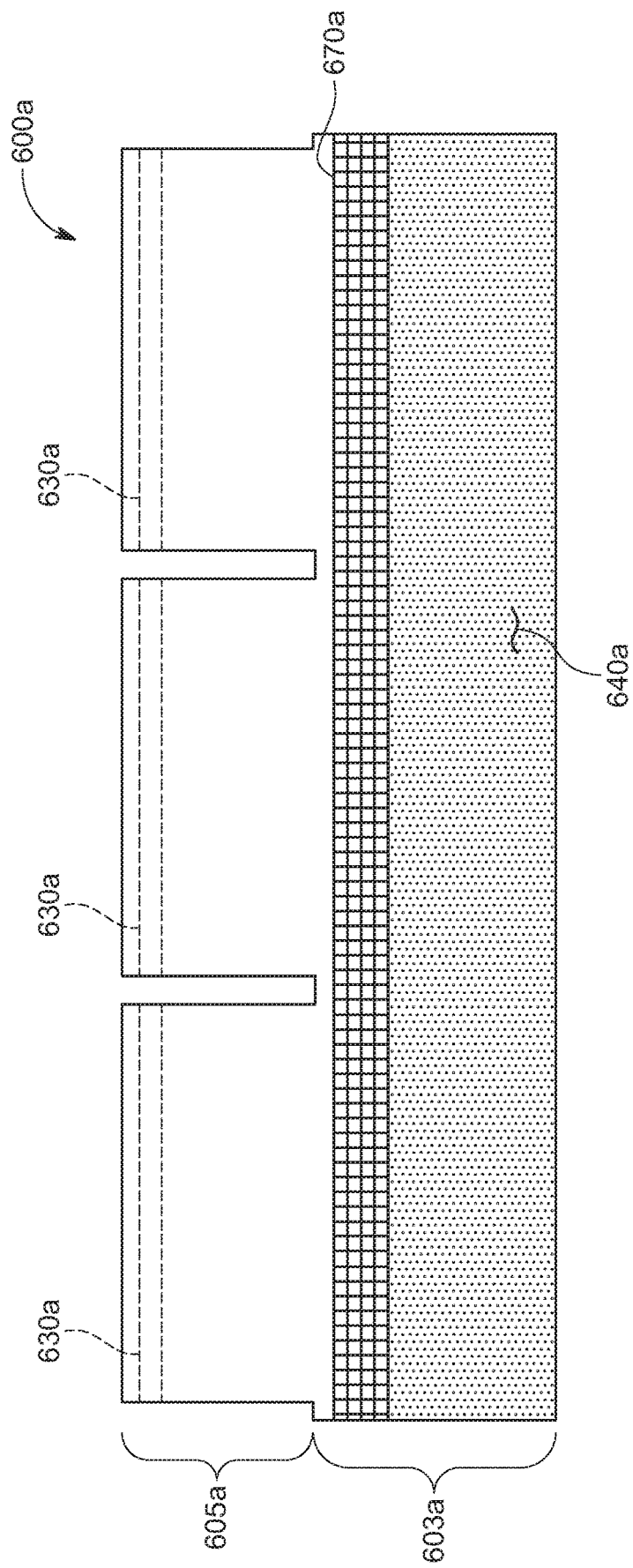
FIG. 5A is a top plan view of an exemplary embodiment of a shingle of the present disclosure.

Referring now to FIG. 5A, an exemplary top view of a single layer tabbed shingle 600a of the present disclosure is shown. The shingle 600a is similar to the single layer tabbed shingle 100 shown in FIGS. 1, 1A, and 1B, but includes a layer of parting material 640a replacing a portion of the granules on the top of the shingle. The shingle 600a includes a substrate that is infiltrated with asphalt forming a first asphalt coating on the top surface of the substrate and a second asphalt coating on the bottom surface of the substrate. The second asphalt coating includes an embedded layer of backdust particles or a layer of parting material, as described above. The shingle 600a has a headlap portion 603a, a slotted or discontinuous tab portion 605a, and an adhesive 630a (shown in phantom) applied to a bottom surface of the tab portion 605a of the shingle 600a. Although the adhesive 630a is shown as a continuous strip on each tab of the shingle 600a, the adhesive 630a may be applied in various forms and configurations including, but not limited to, dots, discontinuous segments, or combinations thereof. The shingle 600a may also include a reinforcement layer 670a as previously described.

In the embodiment illustrated in FIG. 5A, the layer of parting material 640a is applied to the asphalt coating on the top surface of the shingle 600a at the headlap portion 603a. The tab portion 605a includes embedded granules (not shown). As shown in FIG. 5A, the layer of parting material 640a abuts or at least partially overlaps with reinforcement layer 670a.

In certain embodiments, shingle 600a of FIG. 5A may be described by the amount of the headlap portion 603a that is covered by the layer parting material 640a. In certain embodiments, all or substantially all of the headlap portion 603a (with the exception of any area covered by the reinforcement layer 670a) is covered by the layer of parting material 640a. Substantially all of the headlap portion 603a is covered by the layer of parting material 640a when only small areas of granules are missing, for example, due to manufacturing variance. In certain embodiments, the layer of parting material 640a covers greater than 30%, in other embodiments greater than 40%, in other embodiments greater than 50%, and in other embodiments greater than 60% of the headlap portion of shingle 600a. In these or other embodiments, the layer of parting material 640a covers less than 95%, in other embodiments less than 90%, in other embodiments less than 85%, and in other embodiments less than 80% of the headlap portion of shingle 600a. In certain embodiments, the layer of parting material 640a covers from 30% to 95%, in other embodiments from 40% to 90%, in other embodiments from 50% to 85%, and in other embodiments from 60% to 80% of the headlap portion of shingle 600a.

The amount, thickness, and/or concentration of parting material in the layer of parting material 640a in FIG. 5A is sufficient to prevent all or substantially of the granules from sticking to shingle 600a in the layer of parting material 640a. In certain embodiment, the section of the shingle with the layer of parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 640a in FIG. 5A may be uniform or approximately uniform. In other embodiments, different amounts, thicknesses and/or concentrations of the layer parting material can be applied to different areas of the top of the shingle. Examples of ways that the liquid-applied parting material can be applied in different amounts, thicknesses, and/or concentrations are described above. While shown as a continuous coating, parting material 640a may also be applied to form a design or a pattern.

The layer of parting material 640a may comprise any one or more of the parting materials described above. Preferably, the parting material comprises a metal stearate. More preferably, the parting material comprises zinc stearate. The layer of parting material 640a may have a thickness of 0.25 µm to 5 µm. In certain embodiments, the layer of parting material 640a may have a thickness of 0.25 µm to 2.5 µm.

Figure 5B:
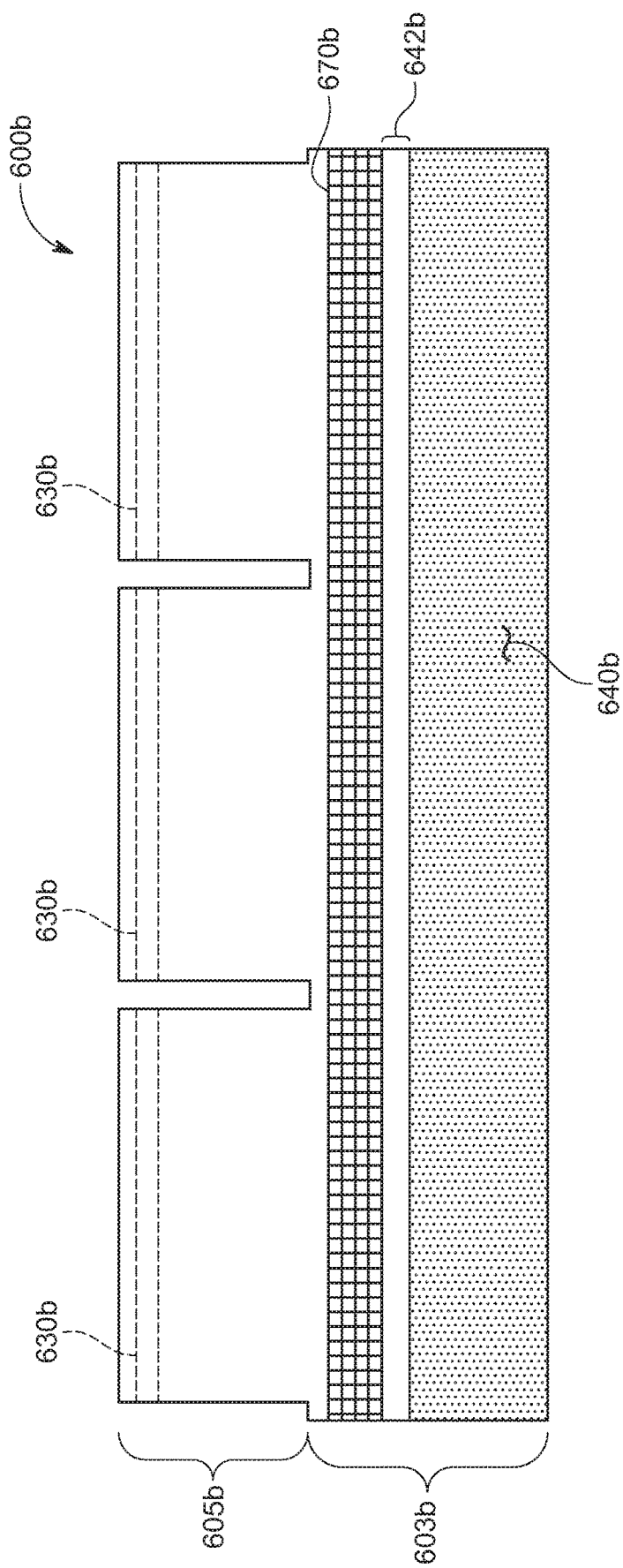
FIG. 5B is a top plan view of an exemplary embodiment of a shingle of the present disclosure.

Referring now to FIG. 5B, an exemplary top view of a single layer tabbed shingle 600 of the present disclosure is shown. The shingle 600b is similar to the single layer tabbed shingle 100 shown in FIGS. 1, 1A, and 1B, but includes a layer of parting material 640b replacing a portion of the granules on the top of the shingle. The shingle 600b includes a substrate that is infiltrated with asphalt forming a first asphalt coating on the top surface of the substrate and a second asphalt coating on the bottom surface of the substrate. The second asphalt coating includes an embedded layer of backdust particles or a layer of parting material, as described above. The shingle 600b has a headlap portion 603b, a slotted or discontinuous tab portion 605b, and an adhesive 630b (shown in phantom) applied to a bottom surface of the tab portion 605b of the shingle 600b. Although the adhesive 630b is shown as a continuous strip on each tab of the shingle 600b, the adhesive 630b may be applied in various forms and configurations including, but not limited to, dots, discontinuous segments, or combinations thereof. The shingle 600b may also include a reinforcement layer 670b as previously described.

In the embodiment illustrated in FIG. 5B, the layer of parting material 640b is applied to the asphalt coating on the top surface of the shingle 600b at the headlap portion 603b. The tab portion 605b includes embedded granules (not shown). As shown in FIG. 5B, there is a gap 642b that does not include the parting material. The gap 642b may be located between the layer of parting material 640b and the reinforcement layer 670b. Due to the lack of parting material, granules are embedded in gap 642b. In certain embodiments, the width of gap 642b may be greater than 0.0625 inches, in other embodiments greater than 0.125 inches, and in other embodiments greater than 0.25 inches. In these or other embodiments, the width of gap 642b may be less than 2 inches, in other embodiments less than 1 inch, and in other embodiments less than 0.75 inches.

In certain embodiments, the shingle 600b of FIG. 5B may be described by the percentage of the headlap portion 603b (with the exception of reinforcement layer 670b) that is covered by the layer of parting material 640b. In certain embodiments, the layer of parting material 640b covers greater than 30%, in other embodiments greater than 40%, in other embodiments greater than 50%, and in other embodiments greater than 60% of the headlap portion of the shingle 600b. In these or other embodiments, the layer of parting material 640b covers less than 95%, in other embodiments less than 90%, in other embodiments less than 85%, and in other embodiments less than 80% of the headlap portion of the shingle 600b. In certain embodiments, the layer of parting material 640b covers from 30% to 95%, in other embodiments from 40% to 90%, in other embodiments from 50% to 85%, and in other embodiments from 60% to 80% of the headlap portion of shingle 600b.

The amount, thickness, and/or concentration of the layer of parting material 640b in FIG. 5B is sufficient to prevent all or substantially of the granules from sticking to the shingle 600b in the layer of parting material 640b. In certain embodiments, the section of the shingle with the layer of parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 640b in FIG. 5B may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 640 may also be applied to form a design or a pattern The layer of parting material 640b may comprise any one or more of the parting materials described above. Preferably, the parting material comprises a metal stearate. More preferably, the parting material comprises zinc stearate. The layer of parting material 640b may have a thickness of 0.25 µm to 5 µm. In certain embodiments, the layer of parting material 640b may have a thickness of 0.25 µm to 2.5 µm.

Figure 5C:
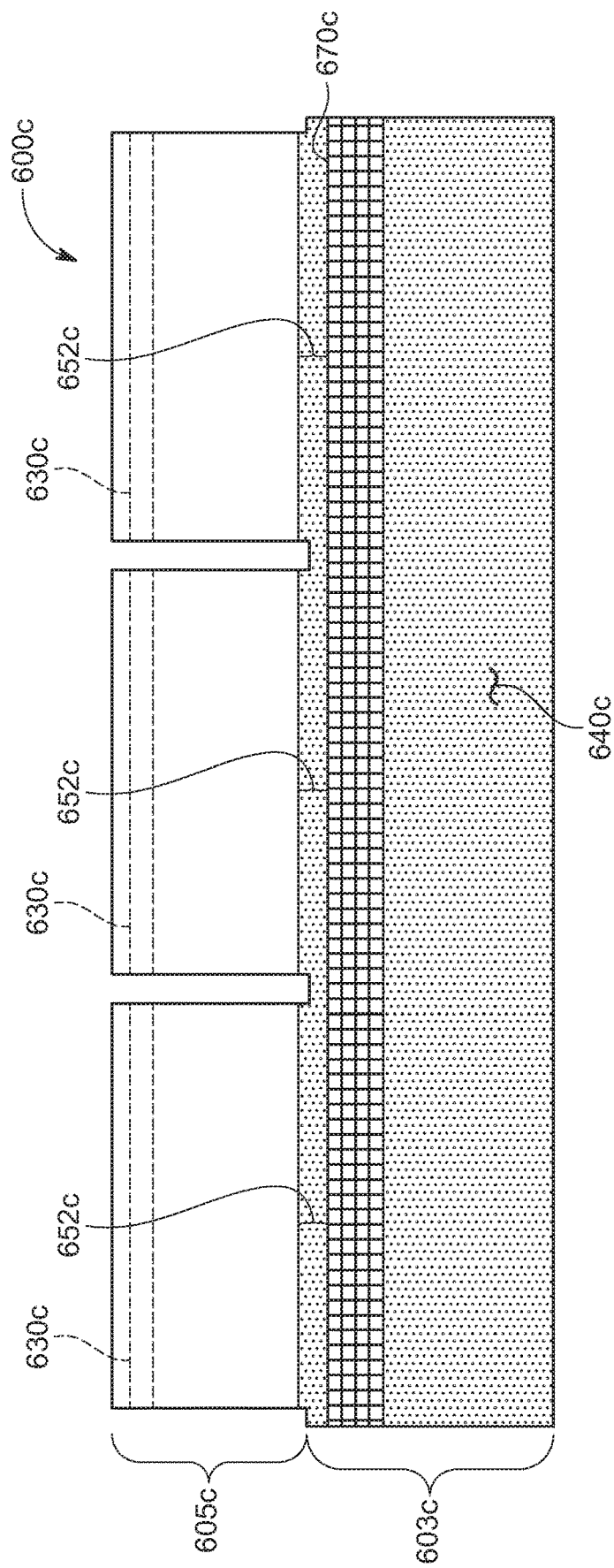
FIG. 5C is a top plan view of an exemplary embodiment of a shingle of the present disclosure.

Referring now to FIG. 5C, an exemplary top view of a single layer tabbed shingle 600c of the present disclosure is shown. The shingle 600c is similar to the single layer tabbed shingle 100 shown in FIGS. 1, 1A, and 1B, but includes a layer of parting material 640c replacing a portion of the granules on the top of the shingle. The shingle 600c includes a substrate that is infiltrated with asphalt forming a first asphalt coating on the top surface of the substrate and a second asphalt coating on the bottom surface of the substrate. The second asphalt coating includes an embedded layer of backdust particles or a layer of parting material, as described above. The shingle 600c has a headlap portion 603c, a slotted or discontinuous tab portion 605c, and an adhesive 630c (shown in phantom) applied to a bottom surface of the tab portion 605c of the shingle 600c. Although the adhesive 630c is shown as a continuous strip on each tab of the shingle 600c, the adhesive 630c may be applied in various forms and configurations including, but not limited to, dots, discontinuous segments, or combinations thereof. The shingle 600c may also include a reinforcement layer 670c as previously described.

In the embodiment illustrated in FIG. 5C, the layer of parting material 640c is applied to the asphalt coating on the top surface of the shingle 600c at the headlap portion 603c. The tab portion 605c includes embedded granules (not shown). As shown in FIG. 5C, the layer of parting material 640c abuts or at least partially overlaps with reinforcement layer 670c. In shingle 600c of FIG. 5C, a strip of parting material 652c is located between reinforcement layer 670c and tab portion 605c. The strip of parting material 652c may abut or at least partially overlaps with reinforcement layer 670c. In certain embodiments, the parting material may be applied to cover or overlap reinforcement layer 670c. In embodiments where the parting material covers or overlaps the reinforcement layer 670c, one continuous section of parting material may connect the strip of parting material 652c, the reinforcement layer 670c, and the layer of parting material 640c.

In certain embodiments, shingle 600c of FIG. 5C may be described by the amount of the headlap portion 603c that is covered by the layer of parting material 640c. In certain embodiments, all or substantially all of the headlap portion 603c (with the exception of any area covered by reinforcement layer 670c) is covered by the layer of parting material 640c. Substantially all of the headlap portion 603c is covered by the layer of parting material 640c when only small areas of granules are missing, for example, due to manufacturing variances.

The amount, thickness, and/or concentration of parting material in the layer of parting material 640c in FIG. 5C is sufficient to prevent all or substantially of the granules from sticking to the shingle 600c in the layer of parting material 640c. In certain embodiment, the section of the shingle with the parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 640c in FIG. 5C may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 640c may also be applied to form a design or a pattern.

The layer of parting material 640c may comprise any one or more of the parting materials described above. Preferably, the parting material comprises a metal stearate. More preferably, the parting material comprises zinc stearate. The layer of parting material 640c may have a thickness of 0.25 µm to 5 µm. In certain embodiments, the layer of parting material 640c may have a thickness of 0.25 µm to 2.5 µm.

Figure 6:
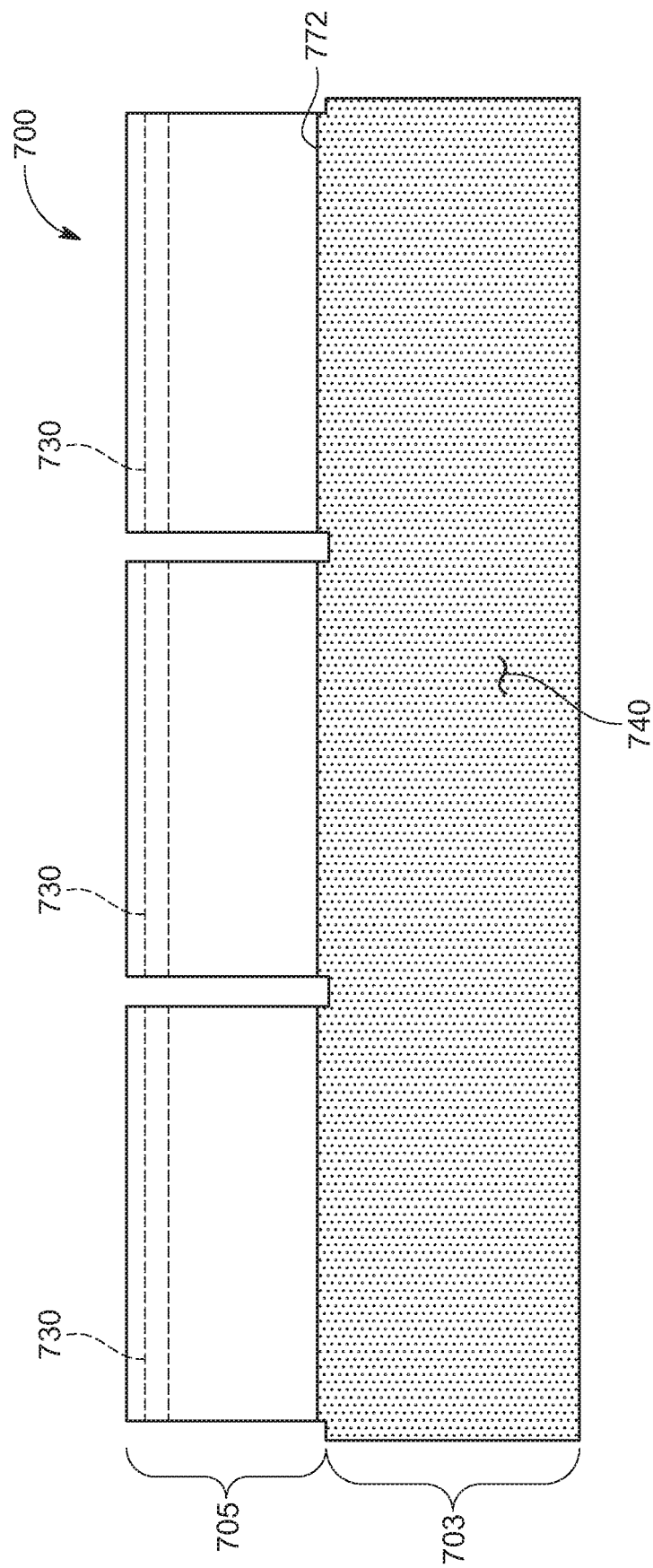
FIG. 6 is a top plan view of an exemplary embodiment of a shingle of the present disclosure.

Referring now to FIG. 6, an exemplary top view of a single layer tabbed shingle 700 of the present disclosure is shown. The shingle 700 is similar to the single layer tabbed shingle 100 shown in FIGS. 1, 1A, and 1B, but includes a layer of parting material 740 replacing a portion of the granules on the top of the shingle. Additionally, shingle 700 does not include a reinforcement layer. The shingle 700 includes a substrate that is infiltrated with asphalt forming a first asphalt coating on the top surface of the substrate and a second asphalt coating on the bottom surface of the substrate, and a backdust layer of particles embedded in the second asphalt coating or a parting material, as described above, on the second asphalt coating. The shingle 700 has a headlap portion 703, a slotted or discontinuous tab portion 705, and an adhesive 730 (shown in phantom) applied to a bottom surface of the tab portion 705 of the shingle 700. Although the adhesive 730 is shown as a continuous strip on each tab of the shingle 700, the adhesive 730 may be applied in various forms and configurations including, but not limited to, dots, discontinuous segments, or combinations thereof.

In the embodiment illustrated in FIG. 6, the layer of parting material 740 is applied to the asphalt coating on the top surface of the shingle 700 at the headlap portion 703. The tab portion 705 includes embedded granules (not shown). As shown in FIG. 6, the layer of parting material 740 abuts with the tab portion 705 at parting material boundary 772. While shown abutting the tab portion 705 in FIG. 6, there may be sections of embedded granules on the headlap portion 703 between the parting material boundary 772 and the tab portion 705. In these embodiments, the parting material boundary 772 may be placed higher on the headlap portion 703 to create an area of embedded granules between the parting material boundary 772 and the tab portion 705.

In certain embodiments, the shingle 700 of FIG. 6 may be described by the area of the headlap portion 703 that is covered by the layer of parting material 740. In certain embodiments, all or substantially all of the headlap portion 703 is covered by the layer of parting material 740. Substantially all of the headlap portion 703 is covered by the layer of parting material 740 when only small areas of granules are missing, for example, due to manufacturing variances. In certain embodiments, the layer of parting material 740 covers greater than 30%, in other embodiments greater than 40%, in other embodiments greater than 50%, and in other embodiments greater than 60% of the headlap portion of the shingle 700. In these or other embodiments, the layer of parting material 740 covers less than 95%, in other embodiments less than 90%, in other embodiments less than 85%, and in other embodiments less than 80% of the headlap portion of the shingle 700. In certain embodiments, the layer of parting material 740 covers from 30% to 95%, in other embodiments from 40% to 90%, in other embodiments from 50% to 85%, and in other embodiments from 60% to 80% of the headlap portion of the shingle 700.

The amount, thickness, and/or concentration of the parting material in the layer of parting material 740 in FIG. 6 is sufficient to prevent all or substantially of the granules from sticking to shingle 700 in the layer of parting material 740. In certain embodiment, the section of the shingle with the parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 740 in FIG. 6 may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 740 may also be applied to form a design or a pattern.

The layer of parting material 740 may comprise any one or more of the parting materials described above. Preferably, the parting material comprises a metal stearate. More preferably, the parting material comprises zinc stearate. The layer of parting material 740 may have a thickness of 0.25

μm to 5 μm. In certain embodiments, the layer of parting material 740 may have a thickness of 0.25 μm to 2.5 μm.

As indicated above, the liquid-applied parting agent may be applied to the bottom of a laminated shingle.

Figure 7:
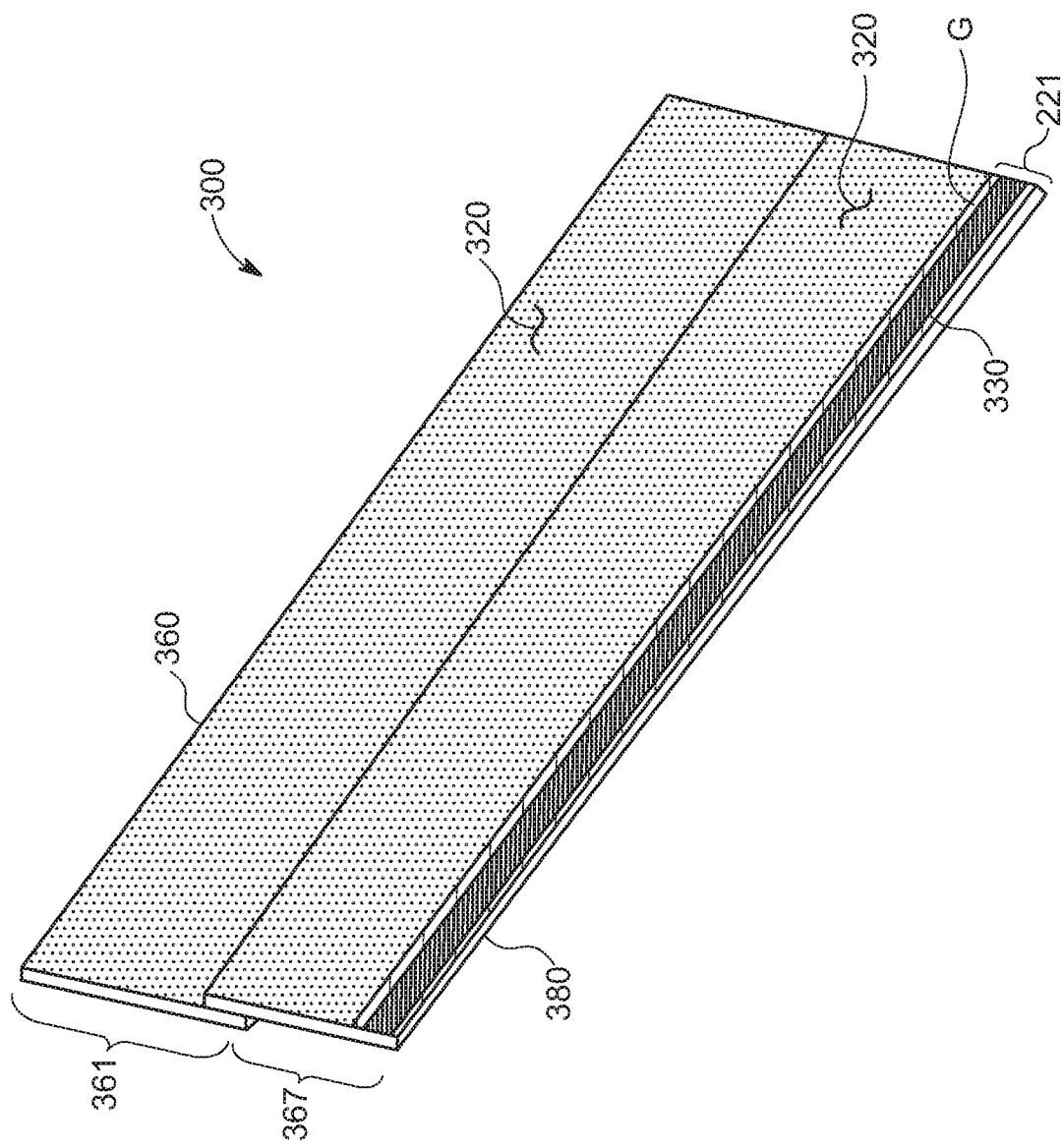
FIG. 7 is a bottom perspective view of an exemplary embodiment of a laminated shingle of the present disclosure.

Referring now to FIG. 7, an exemplary laminated shingle 300 of the present disclosure is shown. The shingle 300 is similar to the laminated shingle 150 shown in FIGS. 2, 2A, and 2B, but includes a layer of parting material 320 instead of a backdust layer of particles. The laminated shingle 300 comprises an overlay sheet 360 having a headlap portion 361 and a tabbed portion attached to an upper surface of an underlay sheet 380 to define a tab portion 367 of the laminated shingle 300. The overlay sheet 360 and the underlay sheet 380 each comprise a substrate, a first asphalt coating on the top surface of the substrate, a surface layer of granules embedded in (and, optionally, a layer of parting material on) the first asphalt coating, and a second asphalt coating on the bottom surface of the substrate. The laminated shingle 300 also includes an adhesive 330 applied to a bottom surface of the underlay sheet 380. Although the adhesive 330 is shown as a continuous strip on the bottom surface of the underlay sheet 380, the adhesive 330 may be applied in various forms including, but not limited to, dots, discontinuous segments, or combinations thereof. The shingle 300 may also include a reinforcement layer (not shown) as previously described.

In the embodiment illustrated in FIG. 7, a layer of parting material 320 is applied to the asphalt coating on the bottom surface of the overlay sheet 360 at the headlap portion 361 and to the asphalt coating on the bottom surface of the underlay sheet 380. The layer of parting material 320 on the bottom surface of the underlay sheet 380 may be applied or patterned using any of the configurations, thicknesses, area weights, parting materials, etc., described above with respect to the shingles of FIGS. 3A, 3B, 3C, and 4.

As shown in FIG. 7, the layer of parting material 320 on the bottom surface of the underlay sheet 380 is separated from the adhesive 330 by a gap G, as described above with respect to the embodiment of the single layer tabbed shingle shown in FIG. 3A. The gap G ensures that the layer of parting material 320 does not interfere with the application or the functioning of the adhesive 330. The gap G between the layer of parting material 320 and the adhesive 330 may be from 0.0625 inches to 1 inch, including from 0.0625 inches to 0.75 inches, from 0.125 inches to 0.75 inches, and also including from 0.25 inches to 0.5 inches and any range in between.

In certain embodiments, the layer of parting material 320 on the bottom surface of the underlay sheet 380 may be applied such that it abuts the adhesive 330, as described above with respect to the embodiment of the single layer tabbed shingle shown in FIG. 3B. In certain embodiments, the layer of parting material 320 on the bottom surface of the underlay sheet 380 may be applied such that it overlaps with the adhesive 330, as described above with respect to the embodiment of the single layer tabbed shingle shown in FIG. 3C. In certain embodiments, the layer of parting material 320 on the bottom surface of the underlay sheet comprises a first parting material area and a second parting material area, wherein the second parting material area includes at least the portion where the adhesive 330 is located on the bottom surface of the underlay sheet 380, as described above with respect to the embodiment of the single layer tabbed shingle shown in FIG. 4.

With reference to FIGS. 7, 3A, 3B, and 3C, different amounts, thicknesses and/or concentrations of parting material can be applied to different areas of the back of the underlay 380. For example, a lower thickness, amount, and/or concentration of parting material can be applied in the area where the adhesive 330 will be applied to the underlay 380. The amount, thickness, and/or concentration is sufficient to prevent the area where the sealant will be applied from sticking to rolls and other contact surfaces in the shingle production equipment (see FIG. 13) and is low enough that the layer of parting material in the area where the adhesive 330 will be applied does not interfere with the application or the functioning of the adhesive 330. The parting material 320 above the sealant area can be provided in a higher amount, thickness, and/or concentration than in the area of the sealant to both prevent the area of the sealant from sticking to rolls and other contact surfaces in the shingle production equipment and prevent shingles that are packaged in a bundle from sticking to one another. Different amounts, thicknesses, and/or concentrations of parting material can be applied in and out of the area of the adhesive 330 in a wide variety of different ways. Examples of ways that the parting material can be applied in different amounts, thicknesses, and/or concentrations in these two areas include, but are not limited to:

1) Simultaneously coating the area above the area where the sealant or adhesive 230 will be applied with a higher amount, thickness, and/or concentration of parting material and coating the area where the sealant or adhesive will be applied with a lower amount, thickness, and/or concentration of parting material; and 2) Applying a first coating of the parting material to the entire back side of the underlay and then applying a second coating of the parting material 220 on top of the first coating layer, but not in the area where the adhesive 230 will be applied (or not entirely in the area where the adhesive will be applied).

Still referring to FIGS. 7, 3A, 3B, and 3C, in another embodiment, the entire back surface of the underlay 380 is coated with the same amount of parting material 320 and the area 221 is treated to promote adhesion of the sealant 330 to the rear surface of the underlay. Examples of ways that the area 221 can be treated to promote adhesion of the sealant 330 to the rear surface of the underlay 380 include, increasing the coefficient of friction of the area 221 by knurling, cutting, perforation, etching, burning (e.g. laser treatment), and/or removing parting material, such as by scraping, burning, etc. Any manner capable of making the area capable of being adhered to by shingle sealant can be used.

Figure 7A:
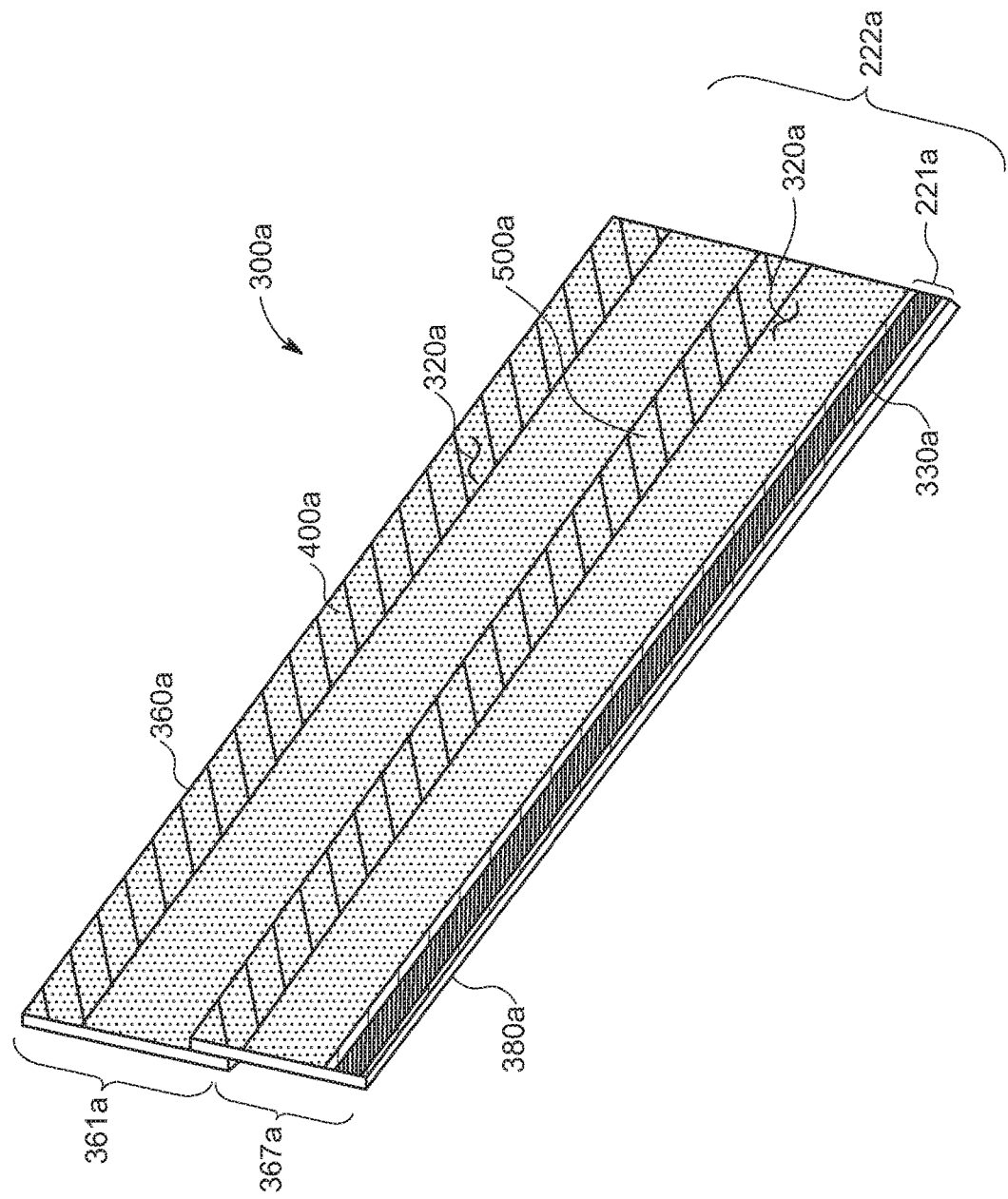
FIG. 7A is a bottom perspective view of an exemplary embodiment of a laminated shingle of the present disclosure.

FIG. 7A illustrates another exemplary embodiment that is similar to the embodiment illustrated by FIG. 7, except that an area 400 and/or an area 500 is provided with an increased amount, thickness and/or concentration of parting material 320. Laminated shingles 300 can be provided with a release tape in the area 400 (end of headlap/aligned with sealant 330) and/or in the area 500 (common bond area). Pairs of shingles are packaged by rotating (180 degrees) and flipping over one shingle of the pair, such that the sealant or adhesive 330 of each shingle is positioned against the release tape of the other shingle. The stacked pairs of shingles are thicker in the area 500, since there are four layers of shingle material (2 overlay and 2 underlay), instead of the three layers (2 overlay and 1 underlay) in the other areas of the stack (See FIG. 3 of U.S. Pat. No. 7,836,654, which is incorporated herein by reference in its entirety). The release tape in the area 400 is made from a material that the sealant or adhesive 330 does not adhere or stick to. The top or granule side of each shingle of the pair faces out. These pairs of shingles are stacked and enclosed in a package to form bundles of shingles. The release tape in the area 500 prevents sticking of shingles due to increased/concentrated pressure of stacked and/or bundled shingles due to the increased thickness in the area 500. Since the sealant or adhesive does not adhere or stick to the release tape in the area 400 and the release tape in the area 500 prevents the shingles from sticking together in the increased thickness area, the individual shingles can sequentially be removed from the bundle.

In the example illustrated by FIG. 7A, the parting material 320a can be provided in an increased thickness, amount, and/or concentration in the cross-hatched area 400a and/or the cross-hatched area 500a as compared to both the remainder of the area 222a and the area 221a. The parting material 320a can be provided in an increased thickness, amount, and/or concentration in the cross-hatched area 400a as compared to the area 500a. In an exemplary embodiment, the amount, thickness, and/or concentration of the parting material in the area 400a is sufficient to prevent the adhesive 330a of the stacked pairs of shingles from adhering to the area 400a. As a result, the release tape mentioned above can be omitted. In an exemplary embodiment, the amount, thickness, and/or concentration of the parting material in the area 500a is sufficient to prevent the shingles from sticking together in the area 500a of increased thickness. Increased amounts, thicknesses, and/or concentrations of parting material can be applied in the area 400a and/or the area 500a in a wide variety of different ways. Examples of ways that the parting material can be applied in increased amounts, thicknesses, and/or concentrations in the area 400a include, but are not limited to:

1) Simultaneously coating the area 400a, the area 500a, the area 221a, and/or the area 222a with different amounts, thicknesses, and/or concentrations of parting material; and 2) Applying a first coating of the parting material to the entire back side of the shingle, applying a second coating of the parting material on top of the first coating layer, but only in the area above the area 221a, and applying a third coating of the parting material on top of the first and second layers, but only in the areas 400a and/or 500a.

Figure 8:
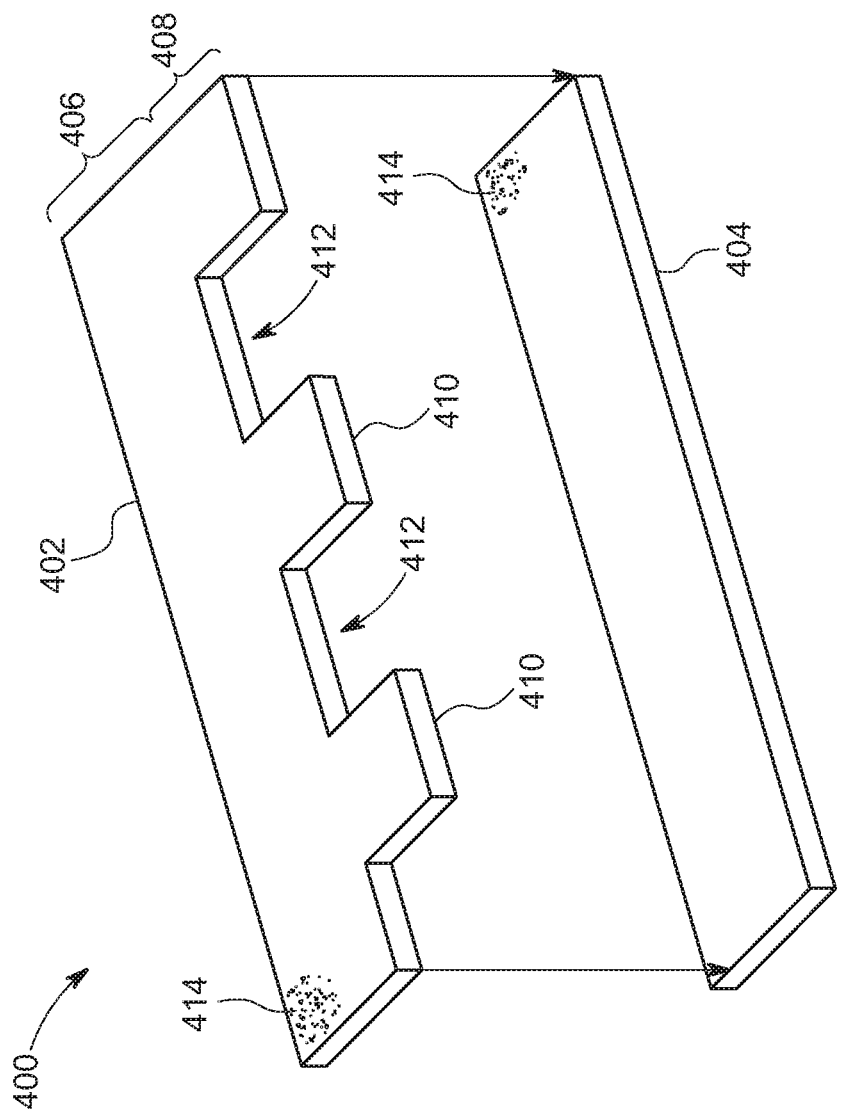
FIG. 8 is an exploded schematic perspective view of a laminated shingle according to an exemplary embodiment.

FIG. 8 illustrates an exploded view of an exemplary embodiment of a laminated shingle 400. The laminated shingle 400 includes an overlay sheet 402 and an underlay sheet 404. The overlay sheet 402 includes a headlap portion 406 and a tab portion 408. The tab portion 408 includes a repeated pattern of the tabs 410 and cutouts 412. To form the laminated shingle 400, a portion of the rear or bottom surface of the overlay sheet 402 is adhered to a portion of the front or top surface of the underlay sheet 404. For example, an adhesive may be applied to at least one of a portion of the bottom surface of the overlay sheet 402 and a portion of the top surface of the underlay sheet 404. The laminated shingle 400 may also include a surface layer of granules 414 and optionally a layer of parting agent (not show) on at least a portion of the top surface of the overlay sheet 402 and a surface layer of granules 414 and optionally a layer of parting agent (not show) on at least a portion of the top surface of the underlay sheet 404. The laminated shingle 400 may also include an adhesive (not shown) applied to a bottom surface of the underlay sheet 404.

Referring now to FIGS. 9A and 9B, an embodiment of an overlay sheet 402a is shown. The overlay sheet 402a includes a headlap portion 406a and a tab portion 408a. The tab portion 408a includes a repeated pattern of tabs 410a and cutouts 412a. In certain embodiments, the overlay sheet 402a comprises a reinforcement layer 470a on a top surface of the headlap portion 406a, as seen in FIG. 9A. As previously described, the reinforcement layer 470a may comprise a layer of polymeric material, or other materials, such as, for example, paper, film, scrim material, and woven or non-woven glass. As seen in FIG. 9B, an adhesive 460a is applied to a bottom surface of the overlay sheet 402a. The adhesive 460a may be applied to the tabs 410a and to a portion of the headlap portion 406a adjacent the tab portion 408a of the overlay sheet 402a. The adhesive 460a is used to adhere the overlay sheet 402a to an underlay sheet to form a laminated shingle. Although the adhesive 460a is shown as continuous strips or lines on each tab 410a and a continuous strip or line on the headlap portion 406a adjacent the tab portion 408a, the adhesive 460a may be applied in various forms and configurations including, but not limited to, dots, discontinuous segments, or combinations thereof. In other embodiments, the adhesive may be eliminated from the bottom surface of the overlay sheet 402a and may be applied on a top surface of an underlay sheet.

Turning now to FIG. 10A, an exemplary embodiment of an overlay sheet 502a in accordance with the present disclosure is illustrated. The overlay sheet 502a includes a headlap portion 506a and a tab portion 508a. The tab portion 508a includes a repeated pattern of tabs 510a and cutouts 512a. The overlay sheet 502a may optionally comprise a reinforcement layer (not shown) on a top surface of the headlap portion 506a, as previously described. The overlay sheet 502a also includes an adhesive 560a applied to its bottom surface. As seen in FIG. 10A, the adhesive 560a may be applied to the tabs 510a and to a portion of the headlap portion 506a adjacent the tab portion 508a of the overlay sheet 502a. The adhesive 560a is used to adhere the overlay sheet 502a to an underlay sheet to form a laminated shingle. Although the adhesive 560a is shown as continuous strips or lines on each tab 510a and a continuous strip or line on the headlap portion 506a adjacent the tab portion 508a, the adhesive 560a may be applied in various forms and configurations including, but not limited to, dots, discontinuous segments, or combinations thereof. In other embodiments, the adhesive may be eliminated from the bottom surface of the overlay sheet 502a and may be applied on a top surface of an underlay sheet.

Figure 10C:
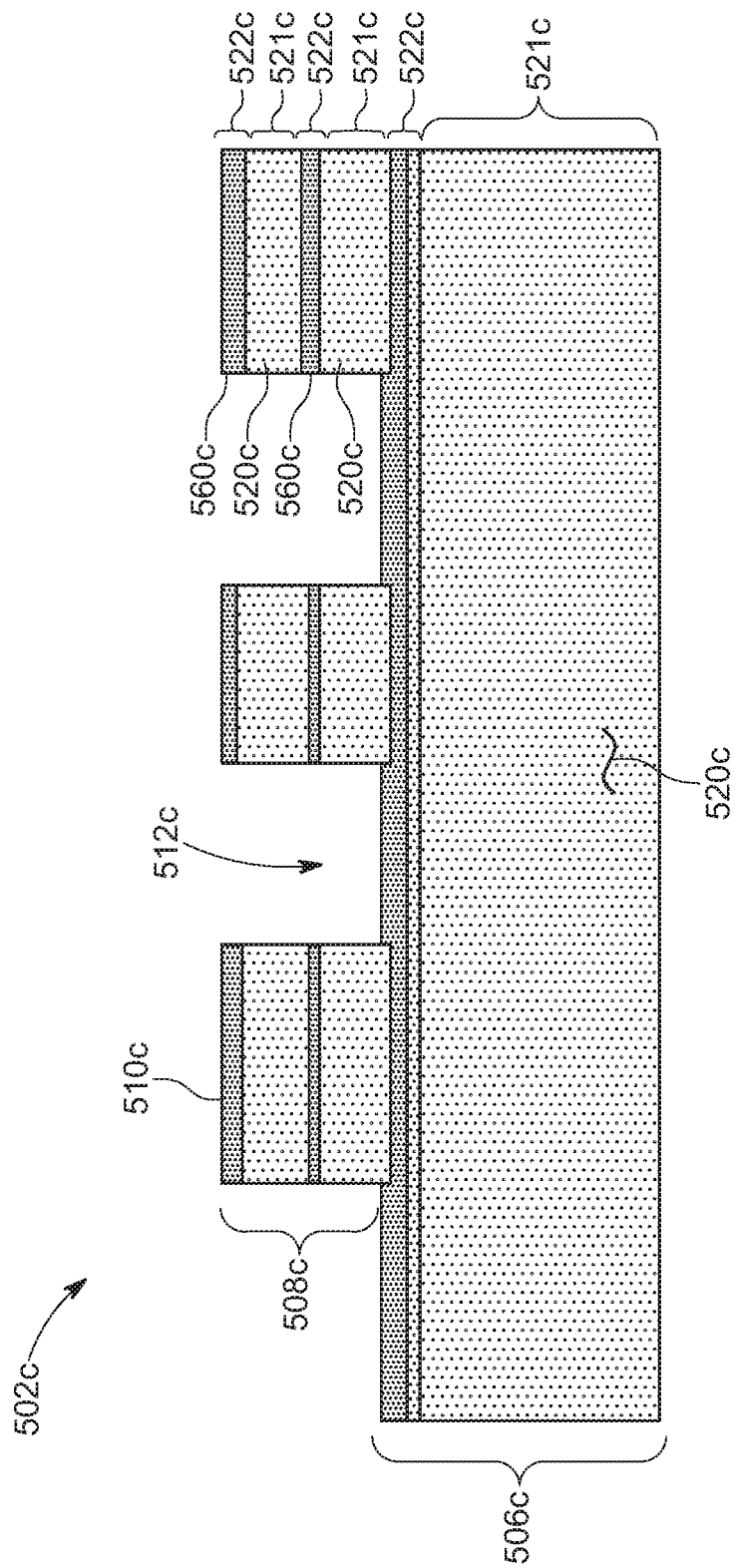
FIG. 10C is a bottom plan view of an exemplary embodiment of an overlay sheet of a laminated shingle of the present disclosure.

In the embodiments illustrated in FIGS. 10A, 10B, and 10C, a layer of parting material 520a is applied to the asphalt coating on the bottom surface of the overlay sheet 502a on at least a portion of the headlap portion 506a and on at least a portion of the tab portion 508a. In the examples illustrated by FIGS. 10A, 10B, and 10C, the parting material 520a is patterned with less, or no parting material 520a in the area where the adhesive 560a is applied. By providing less, or no parting material 520a in the area where the adhesive 560a is applied, the adhesion of the adhesive 560a to the back surface of the overlay sheet 502a can be ensured and/or optimized. In another exemplary embodiment, the layer of parting material 520a is applied to the entire bottom surface of the overlay sheet 502a (completely covering the tab portion and the headlap portion). In this exemplary embodiment, the amount, concentration, and/or thickness of the parting material can be selected to prevent the rear surface of the overlay sheet from sticking to shingle manufacturing equipment (See FIG. 13). Similarly, in the patterned embodiments of FIGS. 10A, 10B, and 10C, the amount, concentration, and/or thickness of the parting material in the areas of the adhesive 560a can be selected to prevent these areas of the overlay sheet from sticking to shingle manufacturing equipment.

In the example illustrated by FIG. 10A, the layer of parting material 520a is applied or patterned such that it is separated from the adhesive 560a by at least one gap G. The gaps G ensure that the layer of parting material 520a does not interfere with the application or the functioning of the adhesive 560a. The gaps G between the layer of parting material 520a and the adhesive 560a may be from 0.0625 inches to 1 inch, including from 0.0625 inches to 0.75 inches, from 0.125 inches to 0.75 inches, and also including from 0.25 inches to 0.5 inches. The gaps G may be the same distance or different distances.

The layer of parting material 520a may comprise any one or more of the parting materials described above. Preferably, the parting material comprises a metal stearate. More preferably, the parting material comprises zinc stearate. The layer of parting material 520a may have a thickness of 0.25 μm to 5 μm. In certain embodiments, the layer of parting material 520a may have a thickness of 0.25 μm to 2.5 μm. In certain embodiments, the thickness of the layer of parting material 520a on the headlap portion 506a is the same as the thickness of the layer of parting material 520a on the tab portion 508a. In certain embodiments, the thickness of the layer of parting material 520a on the headlap portion 506a is greater than the thickness of the layer of parting material 520a on the tab portion 508a. In certain embodiments, the thickness of the layer of parting material 520a on the headlap portion 506a is less than the thickness of the layer of parting material 520a on the tab portion 508a.

Referring now to FIG. 10B, an exemplary embodiment of an overlay sheet 502b in accordance with the present disclosure is illustrated. The overlay sheet 502b includes a headlap portion 506b and a tab portion 508b. The tab portion 508b includes a repeated pattern of tabs 510b and cutouts 512b. The overlay sheet 502b may optionally comprise a reinforcement layer (not shown) on a top surface of the headlap portion 506b, as previously described. The overlay sheet 502b also includes an adhesive 560b applied to its bottom surface. As seen in FIG. 8B, the adhesive 560b may be applied to the tabs 510b and to a portion of the headlap portion 506b adjacent the tab portion 508b of the overlay sheet 502b. The adhesive 560b is used to adhere the overlay sheet 502b to an underlay sheet to form a laminated shingle. Although the adhesive 560b is shown as continuous strips or lines on each tab 510b and a continuous strip or line on the headlap portion 506b adjacent the tab portion 508b, the adhesive 560b may be applied in various forms and configurations including, but not limited to, dots, discontinuous segments, or combinations thereof. In other embodiments, the adhesive may be eliminated from the bottom surface of the overlay sheet 502b and may be applied on a top surface of an underlay sheet.

In the embodiment illustrated in FIG. 10B, a layer of parting material 520b is applied to the asphalt coating on the bottom surface of the overlay sheet 502b on at least a portion of the headlap portion 506b and on at least a portion of the tab portion 508b. As shown in FIG. 8B, the layer of parting material 520b is applied or patterned such that it abuts the adhesive 560b. With this configuration, the layer of parting material 520b does not interfere with the application or the functioning of the adhesive 560b on the bottom surface of the overlay sheet 502b.

The layer of parting material 520b may comprise any one or more of the parting materials described above. Preferably, the parting material comprises a metal stearate. More preferably, the parting material comprises zinc stearate. The layer of parting material 520b may have a thickness of 0.25 μm to 5 μm. In certain embodiments, the layer of parting material 220 may have a thickness of 0.25 μm to 2.5 μm. In certain embodiments, the thickness of the layer of parting material 520b on the headlap portion 506b is the same as the thickness of the layer of parting material 520b on the tab portion 508b. In certain embodiments, the thickness of the layer of parting material 520b on the headlap portion 506b is greater than the thickness of the layer of parting material 520b on the tab portion 508b. In certain embodiments, the thickness of the layer of parting material 520b on the headlap portion 506b is less than the thickness of the layer of parting material 520b on the tab portion 508b.

Referring now to FIG. 10C, an exemplary embodiment of an overlay sheet 502c in accordance with the present disclosure is illustrated. The overlay sheet 502c includes a headlap portion 506c and a tab portion 508c. The tab portion 508c includes a repeated pattern of tabs 510c and cutouts 512c. The overlay sheet 502c may optionally comprise a reinforcement layer (not shown) on a top surface of the headlap portion 506c, as previously described. The overlay sheet 502c also includes an adhesive 560c applied to its bottom surface. As seen in FIG. 8C, the adhesive 560c may be applied to the tabs 510c and to a portion of the headlap portion 506c adjacent the tab portion 508c of the overlay sheet 502c. The adhesive 560c is used to adhere the overlay sheet 502c to an underlay sheet to form a laminated shingle. Although the adhesive 560c is shown as continuous strips or lines on each tab 510c and a continuous strip or line on the headlap portion 506c adjacent the tab portion 508c, the adhesive 560c may be applied in various forms and configurations including, but not limited to, dots, discontinuous segments, or combinations thereof. In other embodiments, the adhesive may be eliminated from the bottom surface of the overlay sheet 502c and may be applied on a top surface of an underlay sheet.

In the embodiment illustrated in FIG. 10C, a layer of parting material 520c is applied to the asphalt coating on the bottom surface of the overlay sheet 502c on at least a portion of the headlap portion 506c and on at least a portion of the tab portion 508c. In certain embodiments, the layer of parting material 520c is applied to the entire bottom surface of the overlay sheet 502c. In certain embodiments, the layer of parting material 520c is applied to the bottom surface of the overlay sheet 502c on at least a portion of the headlap portion 506c, but is omitted from at least a portion the tab portion 508c. As shown in FIG. 8C, the layer of parting material 520c comprises at least one first parting material area 521c and at least one second parting material area 522c. The first parting material area 521c generally corresponds to areas of parting material on the bottom surface of the overlay sheet 502c that do not overlap with adhesive 560c, and the second parting material area 522c generally corresponds to areas of parting material on the bottom surface of the overlay sheet 502c that overlap with adhesive 560c. It should be understood that the second parting material area 522c can extend beyond the area corresponding to where the adhesive 560c is located. As shown in FIG. 8C, the headlap portion 506c includes a first parting material area 521c and a second parting material 522c that overlaps with the adhesive 560c, and each tab 510c two first parting material areas 521c and two second parting material areas 522c that overlap with the adhesives 560c.

In certain embodiments, the thickness of the layer of parting material 520c in the first parting material area 521c is greater than the thickness of the layer of parting material 520c in the second parting material area 522c. In certain embodiments, the thickness of the layer of parting material 520c in the first parting material area 521c is from 5% to 95% greater, including from 10% to 95% greater, including from 25% to 95% greater, and also including from 50% to 95% greater than the thickness of the layer of parting material 520c in the second parting material area 522c. Providing a thinner layer of parting material 520c in the second parting material area 522c than in the first parting material area 521c reduces the likelihood that the layer of parting material 520c will interfere with the application or functioning of the adhesive 560c. A thicker layer of parting material 520c in the first parting material area 521c also ensures that the overlay sheet 502c does not stick to equipment during manufacturing, and prevents or reduces sticking when formed into a shingle and packaged with other shingles in a bundle.

In certain embodiments, the area weight (lb/ft$^2$) of the layer of parting material 520c in the first parting material area 521c is greater than the area weight of the layer of parting material 520c in the second parting material area 522c. In certain embodiments, the area weight of the layer of parting material 520c in the first parting material area 521c is from 5% to 95% greater, including from 10% to 95% greater, including from 25% to 95% greater, and also including from 50% to 95% greater than the area weight of the layer of parting material 520c in the second parting material area 522c. Providing a smaller area weight of parting material 520c in the second parting material area 522c than in the first parting material area 521c reduces the likelihood that the layer of parting material 520c in the second parting material area 522c will interfere with the application or functioning of the adhesive 560c. The larger area weight of parting material 520c in the first parting material area 521c also ensures that the overlay sheet 502c does not stick to equipment during manufacturing, and prevents or reduces sticking when formed into a shingle and packaged with other shingles in a bundle. The different area weights may be accomplished by using liquid-applied parting agents having different concentrations of parting material. For example, a liquid-applied parting agent having a first concentration of parting material may be used create the layer of parting material 520c in the first parting material areas 521c, and a liquid-applied parting agent having a second concentration of parting material that is less than the first concentration of parting material may be used to create the layer of parting material 520c in the second parting material areas 522c.

The layer of parting material 520c in the first parting material area 521c may comprise the same parting material or a different parting material as the layer of parting material 520c in the second parting material area 522c. The parting material may comprise any one or more of the parting materials described above. Preferably, the parting material comprises a metal stearate. More preferably, the parting material comprises zinc stearate. In certain embodiments, the layer of parting material 520c in the first parting material area 521c comprises a polyolefin and the layer of parting material 520c in the second parting material area 522c comprises a metal stearate. In certain embodiments, the layer of parting material 520c in the first parting material area 521c comprises a metal stearate and the layer of parting material 520c in the second parting material area 522c comprises a polyolefin. In certain embodiments, the layer of parting material 520c in the first parting material area 521c comprises a first metal stearate and the layer of parting material 520c in the second parting material area 522c comprises a second metal stearate different from the first metal stearate. In certain embodiments, the layer of parting material 520c in the first parting material area 521c and in the second parting material area 522c comprises zinc stearate.

As indicated above, the liquid-applied parting agent may be applied to the top of a laminated shingle.

Figure 11A:
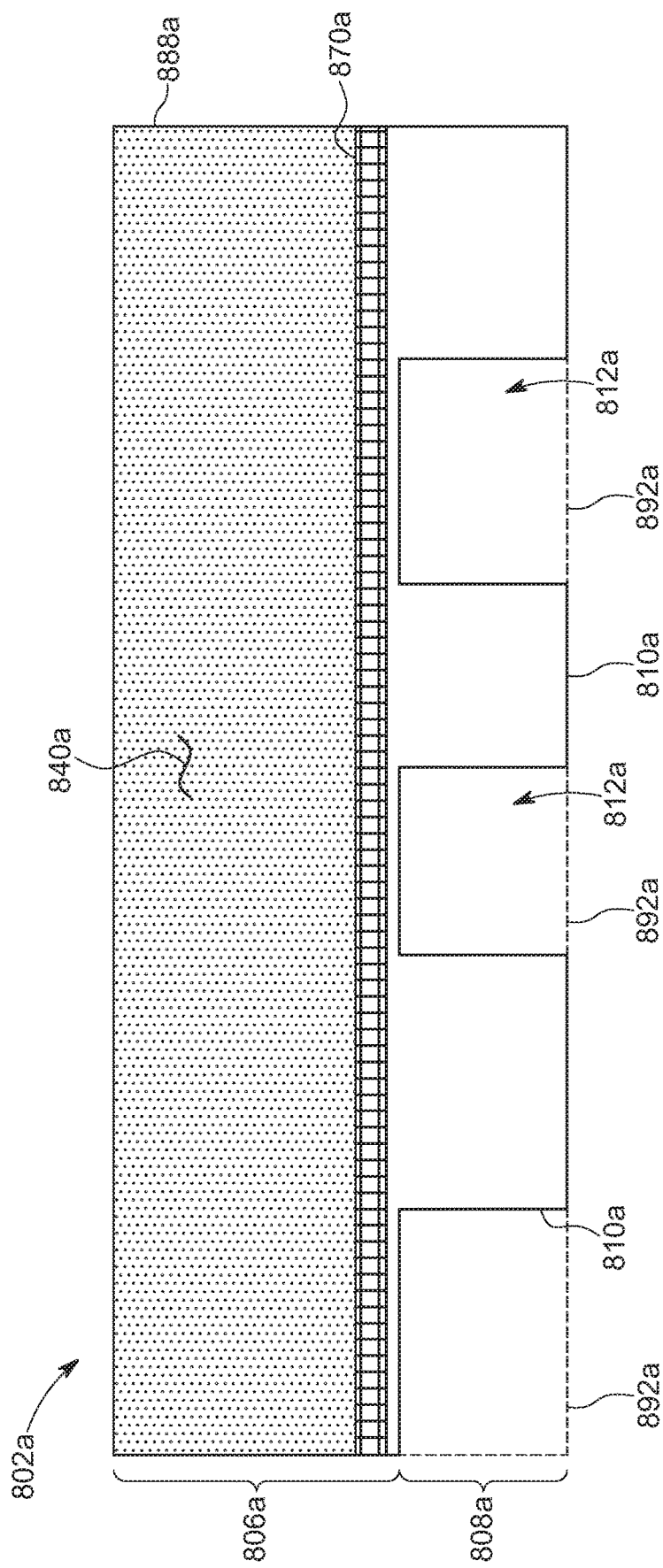
FIG. 11A is a top plan view of an exemplary embodiment of a laminated shingle of the present disclosure.

Turning now to FIG. 11A, a top view of an exemplary embodiment of a laminated shingle 802a in accordance with the present disclosure is illustrated. The laminated shingle 802a includes an overlay sheet 888a includes a headlap portion 806a and a tab portion 808a. The tab portion 808a includes a repeated pattern of tabs 810a and cutouts 812a. The overlay sheet 802a may optionally comprise a reinforcement layer 870a on a top surface of the headlap portion 806a, as previously described. The laminated shingle 802a also includes an underlay sheet 892a (shown in phantom). The overlay sheet 802a also includes an adhesive (not shown), as described above, applied to the bottom surface. The adhesive may be used to attach the overlay sheet 802a to an underlay sheet 892a to form a laminated shingle. In other embodiments, the adhesive may be eliminated from the bottom surface of the overlay sheet 802a and may be applied on a top surface of an underlay sheet 892a.

In the embodiment illustrated in FIG. 11A, the layer of parting material 840a is applied to the asphalt coating on the top surface of the overlay sheet 888a at the headlap portion 806a. The tab portion 808a includes embedded granules (not shown). As shown in FIG. 11A, the layer of parting material 840a abuts or at least partially overlaps with reinforcement layer 870a.

In certain embodiments, laminated shingle 802a of FIG. 11A may be described by the amount of the headlap portion 806a that is covered by the layer of parting material 840a. In certain embodiments, all or substantially all of the headlap portion 806a (with the exception of any area covered by reinforcement layer 870a) is covered by the layer of parting material 840a. Substantially all of the headlap portion 806a is covered by the layer of parting material 840a when only small areas of granules are missing, for example, due to manufacturing variances. In certain embodiments, the layer of parting material 840a covers greater than 30%, in other embodiments greater than 40%, in other embodiments greater than 50%, and in other embodiments greater than 60% of the headlap portion of laminated shingle 802a. In these or other embodiments, the layer of parting material 840a covers less than 95%, in other embodiments less than 90%, in other embodiments less than 85%, and in other embodiments less than 80% of the headlap portion of laminated shingle 802a. In certain embodiments, the layer of parting material 840a covers from 30% to 95%, in other embodiments from 40% to 90%, in other embodiments from 50% to 85%, and in other embodiments from 60% to 80% of the headlap portion of the laminated shingle 802a.

The amount, thickness, and/or concentration of parting material in the layer of parting material 840a in FIG. 11A is sufficient to prevent all or substantially of the granules from sticking laminated shingle 802a in the layer of parting material 840a. In certain embodiment, the section of the shingle with the parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 840a in FIG. 11A may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 840*a* may also be applied to form a design or a pattern.

The layer of parting material 840*a* may comprise any one or more of the parting materials described above. Preferably, the parting material comprises a metal stearate. More preferably, the parting material comprises zinc stearate. The layer of parting material 840*a* may have a thickness of 0.25 μm to 5 μm. In certain embodiments, the layer of parting material 840*a* may have a thickness of 0.25 μm to 2.5 μm.

Figure 11B:
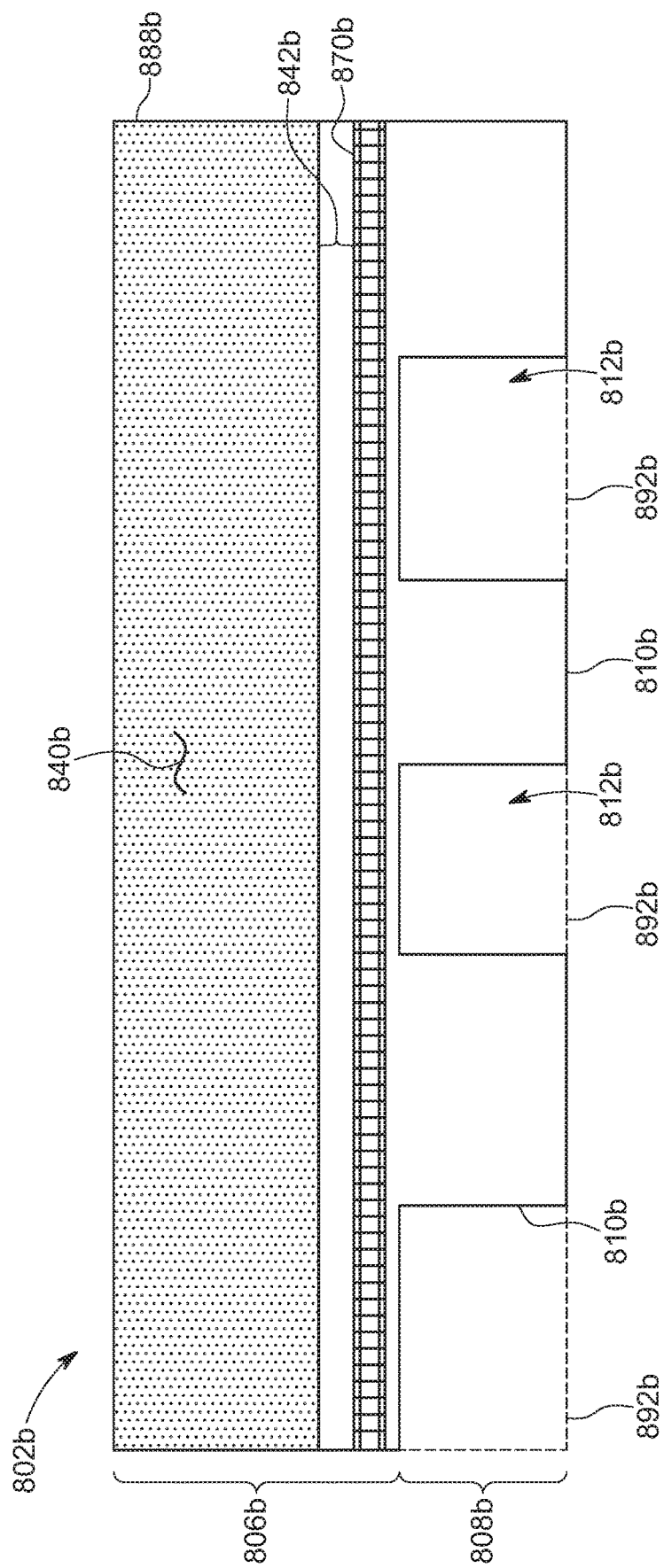
FIG. 11B is a top plan view of an exemplary embodiment of a laminated shingle of the present disclosure.

Turning now to FIG. 11B, a top view of an exemplary embodiment of a laminated shingle 802*b* in accordance with the present disclosure is illustrated. The laminated shingle 802*b* includes an overlay sheet 888*b* includes a headlap portion 806*b* and a tab portion 808*b*. The tab portion 808*a* includes a repeated pattern of tabs 810*b* and cutouts 812*b*. The overlay sheet 802*b* may optionally comprise a reinforcement layer 870*a* on a top surface of the headlap portion 806*b*, as previously described. The laminated shingle 802*b* also includes an underlay sheet 892*b* (shown in phantom). The overlay sheet 802*b* also includes an adhesive (not shown), as described above, applied to the bottom surface. The adhesive may be used to attach the overlay sheet 802*b* to an underlay sheet 892*b* to form a laminated shingle. In other embodiments, the adhesive may be eliminated from the bottom surface of the overlay sheet 802*b* and may be applied on a top surface of an underlay sheet 892*b*.

In the embodiment illustrated in FIG. 11B, the layer of parting material 840*b* is applied to the asphalt coating on the top surface of the overlay sheet 888*b* at the headlap portion 806*b*. The tab portion 808*b* includes embedded granules (not shown). As shown in FIG. 11B, there is a gap 842*b* that does not include the parting material. The gap 842*b* may be located between the layer of parting material 840*b* and the reinforcement layer 870*b*. Due to the lack of parting material, granules are embedded in gap 842*b*. In certain embodiments, the gap 842*b* may be greater than 0.0625 inches, in other embodiments greater than 0.125 inches, and in other embodiments greater than 0.25 inches. In these or other embodiments, the gap 842*b* may be less than 2 inches, in other embodiments less than 1 inch, and in other embodiments less than 0.75 inches.

In certain embodiments, the laminated shingle 802*b* of FIG. 11B may be described by the amount of the headlap portion 806*b* that is covered by the layer of parting material 840*b*. In certain embodiments, all or substantially all of the headlap portion 806*b* (with the exception of any area covered by reinforcement layer 870*a*) is covered by the layer of parting material 840*b*. Substantially all of the headlap portion 806*b* is covered by the layer of parting material 840*b* when only small areas of granules are missing, for example, due to manufacturing variances. In certain embodiments, the layer of parting material 840*b* covers greater than 30%, in other embodiments greater than 40%, in other embodiments greater than 50%, and in other embodiments greater than 60% of the headlap portion of the laminated shingle 802*b*. In these or other embodiments, the layer of parting material 840*b* covers less than 95%, in other embodiments less than 90%, in other embodiments less than 85%, and in other embodiments less than 80% of the headlap portion of the laminated shingle 802*b*. In certain embodiments, the layer of parting material 840*b* covers from 30% to 95%, in other embodiments from 40% to 90%, in other embodiments from 50% to 85%, and in other embodiments from 60% to 80% of the headlap portion of the laminated shingle 802*b*.

The amount, thickness, and/or concentration of parting material in the layer of parting material 840*b* in FIG. 11B is sufficient to prevent all or substantially all of the granules from sticking laminated shingle 802*b* in the layer of parting material 840*b*. In certain embodiment, the section of the shingle with the parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 840*b* in FIG. 11B may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 840*b* may also be applied to form a design or a pattern.

The layer of parting material 840*b* may comprise any one or more of the parting materials described above. Preferably, the parting material comprises a metal stearate. More preferably, the parting material comprises zinc stearate. The layer of parting material 840*b* may have a thickness of 0.25 μm to 5 μm. In certain embodiments, the layer of parting material 840*b* may have a thickness of 0.25 μm to 2.5 μm.

Figure 11C:
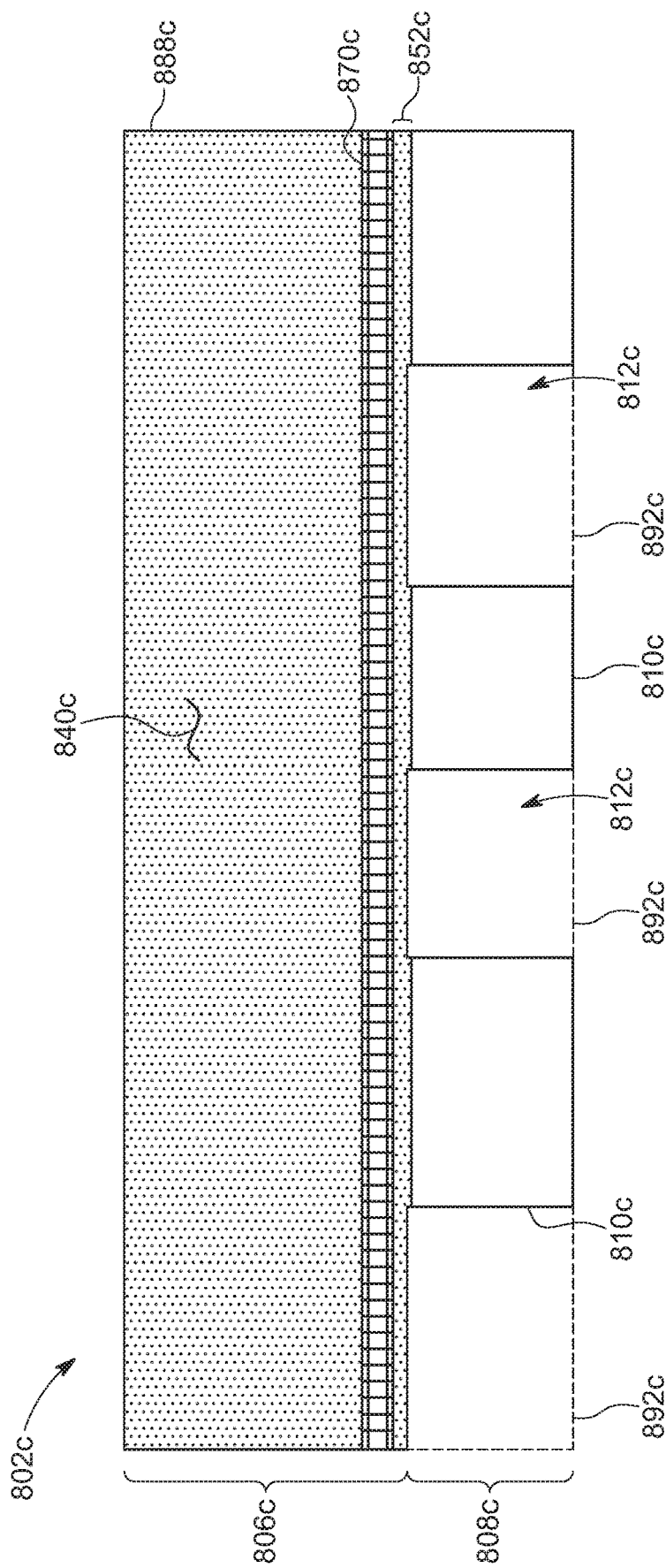
FIG. 11C is a top plan view of an exemplary embodiment of a laminated shingle of the present disclosure.

Turning now to FIG. 11C, a top view of an exemplary embodiment of a laminated shingle 802*d* in accordance with the present disclosure is illustrated. The laminated shingle 802*d* includes an overlay sheet 888*d* includes a headlap portion 806*d* and a tab portion 808*d*. The tab portion 808*d* includes a repeated pattern of tabs 810*d* and cutouts 812*d*. The overlay sheet 802*d* may optionally comprise a reinforcement layer 870*d* on a top surface of the headlap portion 806*d*, as previously described. The laminated shingle 802*d* also includes an underlay sheet 892*d* (shown in phantom). The overlay sheet 802*d* also includes an adhesive (not shown), as described above, applied to the bottom surface. The adhesive may be used to attach the overlay sheet 802*d* to an underlay sheet 892*d* to form a laminated shingle. In other embodiments, the adhesive may be eliminated from the bottom surface of the overlay sheet 802*d* and may be applied on a top surface of an underlay sheet 892*d*.

In the embodiment illustrated in FIG. 11C, the layer of parting material 840*d* is applied to the asphalt coating on the top surface of the overlay sheet 888*d* at the headlap portion 806*d*. The tab portion 808*d* includes embedded granules (not shown). As shown in FIG. 11C, the layer of parting material 840*d* abuts or at least partially overlaps with reinforcement layer 870*d*. In shingle 802*d* of FIG. 11C, a strip of parting material 852*d* is located between reinforcement layer 870*d* and tab portion 808*d*. The strip of parting material 852*d* may abut or at least partially overlaps with reinforcement layer 870*d*. In certain embodiments, the parting material may be applied to cover or overlap reinforcement layer 870*d*. In embodiments where the parting material to covers or overlaps reinforcement layer 870*d*, one continuous section of parting material may connect the strip of parting material 852*d*, reinforcement layer 870*d*, and parting material 840*d*.

In certain embodiments, the shingle 802*d* of FIG. 11C may be described by the amount of the headlap portion 806*d* that is covered by the parting material 740*d*. In certain embodiments, all or substantially all (e.g. greater than 90%) of the headlap portion 806*d* (with the exception of any area covered by reinforcement layer 870*d*) is covered by the layer of parting material 840*d*. Substantially all of the headlap portion 806d is covered by the layer of parting material 840d when only small areas of granules are missing, for example, due to manufacturing variances.

The amount, thickness, and/or concentration of parting material in the layer of parting material 840d in FIG. 11C is sufficient to prevent all or substantially of the granules from sticking laminated shingle 802d in the layer of parting material 840d. In certain embodiment, the section of the shingle with the parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 840d in FIG. 11C may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 840d may also be applied to form a design or a pattern.

The layer of parting material 840d may comprise any one or more of the parting materials described above. Preferably, the parting material comprises a metal stearate. More preferably, the parting material comprises zinc stearate. The layer of parting material 840d may have a thickness of 0.25 μm to 5 μm. In certain embodiments, the layer of parting material 840d may have a thickness of 0.25 μm to 2.5 μm.

Figure 12:
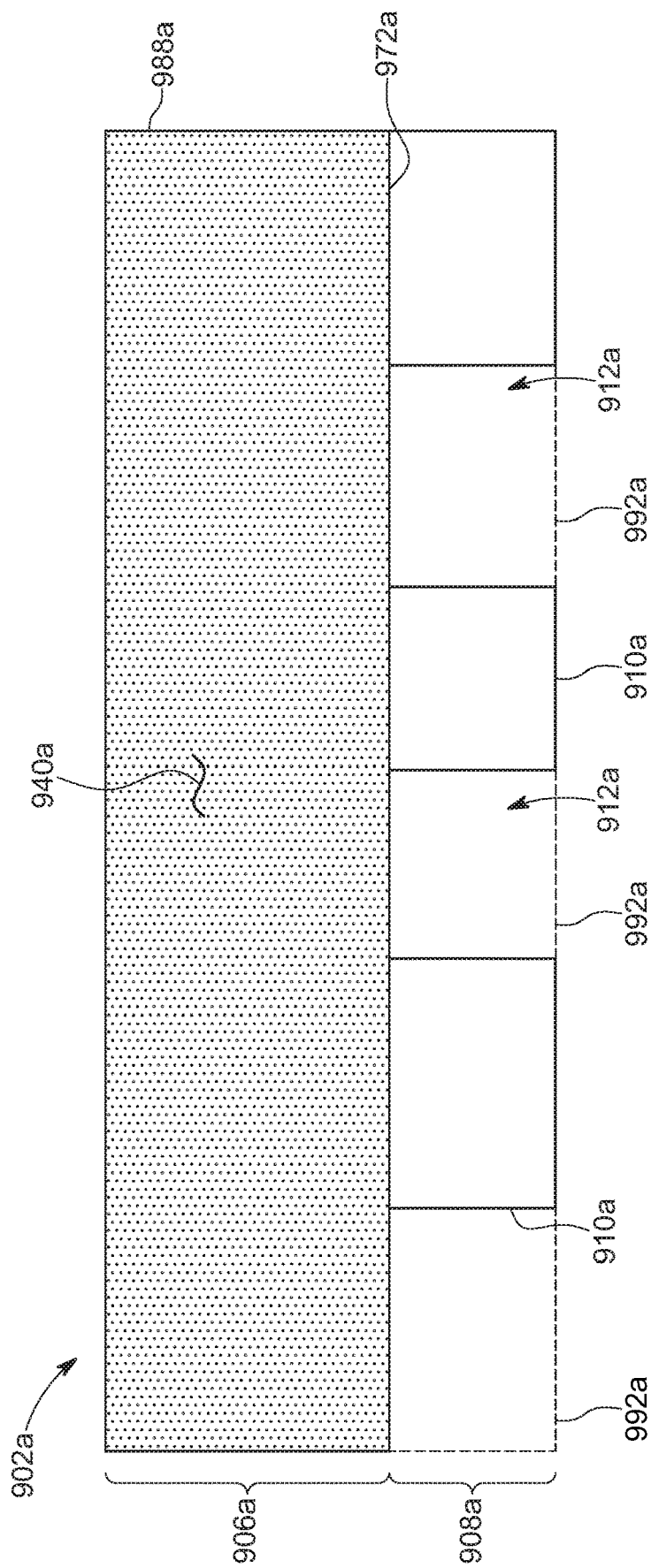
FIG. 12 is a top plan view of an exemplary embodiment of a laminated shingle of the present disclosure.

Turning now to FIG. 12, a top view of an exemplary embodiment of a laminated shingle 902a in accordance with the present disclosure is illustrated. The laminated shingle 902a includes an overlay sheet 988a includes a headlap portion 906a and a tab portion 908a. The tab portion 908a includes a repeated pattern of tabs 910a and cutouts 912a. The laminated shingle 902a also includes an underlay sheet 992a (shown in phantom). The overlay sheet 902a also includes an adhesive (not shown), as described above, applied to the bottom surface. The adhesive may be used to attach the overlay sheet 902a to an underlay sheet 992a to form a laminated shingle. In other embodiments, the adhesive may be eliminated from the bottom surface of the overlay sheet 902a and may be applied on a top surface of an underlay sheet 992a.

In the embodiment illustrated in FIG. 12, the layer of parting material 940 is applied to the asphalt coating on the top surface of the overlay sheet 988a at the headlap portion 906a. The tab portion 908a includes embedded granules (not shown). As shown in FIG. 12, the layer of parting material 940a abuts with the tab portion 908a at parting material boundary 972a. While shown abutting the tab portion 908a in FIG. 12, there may be sections of embedded granules on headlap portion 908a between the parting material boundary 972a and the tab portion 908a. In these embodiments, the parting material boundary 972a may be placed higher on the headlap portion 908a to create an area of embedded granules between the parting material boundary 972a and the tab portion 908a.

In certain embodiments, the shingle 902a of FIG. 12 may be described by the area of the headlap portion 906a that is covered by the layer of parting material 940a. In certain embodiments, all or substantially all of the headlap portion 906a is covered by the layer of parting material 940a. Substantially all of the headlap portion 906a is covered by the layer of parting material 940a when only small areas of granules are missing, for example, due to manufacturing variances. In certain embodiments, the layer of parting material 940a covers greater than 30%, in other embodiments greater than 40%, in other embodiments greater than 50%, and in other embodiments greater than 60% of the headlap portion of the shingle 906a. In these or other embodiments, the layer of parting material 940a covers less than 95%, in other embodiments less than 90%, in other embodiments less than 85%, and in other embodiments less than 80% of the headlap portion of the shingle 902a. In certain embodiments, the layer of parting material 940a covers from 30% to 95%, in other embodiments from 40% to 90%, in other embodiments from 50% to 85%, and in other embodiments from 60% to 80% of the headlap portion of shingle 902a.

In certain embodiments, laminated shingle 902a of FIG. 12 may be described by the amount of the headlap portion 906a that is covered by the layer of parting material 940a. In certain embodiments, all or substantially all of the headlap portion 906a (with the exception of any area covered by reinforcement layer 970a) is covered by the layer of parting material 940a. Substantially all of the headlap portion 906a is covered by the layer of parting material 940a when only small areas of granules are missing, for example, due to manufacturing variances. In certain embodiments, the layer of parting material 940a covers greater than 30%, in other embodiments greater than 40%, in other embodiments greater than 50%, and in other embodiments greater than 60% of the headlap portion of the laminated shingle 802a. In these or other embodiments, the layer of parting material 940a covers less than 95%, in other embodiments less than 90%, in other embodiments less than 85%, and in other embodiments less than 80% of the headlap portion of the laminated shingle 902a. In certain embodiments, the layer of parting material 940a covers from 30% to 95%, in other embodiments from 40% to 90%, in other embodiments from 50% to 85%, and in other embodiments from 60% to 80% of the headlap portion of the laminated shingle 902a.

The amount, thickness, and/or concentration of parting material in the layer of parting material 940a in FIG. 12 is sufficient to prevent all or substantially all of the granules from sticking to laminated shingle 902a in the layer of parting material 940a. In certain embodiments, the section of the shingle with the parting material includes less than 5 granules per square inch, in other embodiments less than 2 granules per square inch, in other embodiments less than 1 granule per square inch, in other embodiments less than 0.5 granule per square inch, and in other embodiments less than 0.1 granule per square inch.

In certain embodiments, the layer of parting material 940a in FIG. 12 may be uniform or approximately uniform. In other embodiments, different amounts, thicknesses and/or concentrations of parting material can be applied to different areas of the top of the shingle. Examples of ways that the parting material can be applied in different amounts, thicknesses, and/or concentrations are described above. While shown as a continuous coating, the layer of parting material 940a may also be applied to form a design or a pattern.

The layer of parting material 940a may comprise any one or more of the parting materials described above. Preferably, the parting material comprises a metal stearate. More preferably, the parting material comprises zinc stearate. The layer of parting material 940a may have a thickness of 0.25 μm to 5 μm. In certain embodiments, the layer of parting material 940a may have a thickness of 0.25 μm to 2.5 μm.

Figure 13:
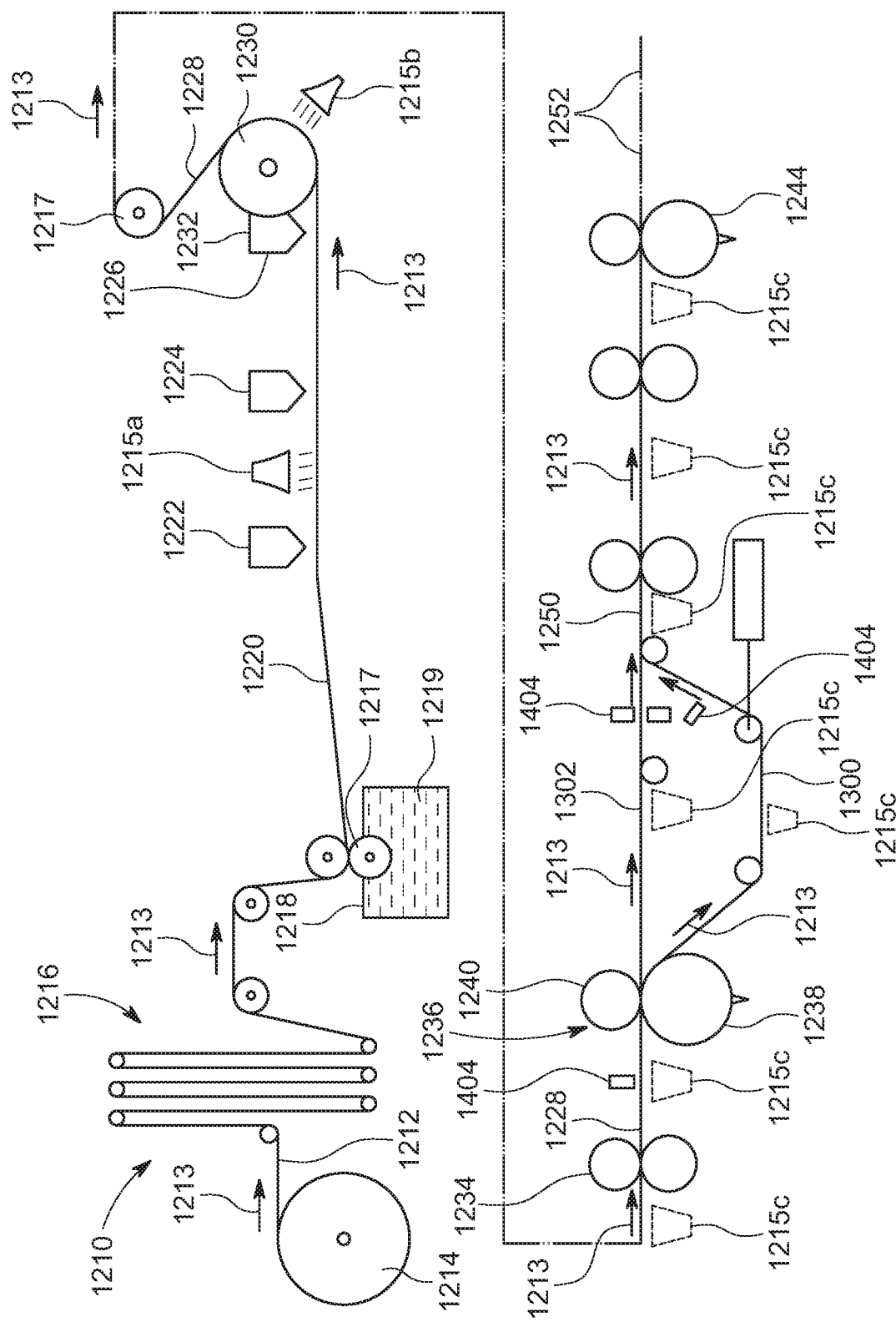
FIG. 13 is a schematic view in elevation of an exemplary embodiment of an apparatus for manufacturing an asphalt-based roofing material of the present disclosure.

Referring now to FIG. 13, an exemplary embodiment of an apparatus 1210 for manufacturing asphalt-based roofing materials using a liquid-applied parting agent is shown. The apparatus and manufacturing process may be configured in a variety of ways. Any apparatus and process suitable for producing an asphalt-based roofing material with a liquid-applied parting agent applied to the roofing material may be used.

The illustrated manufacturing process involves passing a continuous sheet of substrate or shingle mat 1212 in a machine direction 1213 through a series of manufacturing operations. The sheet usually moves at a speed of at least about 200 feet/minute (61 meters/minute), and typically at a speed within the range of 450 feet/minute (137 meters/minute) to 800 feet/minute (244 meters/minute). Other speeds, however, may be used.

In a first step of the manufacturing process, the continuous sheet of shingle mat or substrate 1212 is payed out from a roll 1214. The shingle mat 1212 may be any type known for used in reinforcing asphalt-based roofing materials, such as a nonwoven web of glass fibers. Alternatively, the shingle mat 1212 may be a scrim or felt of fibrous materials such as mineral fibers, cellulose fibers, rag fibers, mixtures of mineral and synthetic fibers, or the like.

The sheet of shingle mat 1212 is passed from the roll 1214 through an accumulator 1216. The accumulator 1216 allows time for splicing one roll 1214 of substrate to another, during which time the shingle mat 1212 within the accumulator 1216 is fed to the manufacturing process so that the splicing does not interrupt manufacturing.

Next, the shingle mat 1212 is passed through a coater 1218 where a coating of hot, melted asphalt 1219 is applied to the shingle mat 1212 to form an asphalt-coated sheet 1220. The asphalt coating 1219 may be applied in any suitable manner. In the illustrated embodiment, the shingle mat 1212 contacts a roller 1217, which is in contact with the supply of hot, melted asphalt 1219. The roller 1217 completely covers the shingle mat 1212 with a tacky coating of asphalt 1219. However, in other embodiments, the asphalt coating 1219 could be sprayed on, rolled on, or applied to the shingle mat 1212 by other means. Typically, the asphalt coating is highly filled with a ground mineral filler material, amounting to at least about 42% by weight of the asphalt/filler combination. In one embodiment, the asphalt coating 1219 is at a temperature of about 350° F. to about 400° F. In another embodiment, the asphalt coating 1219 may be more than 400° F. or less than 350° F. The shingle mat 1212 exits the coater 1218 as the asphalt-coated sheet 1220. The asphalt coating 1219 on the asphalt-coated sheet 1220 remains hot.

Referring again to FIG. 13, the asphalt-coated sheet 1220 is passed beneath one or more granule applicators 1222, 1224, 1226 where colored granules, blend drop granules, shadow granules, headlap granules, and so forth may be applied to one or more portions of the asphalt-coated sheet 1220. The various granules are applied to the extent that the asphalt-coated sheet 1220 becomes completely covered with granules, thereby defining a continuous granule-coated sheet 1228. The granule-coated sheet 1228 is then turned around a slate drum 1230 to press the granules into the asphalt coating and to temporarily invert the sheet 1228. Alternatively, in embodiments where a liquid-applied parting agent is employed, a portion of the asphalt-coated sheet 1220 is coated with the parting agent with a sprayer or other application device 1215*a* before the granules are applied. In certain embodiments, one or more additional sprayers or other application devices (not shown) may be employed to coat the asphalt-coated sheet 1220 with different concentrations or amounts of the liquid-applied parting agent. Such inverting of the granule-coated sheet 1228 causes any excess granules to drop off the granule-coated sheet 1228 on the backside of the slate drum 1230. In the embodiments, where a sprayer or other application device 1215*a* is employed prior to the application of granules using one or more granule applicators 1222, 1224, 1226, the section of the asphalt-coated sheet 1220 that includes the layer of parting material will be granule free or substantially granule free. The excess granules are collected by a hopper 1232 of granule applicator 1226 and may be reused. The hopper 1232 is positioned on the backside of the slate drum 1230.

As seen in FIG. 13, a liquid-applied parting agent can be applied to a bottom surface of the asphalt coated sheet at any point after the substrate is coated with asphalt (i.e. after the coating apparatus) and before the rear surface of the asphalt coated sheet comes into contact with another surface of the apparatus 1210 (e.g. the roll 1217 in the illustrated apparatus). The parting agent prevents the rear surface of the asphalt coated sheet from sticking to the contact surfaces of the apparatus 1210. In the example illustrated by FIG. 13, the bottom surface of the granule-coated sheet 1228 is coated with the parting agent with a sprayer or other application device 1215*b* after the granules are applied. For example, the bottom surface of the granule-coated sheet 1228 can be coated with the parting agent with a sprayer or other application device 1215*b* when the granule-coated sheet 1228 is turned around the slate drum, between the drum 1230 and the roll 1217, at the roll 1217, and/or the roll 1217 can be sprayed with the parting agent. The sprayer or other application device 1215*b* may be configured to apply the liquid-applied parting agent to achieve any of the previously described configurations or patterns of the layer of parting material on the bottom surface of the granule-coated sheet 1228. Or, a thin layer of the parting agent can be applied with the application device 1215*b* before or at the first contact point after the coating of the rear surface with the apparatus 1210 and additional layers can be applied with additional application devices 1215*c*. The additional application devices 1215*c* can be positioned at a variety of different positions on the apparatus 1210. These additional application devices 1215*c* may be configured to apply the liquid-applied parting agent to achieve any of the previously described configurations or patterns of the layer of parting material on the bottom surface of the granule-coated sheet 1228. The additional application devices 1215*c* can be provided after application of the adhesives 230, 330, 460*a*, 560*a*, 560*b*, 560*c* described. Although FIG. 13 illustrates application of the liquid-applied parting agent by spraying, other methods of application may be used including, but not limited to, roll coating, flood coating, reverse roll coating, or any other suitable method for applying the liquid-applied parting agent. Preferably, the liquid-applied parting agent is applied to the bottom surface of the asphalt-coated sheet after exiting the coater 1218 and prior to the bottom surface of the asphalt-coated sheet contacting any surface associated with the manufacturing process. When applied in this manner, the layer of parting material prevents the bottom surface of the asphalt-coated sheet from sticking to the manufacturing equipment.

Figure 16:
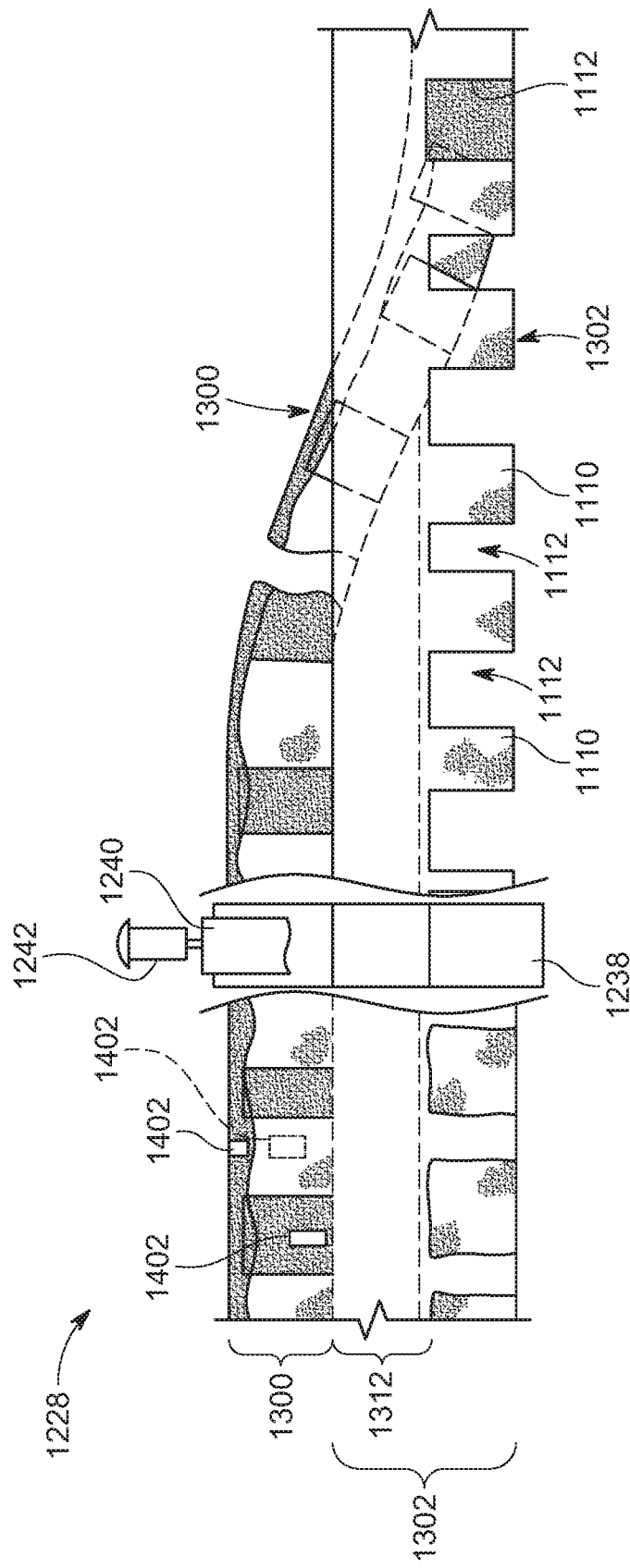
FIG. 16 is a top plan view of a portion of the apparatus illustrated in FIG. 13 showing the laminating of a continuous underlay sheet beneath a continuous overlay sheet to form a continuous laminated sheet.

With continued reference to FIG. 13, the continuous granule-coated sheet 1228 is fed through pull rolls 1234 that regulate the speed of the granule-coated sheet 1228 as it moves downstream. In one embodiment, at least one of the pull rolls 1234 is driven by a motor (not shown). The granule-coated sheet 1228 is subsequently fed through a rotary pattern cutter 1236 which includes a bladed cutting cylinder 1238, a backup roll 1240, and a motor 1242, as shown in FIG. 16. The pattern cutter 1236 cuts a repeated pattern of tabs 1110 and cutouts 1120 (FIG. 16) through the tab sheet portion 1310, as shown by dashed line A in FIG. 14. Cutting the repeated pattern of tabs and cutouts separates the first overlay sheet portion 1302 from the second overlay sheet portion 1304.

Figure 14:
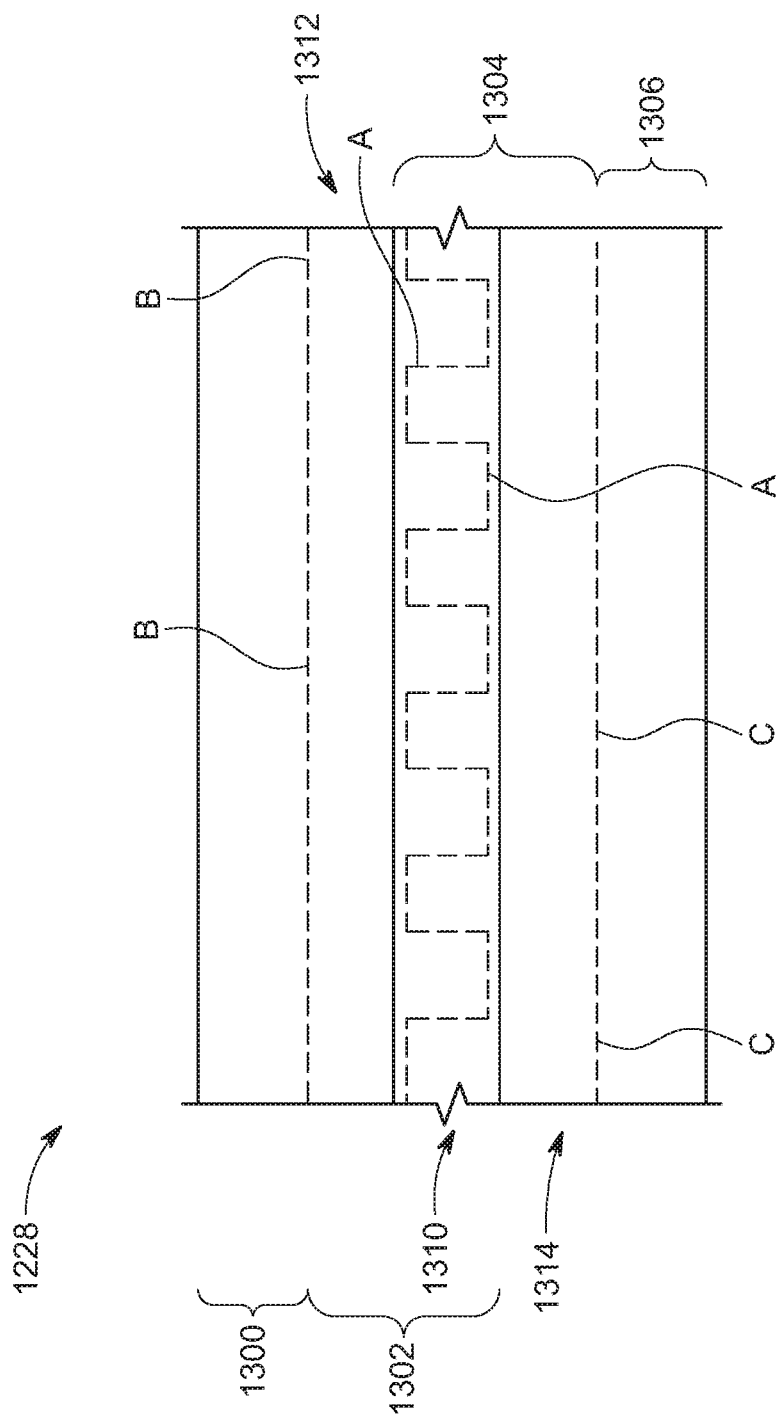
FIG. 14 is a top plan view of a portion of an asphalt coated sheet produced by the apparatus of FIG. 13.

Referring to FIG. 14, the granule-coated sheet 1228 includes a first continuous underlay sheet portion 1300, a first continuous overlay sheet portion 1302, a second continuous overlay sheet portion 1304, and a second continuous underlay sheet portion 1306. The first continuous overlay sheet portion 1302 includes a continuous tab sheet portion 1310 and a first continuous headlap sheet portion 1312. The second continuous overlay sheet portion 1304 includes a second continuous headlap sheet portion 1314 and shares the continuous tab sheet portion 1310 with the first continuous overlay sheet portion 1302. In addition to cutting a repeated pattern of tabs and cutouts, the pattern cutter 1236, shown in FIG. 16, cuts the granule-coated sheet 1228 to separate the first continuous underlay sheet 1300 from the first continuous overlay sheet portion 1302 and to separate the second continuous underlay sheet 1306 from the second continuous overlay sheet portion 1304, as shown by the dashed lines B and C in FIG. 14, respectively.

Figure 15:
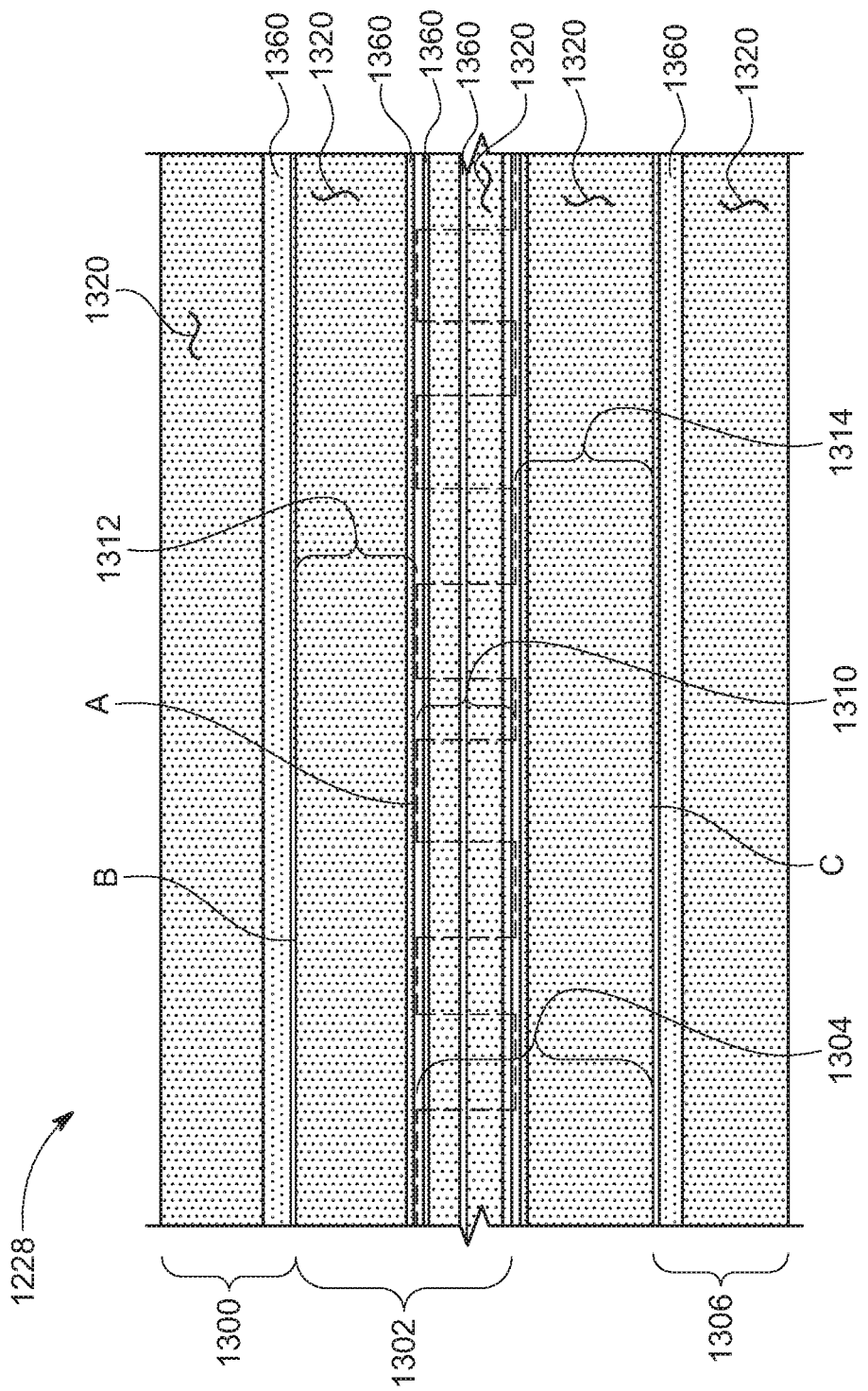
FIG. 15 is a bottom plan view of a portion of an asphalt coated sheet produced by the apparatus of FIG. 13.

Referring now to FIG. 15, adhesives 1360 are applied to the bottom surface of the granule-coated sheet 1228. The adhesive 1360 may be applied by any conventional application method. For example, the adhesives 1360 can be sprayed onto or rolled onto the bottom surface of the granule-coated sheet 1228. As seen in FIG. 15, adhesives 1360 are applied to a portion of the first underlay sheet portion 1300, a portion of the second underlay sheet portion 1306, a portion of the first overlay sheet portion 1302 at the tab sheet portion 1310 and the first headlap portion 1312, and a portion of the second overlay sheet portion 1304 at the tab sheet portion 1310 and the second headlap portion 1314. Although the adhesives 1360 are shown as continuous strips or lines, the adhesive 1360 may be applied in various forms and configurations including, but not limited to, dots, discontinuous segments, or combinations thereof.

As seen in FIG. 15, a layer of parting material 1320 is applied to the rear surface of the granule-coated sheet 1228. The layer of parting material 1320 may be applied to the entire bottom surface of the granule-coated sheet 1228 and/or patterned to form any of the patterns described above. The layer of parting material 1320 may be applied to or patterned on the bottom surface of the granule-coated sheet 1228 using any of the configurations, thicknesses, area weights, parting materials, etc., as previously described herein.

Referring now to FIG. 15a, a bottom view of a continuous granule-coated sheet 1228 similar to that shown in FIGS. 14 and 15 is illustrated. The continuous granule-coated sheet 1228 may be formed in accordance with the process described above with reference to FIG. 13. The continuous granule-coated sheet 1228 includes a first continuous underlay sheet portion 1300, a first continuous overlay sheet portion 1302, a second continuous overlay sheet portion 1304, and a second continuous underlay sheet portion 1306. The first continuous overlay sheet portion 1302 includes a continuous tab sheet portion 1310 and a first continuous headlap sheet portion 1312. The second continuous overlay sheet portion 1304 includes a second continuous headlap sheet portion 1314 and shares the continuous tab sheet portion 1310 with the first continuous overlay sheet portion 1302. As described above, a pattern cutter 1236 (shown in FIG. 16) may be used to cut the continuous granule-coated sheet 1228 along dashed line A to form a repeated pattern of tabs and cutouts and along lines B and C to separate the first continuous underlay sheet 1300 from the first continuous overlay sheet portion 1302 and to separate the second continuous underlay sheet 1306 from the second continuous overlay sheet portion 1304, respectively.

As seen in FIG. 15a, a liquid-applied parting agent is applied to a bottom surface of the continuous granule-coated sheet 1228 in a first application zone 1500, a second application zone 1501, a third application zone 1502, and a fourth application zone 1503. The first application zone 1500 generally corresponds to the continuous tab sheet portion 1310 as well as to at least a portion of the first and second continuous headlap sheet portions 1312, 1314. The second application zone 1501 generally corresponds to at least a portion of the continuous headlap sheet portions 1312, 1314. The third application zone 1502 corresponds to a portion of the first and second continuous underlay sheet portions 1300, 1306, particularly to a portion where a bead of an adhesive/sealant 1360 is to be applied, and to a portion of the first and second continuous headlap sheet portions 1312, 1314, particularly to a portion where a release tape material 1380 is to be applied. The fourth application zone 1503 generally corresponds to at least a portion of the first and second continuous underlay sheet portions 1300, 1306.

The amount of liquid-applied parting agent applied to the bottom surface of the continuous granule-coated sheet 1228 may be different in one or more of the application zones 1500, 1501, 1502, 1503. In certain embodiments, the amount of liquid-applied parting agent applied in the first application zone 1500 is less than the amount of liquid-applied parting agent applied in the second and fourth application zones 1501, 1503. In certain embodiments, the amount of liquid-applied parting agent applied in the third application zone 1502 is less than the amount of liquid-applied parting agent applied in the first, second, and fourth application zones 1500, 1501, 1503. In certain embodiments, the amount of liquid-applied parting agent applied in the second and fourth application zones 1501, 1503 is the same and is greater than the amount of liquid-applied parting agent applied in the first application zone 1500. In certain embodiments, the amount of liquid-applied parting agent applied in the second and fourth application zones 1501, 1503 is the same and is greater than the amount of liquid-applied parting agent applied in the first application zone 1500, and no liquid-applied parting agent is applied to the third application zone 1502. The liquid-applied parting agent may be one or more of the liquid-applied parting agents described herein. In certain embodiments, the liquid-applied parting agent comprises at least one of a metal salt of a fatty acid and a polyolefin. In certain embodiments, the liquid-applied parting agent comprises at least one metal stearate. In certain embodiments, the liquid-applied parting agent comprises at least one of a calcium stearate, a zinc stearate, an aluminum stearate, and a magnesium stearate. Preferably, the liquid-applied parting agent is applied in the application zones 1500, 1501, 1502, 1503 by spraying, although other methods such as roll coating, flood coating, and/or reverse roll coating may be used.

In certain embodiments, a liquid-applied parting agent is applied in the first application zone 1500 at an application rate of 0.05 lb/100 ft$^2$ to 0.1 lb/100 ft$^2$, in the second application zone 1501 at an application rate of 0.1 lb/100 ft$^2$ to 0.3 lb/100 ft$^2$, in the third application zone 1502 at an application rate of less than 0.05 lb/100 ft$^2$, and in the fourth application zone 1503 at an application rate of 0.1 lb/100 ft$^2$ to 0.3 lb/100 ft$^2$. In certain embodiments, a liquid-applied parting agent is applied in the first application zone 1500 at an application rate of 0.05 lb/100 ft$^2$ to 0.1 lb/100 ft$^2$, in the second application zone 1501 at an application rate of 0.1 lb/100 ft² to 0.3 lb/100 ft², in the fourth application zone 1503 at an application rate of 0.1 lb/100 ft² to 0.3 lb/100 ft², and no liquid-applied parting agent is applied in the third application zone 1502.

It has been found that controlling the amount of liquid-applied parting agent that is applied in the various application zones 1500, 1501, 1502, 1503 can improve product performance by reducing lap shear and preventing bundle sticking in shingle packages. Furthermore, by applying a minimal amount (e.g., less than 0.05 lb/100 ft²) or even no liquid-applied parting agent in the third application zone 1502, adhesive/sealant 1360 bond performance is maintained.

Figure 15B:
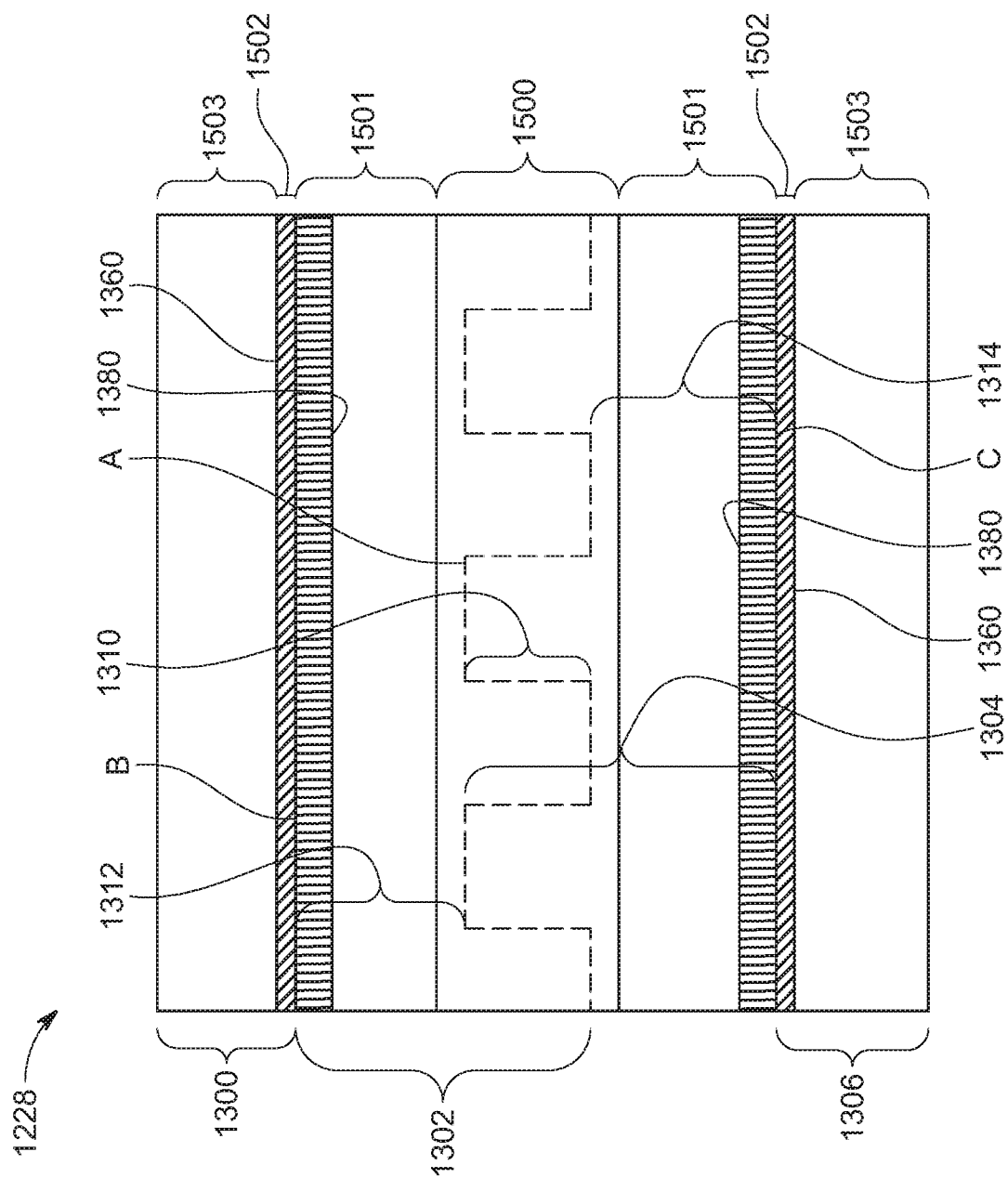
FIG. 15b is a bottom plan view of a portion of an asphalt coated sheet produced by the apparatus of FIG. 13.

Referring now to FIG. 15b, a bottom view of a continuous granule-coated sheet 1228 similar to that shown in FIG. 15a is illustrated. The description of the embodiment shown in FIG. 15a applies equally to the embodiment shown in FIG. 15b. The difference between the embodiment shown in FIG. 15a and the embodiment shown in FIG. 15b is that in the embodiment shown in FIG. 15b the second application zone 1501 has been widened so as to encompass an area that would be occupied by a release tape material 1380. By widening the second application zone 1501, which generally has a higher amount/application rate of liquid-applied parting agent as described above, the release tape material 1380 can be eliminated. Accordingly, in the embodiment illustrated in FIG. 15b, the third application zone 1502 will correspond to a portion of the first and second continuous underlay sheet portions 1300, 1306, particularly to a portion where a bead of an adhesive/sealant 1360 is to be applied. In certain embodiments, a liquid-applied parting agent is applied in the first application zone 1500 at an application rate of 0.05 lb/100 ft² to 0.1 lb/100 ft², in the second application zone 1501 at an application rate of 0.1 lb/100 ft² to 0.3 lb/100 ft², in the third application zone 1502 at an application rate of less than 0.05 lb/100 ft², and in the fourth application zone 1503 at an application rate of 0.1 lb/100 ft² to 0.3 lb/100 ft². In certain embodiments, a liquid-applied parting agent is applied in the first application zone 1500 at an application rate of 0.05 lb/100 ft² to 0.1 lb/100 ft², in the second application zone 1501 at an application rate of 0.1 lb/100 ft² to 0.3 lb/100 ft², in the fourth application zone 1503 at an application rate of 0.1 lb/100 ft² to 0.3 lb/100 ft², and no liquid-applied parting agent is applied in the third application zone 1502.

FIG. 16, for simplicity, illustrates the first continuous underlay sheet 1300 and the first continuous overlay sheet portion 1302 while omitting the second continuous underlay sheet 1306 and the second overlay sheet portion 1304. It will be understood that the description of the FIG. 16 applies equally to forming a continuous laminated sheet and laminated shingles from the second continuous underlay sheet 1306 and the second overlay sheet portion 1304. Referring to FIG. 16, the first continuous underlay sheet 1300 is directed to be aligned beneath the first continuous overlay sheet 1302, and the two sheets 1300, 1302 are laminated together (via adhesive 1360 positioned on the first continuous overlay sheet 1302 in FIG. 15) to form a continuous laminated sheet 1250. As shown in FIG. 13, the first continuous underlay sheet 1300 is routed on a longer path than the path of the first continuous overlay sheet 1302. Further downstream, the continuous laminated sheet 1250 is passed into contact with a rotary length cutter 1244 that cuts the laminated sheet 1250 into individual laminated shingles 1252.

To facilitate synchronization of the cutting and laminating steps, various sensors and controls can be employed, as disclosed in U.S. Pat. No. 6,635,140 to Phillips et al., the entire disclosure of which is incorporated herein by reference. For example, one or more timing marks 1402 (FIG. 16), as known in the art, may be applied to an appropriate part of the granule-coated sheet 1228 to identify specific portions of the sheet. The timing may be sensed by one or more sensors 1404 (FIG. 13), such as a photoeyes, for synchronization with the rotating rotary pattern cutter 1236.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In addition, the phrase "at least one of A, B, and C" is intended to mean "A or B or C or any combination thereof." In the present disclosure, the words "a" or "an" are to be taken to include both the singular and the plural. Conversely, any reference to plural items shall, where appropriate, include the singular.

The above description of specific embodiments has been given by way of example. Any combination or sub-combination of the described shingle features, may be combined to form a shingle. From the disclosure given, those skilled in the art will not only understand the general inventive concepts and attendant advantages, but will also find apparent various changes and modifications to the structures and methods disclosed. For example, the general inventive concepts are not typically limited to any particular roofing application. Thus, for example, use of the inventive concepts to both residential and commercial roofing applications, are within the spirit and scope of the general inventive concepts. As another example, although the embodiments disclosed herein have been primarily directed to asphalt-based roofing shingles, the general inventive concepts could be readily extended to any roofing material which could benefit from the general inventive concepts described herein. Furthermore, the general inventive concepts could be readily applied to various shingle designs, such as for example, single layer, three tab shingles or multi-layer, laminate shingles. It is sought, therefore, to cover all such changes and modifications as fall within the spirit and scope of the general inventive concepts, as described and claimed herein, and equivalents thereof.

What is claimed is:

1. A shingle comprising:
   a first asphalt-coated substrate defining a headlap portion and a tab portion each having opposed top and bottom surfaces;
   a layer of parting material applied to at least a portion of the bottom surface of the headlap portion and to at least a portion of the bottom surface of the tab portion, wherein the layer of parting material comprises at least one of a metal salt of a fatty acid, a polyolefin, and a crosslinkable silane, and wherein the layer of parting material has a thickness of 0.25 µm to 5 µm; and
   an adhesive applied to at least a portion of the bottom surface of the tab portion,
   wherein the shingle is devoid of a backdust particulate layer.

2. The shingle according to claim 1, wherein the metal salt of a fatty acid is selected from group consisting of metal laurates, metal myristates, metal palmitates, metal stearates, and combinations thereof.

3. The shingle according to claim 2, wherein the metal stearate is selected from the group consisting of zinc stearate, calcium stearate, aluminum stearate, magnesium stearate, and combinations thereof.

4. The shingle according to claim 1, wherein the metal salt of a fatty acid includes a metal stearate.

5. The shingle according to claim 1, wherein the layer of parting material is separated from the adhesive by a gap of 0.0625 inches to 1 inch.

6. The shingle according claim 1, wherein the layer of parting material abuts the adhesive.

7. The shingle according to claim 1, wherein the layer of parting material overlaps with the adhesive.

8. The shingle according to claim 7, wherein the adhesive is applied onto the layer of parting material and a thickness of the layer of parting material that overlaps with the adhesive is less than a thickness of the layer of parting material that does not overlap with the adhesive.

9. The shingle according to claim 7, wherein the adhesive is applied onto the layer of parting material and an area weight of the parting agent in the layer of parting material that overlaps with the adhesive is less than an area weight of the layer of parting material that does not overlap with the adhesive.

10. The shingle according to claim 1, further comprising a second layer of parting material applied to at least a portion of the top surface of the headlap portion.

11. The shingle according to claim 1, further comprising a second asphalt-coated substrate having opposed top and bottom surfaces, wherein the top surface of the second asphalt-coated substrate is attached to the bottom surface of the tab portion of the at least one asphalt-coated substrate.

12. A shingle comprising:
an asphalt-coated substrate defining a headlap portion and a tab portion each having opposed top and bottom surfaces; and
a layer of parting material applied to at least a portion of the bottom surface of the headlap portion and to at least a portion of the bottom surface of the tab portion, wherein the layer of parting material comprises a liquid-applied parting agent comprising at least one of a metal salt of a fatty acid, a polyolefin, and a crosslinkable silane, and wherein the layer of parting material has a thickness of 0.25 μm to 5 μm,
wherein the bottom surface of the headlap portion and the bottom surface of the tab portion are devoid of a backdust particulate comprising sand, talc, mica, calcium carbonate, ground recycled glass, quartz, feldspar, dolomite, or coal slag.

13. The shingle according to claim 12, wherein the metal salt of a fatty acid is selected from group consisting of metal laurates, metal myristates, metal palmitates, metal stearates, and combinations thereof.

14. The shingle according to claim 13, wherein the metal stearate is selected from the group consisting of zinc stearate, calcium stearate, aluminum stearate, magnesium stearate, and combinations thereof.

15. The shingle according to claim 12, wherein the metal salt of a fatty acid consists of one or more of zinc stearate and calcium stearate.

16. A shingle comprising:
a substrate having opposed top and bottom surfaces, wherein the substrate is coated with a first asphalt coating on the top surface of the substrate and a second asphalt coating on the bottom surface of the substrate; and
a surface layer of granules applied to at least a portion of the first asphalt coating on the top surface of the substrate; and
a layer of parting material applied to at least a portion of the second asphalt coating on the bottom surface of the substrate, wherein the layer of parting material comprises a liquid-applied parting agent comprising at least one of a metal salt of a fatty acid, a polyolefin, and a crosslinkable silane, and wherein the layer of parting material has a thickness of 0.25 μm to 5 μm,
wherein the second asphalt coating on the bottom surface of the substrate is devoid of a backdust particulate.

* * * * *